(12) United States Patent
Nagano

(10) Patent No.: US 7,548,355 B2
(45) Date of Patent: Jun. 16, 2009

(54) IMAGE SCANNING APPARATUS AND METHOD, AND STORAGE MEDIUM

(75) Inventor: Masatoshi Nagano, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 779 days.

(21) Appl. No.: 11/070,929

(22) Filed: Mar. 2, 2005

(65) Prior Publication Data

US 2005/0174615 A1    Aug. 11, 2005

Related U.S. Application Data

(62) Division of application No. 09/396,244, filed on Sep. 15, 1999, now Pat. No. 7,164,510.

(30) Foreign Application Priority Data

| Sep. 17, 1998 | (JP) | .................. | 10-263018 |
| Sep. 22, 1998 | (JP) | .................. | 10-284731 |
| Sep. 30, 1998 | (JP) | .................. | 10-278126 |
| Sep. 30, 1998 | (JP) | .................. | 10-278127 |

(51) Int. Cl.
*H04N 1/04* (2006.01)
*H04N 1/46* (2006.01)

(52) U.S. Cl. ............... 358/487; 358/475; 358/506; 358/509; 358/504; 358/463; 358/406; 358/486

(58) Field of Classification Search ............ 358/487, 358/475, 506, 486, 488, 509, 463, 464–466, 358/483, 482, 512–514, 406, 504; 355/40, 355/41, 67–71, 30; 250/559.02, 330, 332, 250/559.42, 208.1; 399/204, 212, 208
See application file for complete search history.

(56) References Cited

U.S. PATENT DOCUMENTS 4,172,658 A    10/1979   Tani et al.

(Continued)

FOREIGN PATENT DOCUMENTS

JP    62-188952    8/1987

(Continued)

OTHER PUBLICATIONS

Office Action dated May 25, 2004 in connection with Japanese Patent Application No. 10-278126.

(Continued)

*Primary Examiner*—Cheukfan Lee
(74) *Attorney, Agent, or Firm*—Locke Lord Bissell & Liddell, LLP

(57) ABSTRACT

A scheme for obtaining an original image free from any dust or scratches on a film by scanning a film original or the like with visible light and infrared light has been proposed. This scheme suffers problems, i.e., a large memory size and long processing time since original image data obtained by infrared light must be stored.

To solve such conventional problems, this invention provides, e.g., an image scanning apparatus which has a light source for emitting visible light and invisible light, scanning means for scanning an original image irradiated with light emitted by the light source, and control means for controlling the scanning means to scan the original image irradiated with the invisible light, and then to scan the original image irradiated with the visible light.

28 Claims, 40 Drawing Sheets

U.S. PATENT DOCUMENTS

| | | | |
|---|---|---|---|
| 4,875,104 A | 10/1989 | Kamon | 358/400 |
| 4,933,983 A | 6/1990 | Hiramatsu et al. | 382/8 |
| 4,974,068 A | 11/1990 | Hiramatsu et al. | 358/506 |
| 5,266,805 A | 11/1993 | Edgar | 250/330 |
| 5,471,281 A | 11/1995 | Hayashi et al. | 155/201 |
| 5,764,380 A | 6/1998 | Noguchi | |
| 5,969,372 A | 10/1999 | Stavely et al. | 250/559.42 |
| 5,986,773 A | 11/1999 | Goto et al. | |
| 6,323,967 B1 | 11/2001 | Fujinawa | |
| 6,346,998 B2 | 2/2002 | Shiota et al. | 358/487 |
| 6,442,301 B1 | 8/2002 | Edgar | |
| 6,590,679 B1 | 7/2003 | Edgar et al. | |
| 6,919,974 B1 | 7/2005 | Ichikawa et al. | |
| 7,164,510 B1 * | 1/2007 | Nagano | 358/487 |

FOREIGN PATENT DOCUMENTS

| | | |
|---|---|---|
| JP | 62-203477 | 9/1987 |
| JP | 63-280569 | 11/1988 |
| JP | 64-024269 | 1/1989 |
| JP | 4-257979 | 9/1992 |
| JP | 4-356867 | 12/1992 |
| JP | 5-56222 | 3/1993 |
| JP | 6-28468 | 2/1994 |
| JP | 6-141178 | 5/1994 |
| JP | 6-205178 | 7/1994 |
| JP | 06-78992 | 10/1994 |
| JP | 7-58914 | 3/1995 |
| JP | 7-154595 | 6/1995 |
| JP | 9-116670 | 5/1997 |
| JP | 9-116712 | 5/1997 |
| JP | 09-218472 | 8/1997 |
| JP | 10-173873 | 6/1998 |
| JP | 11-308414 | 11/1999 |

OTHER PUBLICATIONS

Office Action dated May 25, 2004 in connection with Japanese Patent Application No. 10-278127.

Office Action dated Dec. 14, 2004 based on Japanese Patent Application No. 10-284731.

* cited by examiner

F I G. 44
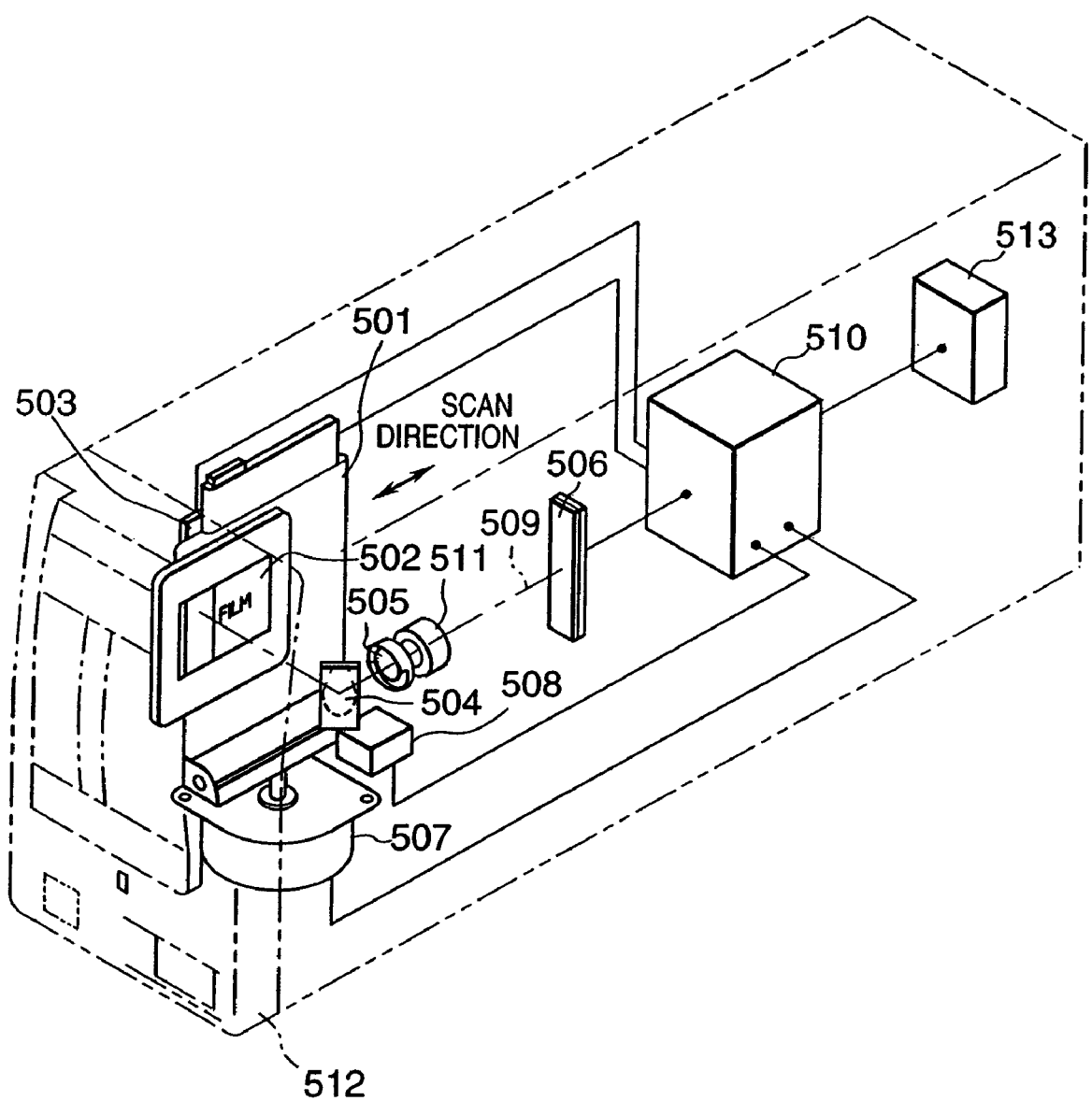

IMAGE SCANNING APPARATUS AND METHOD, AND STORAGE MEDIUM

This is divisional of application Ser. No. 09/396,244, filed Sep. 15, 1999 now U.S. Pat. No. 7,164,510.

BACKGROUND OF THE INVENTION

1. Field of the Invention

The present invention relates to an image scanning apparatus and method for scanning an image on, e.g., a transparent original (also called a transmissive original) such as a developed photographic film or the like, an opaque film original, or the like.

2. Description of the Related Art

The arrangement of a conventional film scanner will be explained below with reference to FIGS. 44 to 46.

FIG. 44 is a perspective view showing principal part of a conventional film scanner, FIG. 45 is a schematic view showing the arrangement of the film scanner shown in FIG. 44, and FIG. 46 is a block diagram showing the circuit arrangement of the film scanner shown in FIG. 44.

Referring to FIGS. 44 to 46, reference numeral 501 denotes a film carriage used as a platen; and 502, a developed film which is fixed on the film carriage 501. Reference numeral 503 denotes a lamp serving as a light source; 504, a mirror; 505, a lens; and 506, a line sensor comprising, e.g., a CCD and the like. Light emitted by the lamp 503 is transmitted through the film 502, is reflected by the mirror 504, and forms an image on the line sensor 506 by the lens 505.

Reference numeral 507 denotes a motor for moving the film carriage 501 in the scan direction (the direction of the arrow in FIGS. 44 and 45); 508, a sensor for detecting the position of the film carriage 501; 509, an optical axis extending from the lamp 503 o the line sensor 506; 510, a control circuit; 511, a lens holder for holding the lens 505; 512, an outer case of the film scanner; and 513, an input/output terminal.

The lamp 503, line sensor 506, motor 507, sensor 508, and input/output terminal 513 are electrically connected to the control circuit 510. The control circuit 510 comprises a film scanner control circuit, sensor control circuit, motor control circuit, image information processing circuit, lamp control circuit, line sensor control circuit, film density detection circuit, and motor drive speed determination circuit, as shown in FIG. 46.

An image information scanning method of the film 502 will be explained below.

Upon receiving a film scan command from an external device via the input/output terminal 513, the sensor 508 and sensor control circuit detect the position of the film carriage 501, and that information is sent to the film scanner control circuit. The motor control circuit drives the motor 507 to set the film carriage 501 at a predetermined standby position, thus moving the film carriage 501 to the standby position. The film density detection circuit detects the density of the film 502 by a known method, and the motor drive speed determination circuit determines the drive speed of the motor 507 for a scan on the basis of the density information. The lamp control circuit turns on the lamp 503, and the motor 507 is rotated at the determined drive speed, thus scanning the film. During the scan, the line sensor 506 sends image information to the image information processing circuit via the line sensor control circuit. Upon completion of the scan, the lamp control circuit turns off the lamp 503, and at the same time, the image information processing circuit executes image information processing. The obtained image information is then output from the input/output terminal 513, thus ending film image scanning of the film scanner.

In recent years, a film scanner which scans the film not only using visible light, as described above, but also using infrared light to detect dust or scratches on the film, superimposes the detected dust or scratch image information on the image information obtained by a scan using the visible light, and corrects it by image processing has been proposed by, e.g., Japanese Patent Publication No. 06-78992, and the like.

However, since such prior art requires a memory for storing film image information obtained by infrared light, a larger memory size than the aforementioned prior art is required. When a film image is scanned with infrared light to correct dust or scratches on the film, the required scan time is prolonged accordingly.

SUMMARY OF THE INVENTION

It is a principal object of the present invention to provide an image scanning apparatus and method which can solve the conventional problems.

According to the present invention, there is provided an image scanning apparatus comprising: a light source for emitting visible light and invisible light; scanning means for scanning an original image irradiated with light emitted by the light source; and control means for controlling the scanning means to scan the original image irradiated with the invisible light, and then to scan the original image irradiated with the visible light.

According to the present invention, there is provided an image scanning method comprising: the scanning step of scanning, by scanning means, an original image irradiated with light emitted by a light source which emits visible light and invisible light; and the control step of controlling the scanning means to scan the original image irradiated with the invisible light, and then to scan the original image irradiated with the visible light.

According to the present invention, there is provided a storage medium storing a computer program for scanning image information on an original, the computer program including: a code of the step of scanning the image information by irradiating the original with invisible light; and a code of the step of then scanning the image information by irradiating the original with visible light.

According to the present invention, there is provided an image scanning apparatus for scanning image information of a transparent original by a relative reciprocal motion between the transparent original and photodetection means for detecting light transmitted through the transparent original, comprising: emission means for emitting light in a first wavelength range and light in a second wavelength range with respect to the transparent original; and control means for controlling to scan image information from the transparent original by the light in the first wavelength range in a motion in one direction of the reciprocal motion, and to scan image information from the transparent original by the light in the second wavelength range in a motion in the other direction of the reciprocal motion.

According to the present invention, there is provided an image scanning apparatus for scanning image information of a transparent original by a relative reciprocal motion between the transparent original and optical detection means for detecting light transmitted through the transparent original, comprising: emission means for emitting light in a first wavelength range and light in a second wavelength range with respect to the transparent original; and control means for controlling to scan image information from the transparent original, wherein an operation mode that skips a scan for image information by the light in the second wavelength range upon scanning the image information of the transparent original is selectable.

According to the present invention, there is provided an image scanning method applied to an image scanning apparatus for scanning image information of a transparent original by a relative reciprocal motion between the transparent original and photodetection means for detecting light transmitted through the transparent original, comprising: the emission step of emitting light in a first wavelength range and light in a second wavelength range with respect to the transparent original; and the control step of controlling to scan image information from the transparent original by the light in the first wavelength range in a motion in one direction of the reciprocal motion, and to scan image information from the transparent original by the light in the second wavelength range in a motion in the other direction of the reciprocal motion.

According to the present invention, there is provided an image scanning method applied to an image scanning apparatus for scanning image information of a transparent original by a relative reciprocal motion between the transparent original and photodetection means for detecting light transmitted through the transparent original, comprising: the emission step of emitting light in a first wavelength range and light in a second wavelength range with respect to the transparent original; and the control step of controlling to scan image information from the transparent original, wherein an operation mode that skips a scan for image information by the light in the second wavelength range upon scanning the image information of the transparent original is selectable.

According to the present invention, there is provided a computer readable storage medium, which stores a program for implementing an image scanning method applied to an image scanning apparatus for scanning image information of a transparent original by a relative reciprocal motion between the transparent original and photodetection means for detecting light transmitted through the transparent original, the image scanning method having the emission step of emitting light in a first wavelength range and light in a second wavelength range with respect to the transparent original, and the control step of controlling to scan image information from the transparent original by the light in the first wavelength range in a motion in one direction of the reciprocal motion, and to scan image information from the transparent original by the light in the second wavelength range in a motion in the other direction of the reciprocal motion.

According to the present invention, there is provided a computer readable storage medium, which stores a program for implementing an image scanning method applied to an image scanning apparatus for scanning image information of a transparent original by a relative reciprocal motion between the transparent original and photodetection means for detecting light transmitted through the transparent original, the image scanning method having the emission step of emitting light in a first wavelength range and light in a second wavelength range with respect to the transparent original, and the control step of controlling to scan image information from the transparent original, wherein an operation mode that skips a scan for image information by the light in the second wavelength range upon scanning the image information of the transparent original is selectable.

According to the present invention, there is provided an image scanning apparatus for scanning image information on an original by a relative reciprocal motion between the original and a line sensor, comprising: scan means for making three types of scans including a rough scan for scanning the image information by visible light at a low resolution, a fine scan for scanning the image information by visible light at a high resolution, and an invisible light scan for scanning the image information by invisible light, wherein the scan means makes the invisible light scan at a lower resolution than the fine scan.

According to the present invention, there is provided an image scanning method for scanning image information on an original, comprising: the rough scan step of scanning the image information by visible light at a low resolution; the fine scan step of scanning the image information by visible light at a high resolution; the invisible scan step of scanning the image information by invisible light at a lower resolution than the resolution in the fine scan step.

According to the present invention, there is provided a storage medium storing a computer program for scanning image information on an original, the computer program including: a code of the rough scan step of scanning the image information by visible light at a low resolution; a code of the fine scan step of scanning the image information by visible light at a high resolution; a code of the invisible scan step of scanning the image information by invisible light at a lower resolution than the resolution in the fine scan step.

According to the present invention, there is provided an image scanning apparatus for scanning image information on an original by a scan attained by a relative motion between the original and a line sensor, comprising: emission means for emitting visible light and invisible light; and scan means for making two types of scans including a visible light scan for scanning the image information by visible light, and an invisible light scan for scanning the image information by invisible light, wherein the scan means completes the invisible light scan within a shorter period of time than the visible light scan.

According to the present invention, there is provided an image scanning apparatus for scanning image information on an original by a scan attained by a relative motion between the original and a line sensor, comprising: emission means for emitting visible light and invisible light; and scan means for making two types of scans including a visible light scan for scanning the image information by visible light, and an invisible light scan for scanning the image information by invisible light, wherein the scan means makes the invisible light scan by a relative motion at a higher speed than a relative motion for the visible light scan.

According to the present invention, there is provided an image scanning method for scanning image information on an original by a scan attained by a relative motion between the original and a line sensor, comprising: the visible light scan step of making a scan by the relative motion using visible light; and the invisible light scan step of making a scan using invisible light within a shorter period of time than the visible light scan step.

According to the present invention, there is provided an image scanning method for scanning image information on an original by a scan attained by a relative motion between the original and a line sensor, comprising: the visible light scan step of making a scan by the relative motion using visible light; and the invisible light scan step of making a scan using invisible light by a relative motion at higher speed than a relative motion for the visible light scan step.

According to the present invention, there is provided a storage medium storing a computer program for scanning image information on an original by a scan attained by a relative motion between the original and a line sensor, the computer program including: a code of the visible light scan step of making a scan by the relative motion using visible light; and a code of the invisible light scan step of making a scan using invisible light within a shorter period of time than the visible light scan step.

According to the present invention, there is provided a storage medium storing a computer program for scanning image information on an original by a scan attained by a relative motion between the original and a line sensor, the computer program including: a code of the visible light scan step of making a scan by the relative motion using visible light; and a code of the invisible light scan step of making a scan using invisible light by a relative motion at higher speed than a relative motion for the visible light scan step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 44 is a perspective view showing principal part of a conventional film scanner;

DETAILED DESCRIPTION OF THE PREFERRED EMBODIMENTS

The preferred embodiments of the present invention will be described in detail hereinafter taking a film scanner as an example. Note that the present invention is not limited to the form of a film scanner (film image scanning apparatus), and can be practiced in the form of a film image scanning method, and a storage medium that stores a program for implementing this method.

First Embodiment

The first embodiment of the present invention will be described below with reference to FIGS. 1 to 6.

Figure 1:
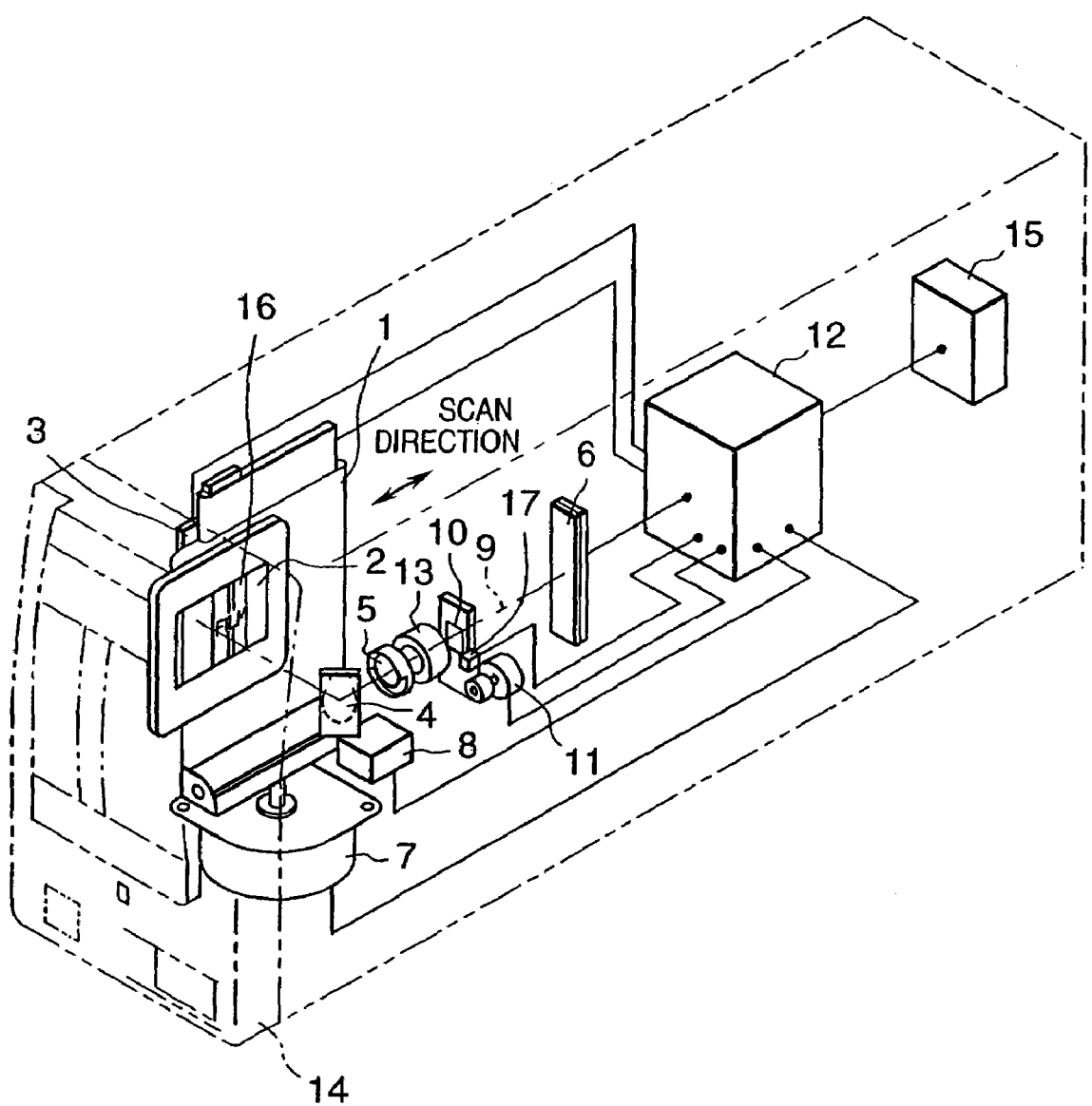
FIG. 1 is a perspective view showing principal part of a "film scanner" according to the first embodiment of the present invention.
Figure 2:
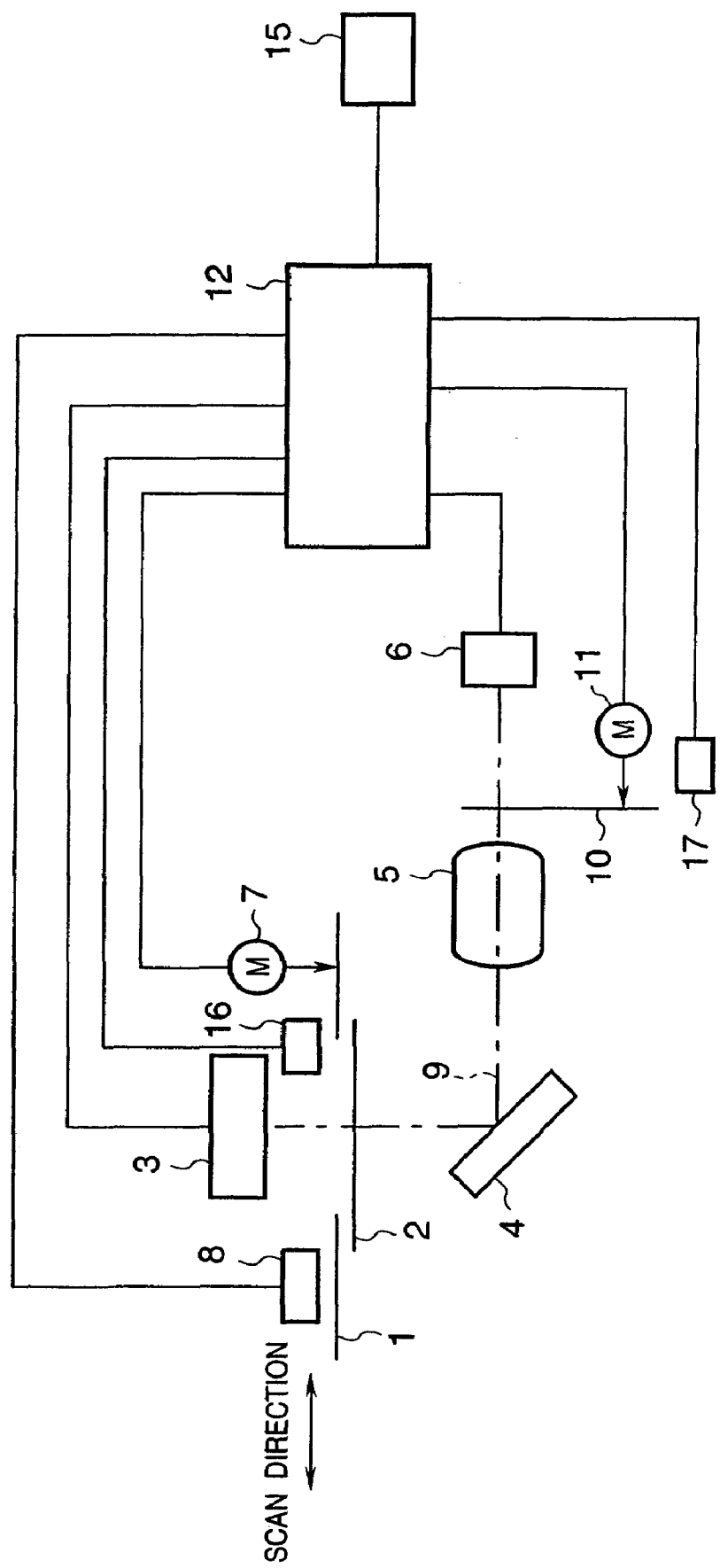
FIG. 2 is a schematic view showing the arrangement of the film scanner shown in FIG. 1.
Figure 3:
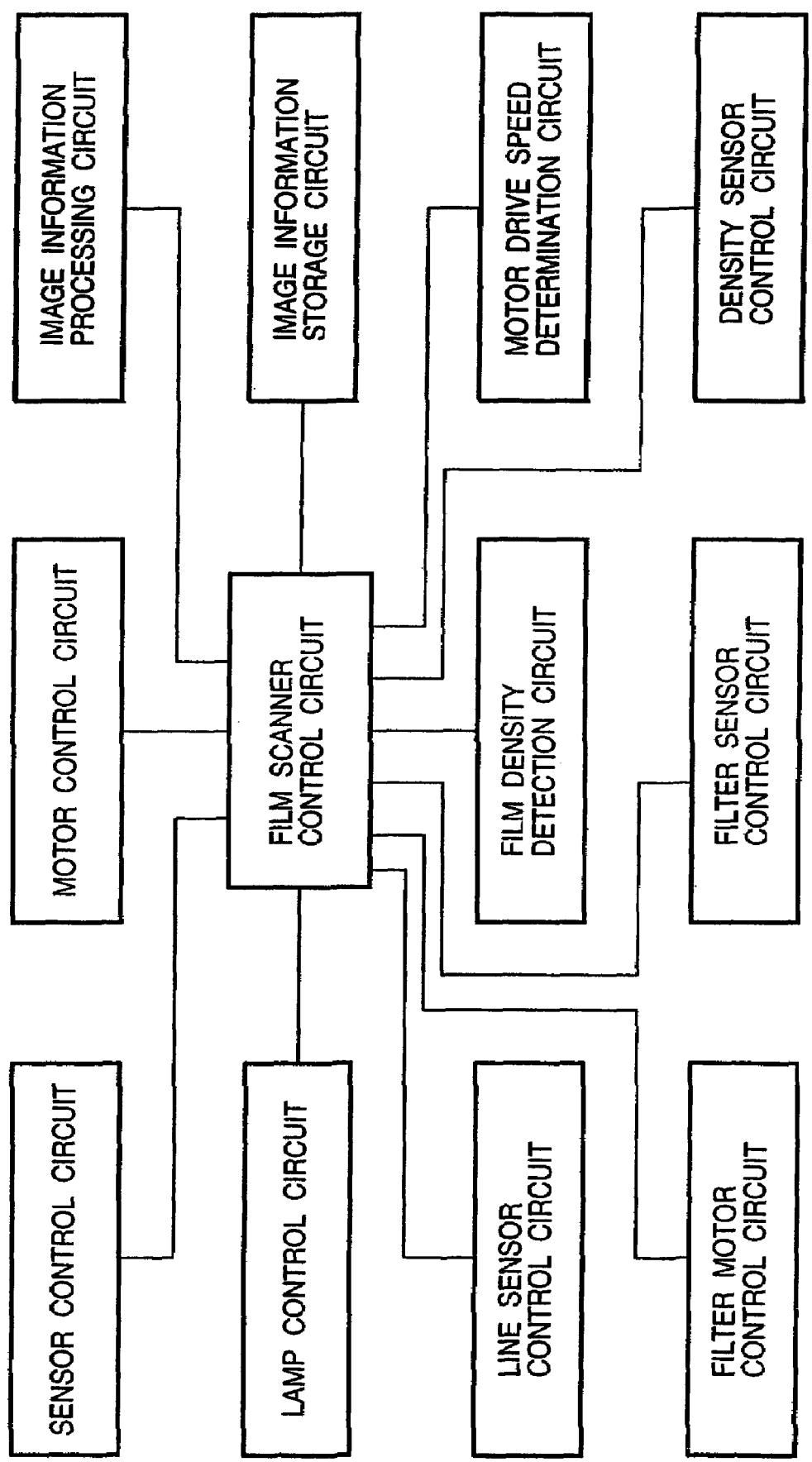
FIG. 3 is a block diagram showing the circuit arrangement of the film scanner shown in FIG. 1.
Figure 4:
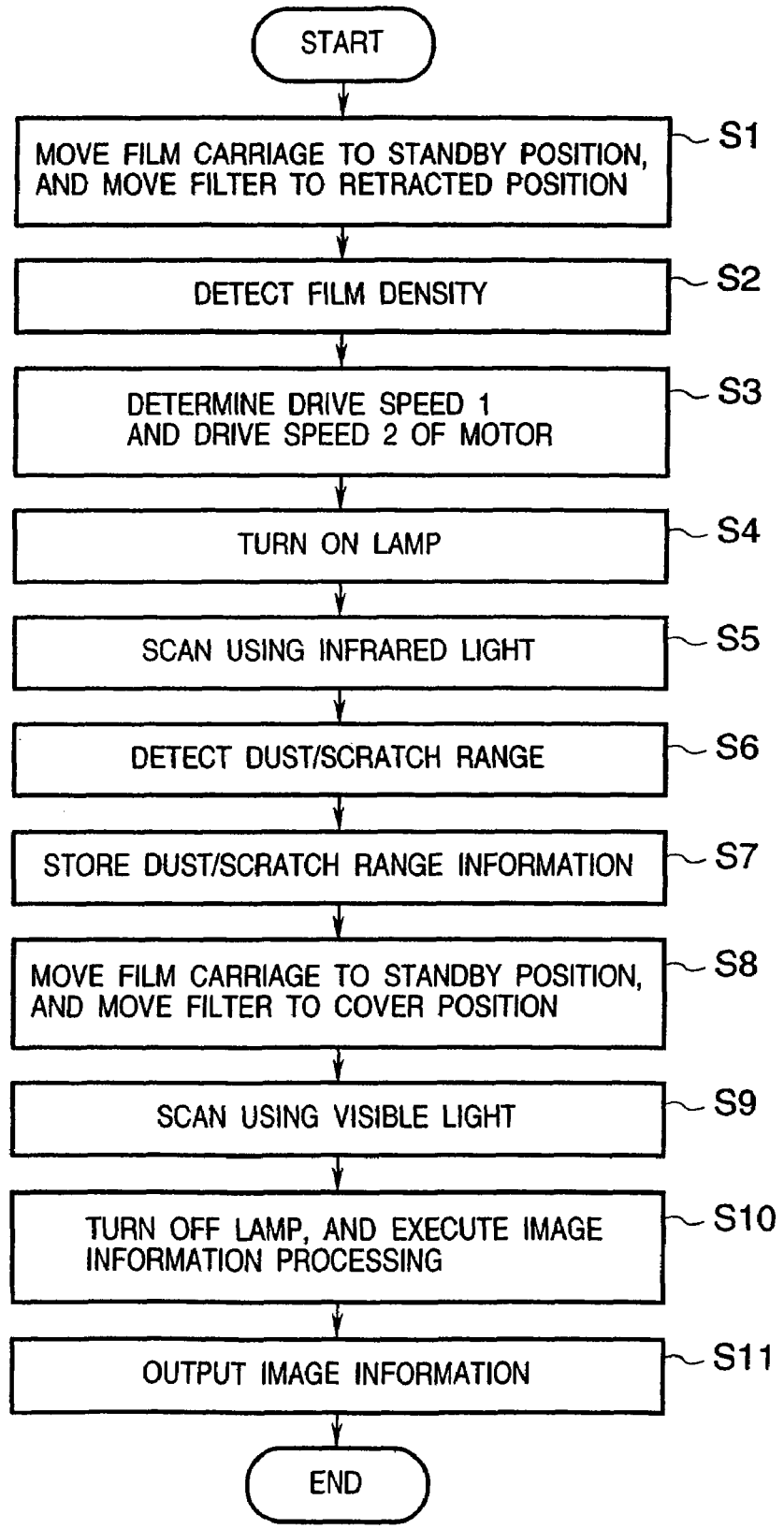
FIG. 4 is a flow chart showing the operation of the film scanner shown in FIG. 1.
Figure 5:
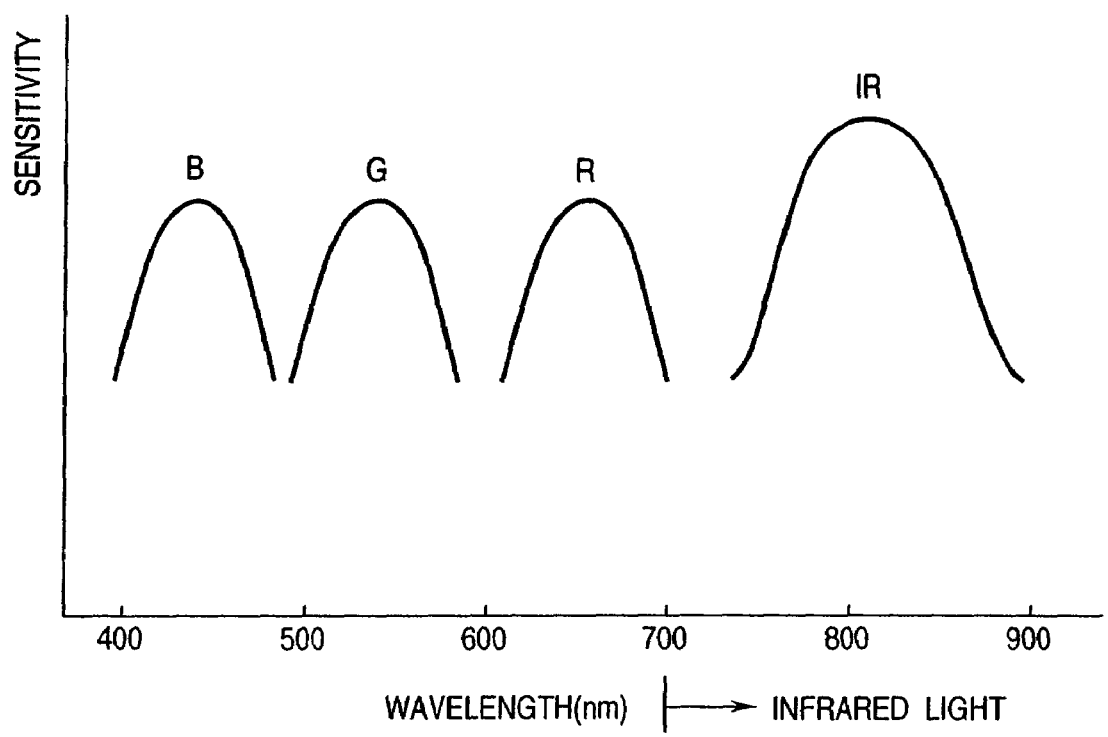
FIG. 5 is a graph showing the spectral sensitivity characteristics of a line sensor, in which curves R, G, and B represent the spectral sensitivity characteristics for visible light (R, G, and B respectively represent the spectral sensitivity characteristics of red, green, and blue light wavelength receiving units of the line sensor), and a curve IR indicates the spectral sensitivity characteristics for infrared light.
Figure 6:
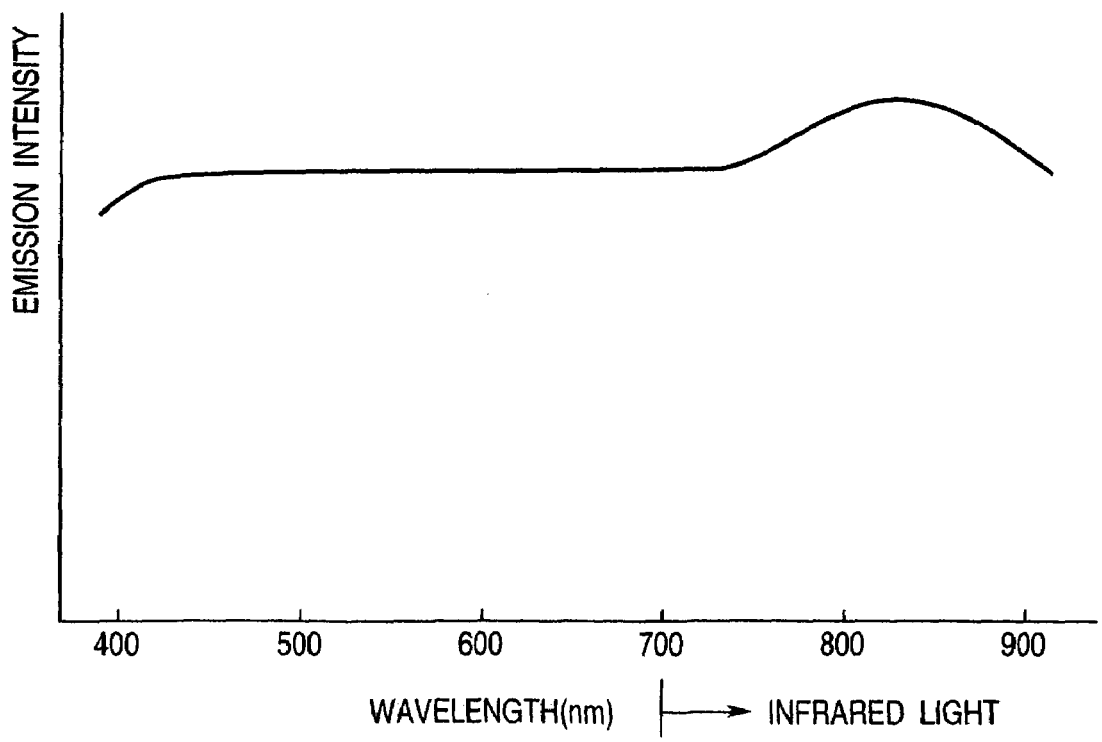
FIG. 6 is a graph showing the emission spectrum intensity distribution of a lamp.

FIG. 1 is a perspective view showing principal part of a "film scanner" according to the first embodiment of the present invention, FIG. 2 is a schematic view showing the arrangement of the film scanner shown in FIG. 1, FIG. 3 is a block diagram showing the circuit arrangement of the film scanner shown in FIG. 1, FIG. 4 is a flow chart showing the operation of the film scanner shown in FIG. 1, FIG. 5 is a graph showing the spectral sensitivity characteristics of a line sensor, in which curves R, G, and B represent the spectral sensitivity characteristics for visible light (R, G, and B respectively represent the spectral sensitivity characteristics of red, green, and blue light wavelength receiving units of the line sensor), and a curve IR indicates the spectral sensitivity characteristics for infrared light, and FIG. 6 is a graph showing the emission spectrum intensity of a lamp.

Referring to FIGS. 1 to 3, reference numeral 1 denotes a film carriage used as a platen; and 2, a developed film which is fixed on the film carriage 1. Reference numeral 3 denotes a lamp serving as a light source of visible light and infrared light. The lamp 3 has emission characteristics ranging from the visible light wavelength range to the infrared wavelength. Reference numeral 4 denotes a mirror; 5, a lens; and 6, a line sensor comprising, e.g., a CCD and the like. Light emitted by the lamp 3 is transmitted through the film 2, is reflected by the mirror 4, and forms an image on the line sensor 6. The line sensor 6 has three light-receiving areas, i.e., R, G, and B light-receiving areas, which are respectively sensitive to red, green, and blue light wavelengths, and at least one of which is also sensitive to infrared light. Reference numeral 7 denotes a motor for moving the film carriage 1 in the scan direction (the direction of the arrow in FIGS. 1 and 2); 8, a sensor for detecting the position of the film carriage 1; 9, an optical axis extending from the lamp 3 to the line sensor 6; and 10, a filter for cutting infrared light. The filter 10 is held to be retractable from the position on the optical axis 9. Reference numeral 11 denotes a filter motor for moving the filter 10; 12, a control circuit; 13, a lens holder for holding the lens 5; 14, an outer case of the film scanner; 15, an input/output terminal; 16, a density sensor for detecting the film density; and 17, a filter sensor for detecting the position of the filter 10.

The lamp 3, line sensor 6, motor 7, sensor 8, filter motor 11, input/output terminal 15, density sensor 16, and filter sensor 17 are electrically connected to the control circuit 12. The control circuit 12 comprises a film scanner control circuit, sensor control circuit, density sensor control circuit, filter sensor control circuit, motor control circuit, filter motor control circuit, image information processing circuit, lamp control circuit, line sensor control circuit, film density detection circuit, motor drive speed determination circuit, and image information storage circuit, as shown in FIG. 3.

An image scanning method of the film 2 will be explained below with reference to the flow chart shown in FIG. 4.

Upon receiving a film scan command from an external device via the input/output terminal 15, the sensor 8 and sensor control circuit detect the position of the film carriage 1, and that information is sent to the film scanner control circuit. The motor control circuit drives the motor 7 at a predetermined drive speed to set the film carriage 1 at a predetermined standby position, thus moving the film carriage 1 to the standby position. At the same time, the filter sensor 17 and filter sensor control circuit detect the position of the filter 10, and that information is sent to the film scanner control circuit. In order to retract the filter 10 from the position on the optical axis 9, the filter motor control circuit drives the filter motor 11 to move the filter 10 to its retracted position (see S1; the same applies to the following description). The density sensor 16 and film density detection circuit detect the density of the film 2 (S2), and the motor drive speed determination circuit determines drive speed 1 of the motor 7 for a scan using infrared light, and drive speed 2 of the motor 7 for a scan using visible light on the basis of the density information (S3). The lamp control circuit turns on the lamp 3 (S4), and the motor control circuit rotates the motor 7 in a predetermined direction at drive speed 1 determined previously, thus scanning the film to obtain image information of the film 2 by infrared light (S5). During the scan, the line sensor 6 sends an output signal (image information) to the image information processing circuit via the line sensor control circuit to detect the infrared light transmission state, i.e., a region on the film 2 where the transmittance of the infrared light is different from the remaining region by a predetermined value or more, thus detecting any dust/scratch range on the film 2 (S6). The dust/scratch range information is sent to and stored in the image information storage circuit (S7). Upon completion of the scan for obtaining the image information, i.e., the dust/scratch range information of the film 2 by infrared light, the motor 7 is rotated in the reverse direction at a predetermined speed, thus moving the film carriage 1 to the aforementioned standby position. At the same time, the filter motor control circuit drives the filter motor 11 to move the filter 10 to a position where it can cover a light beam having the optical axis 9 as the center while monitoring the position of the filter 10 by the filter sensor 17 and filter sensor control circuit (S8). The motor control circuit rotates the motor 7 in the same direction as that in the scan using the infrared light at drive speed 2 determined previously, thus scanning the film to obtain image information of the film 2 by visible light (S9). During this scan, the line sensor 6 sends an output signal (image information) to the image information processing circuit via the line sensor control circuit.

Upon completion of this scan, the lamp control circuit turns off the lamp 3 (S10). At the same time, the image information storage circuit sends the dust/scratch range information to the image information processing circuit, which executes image information processing for correcting the dust/scratch range from the image information of the film 2 obtained by visible light. The image information is output from the input/output terminal 15 (S11), thus ending film image scanning of the film scanner.

The scan using the infrared light is to detect dust or scratches on the film 2 by detecting a region of the film 2 where the infrared light transmittance is different from other regions, but is not to obtain high-quality image information unlike the scan using visible light. In other words, since the scan using the infrared light need only detect the region of the film 2 where the infrared light transmittance is different from other regions, i.e., the dust/scratch range, the output signal level of the line sensor 6 can be lower than that in the visible light scan as long as that range can be detected. On the other hand, since the visible light scan is to obtain higher-quality image information than the infrared light scan, the output signal from the line sensor 6 preferably has a largest possible maximum value, and the scan speed is set so that the line sensor 6 can obtain a sufficient exposure amount. Therefore, the exposure amount of the line sensor 6 per unit time in one resolution limit line is decreased to decrease the output signal level in the infrared light scan, and the scan speed is set high to detect the region whose infrared light transmittance is different from other regions. For this reason, drive speed 1 is set to be higher than drive speed 2, and the infrared scan can be completed within a shorter period of time than the visible light scan.

When the infrared light emission intensity of the lamp 3 is smaller than its visible light emission intensity, the line sensor 6 can use a line sensor which has the spectral sensitivity characteristics shown in, e.g., FIG. 5 (in FIG. 5, R, G, and B represent the spectral sensitivity characteristics for visible light, and IR represents those for infrared light), i.e., has higher sensitivity to infrared light than to visible light.

On the other hand, when the infrared light sensitivity of the line sensor 6 is lower than the visible light sensitivity, the lamp 3 can use a lamp having the emission spectrum distribution shown in, e.g., FIG. 6, i.e., having a higher emission intensity of infrared light than visible light.

Furthermore, the dust/scratch range information on the film 2 and the image information of the film 2 obtained by visible light may be separately output from the input/output terminal 15, and a device (not shown) connected to the input/output terminal 15 may execute image information processing for correcting the dust/scratch range from the image information of the film 2 obtained by visible light.

Moreover, an operation mode that skips the scan using infrared light, i.e., the scan for obtaining dust/scratch range information, and makes only a scan for obtaining image information of the film 2 by visible light may be provided. By selecting this mode, when a film which has less dust or scratches is to be scanned, or when no dust/scratch correction of an output image is required, the time required for the image information processing for obtaining image information of the film 2 by visible light can be shortened by skipping the image information processing for correcting the dust/scratch range of the image information of the film 2.

Second Embodiment

A "film scanner" according to the second embodiment of the present invention will be explained below with reference to FIGS. 1 to 3 and FIGS. 5 to 7.

Figure 7:
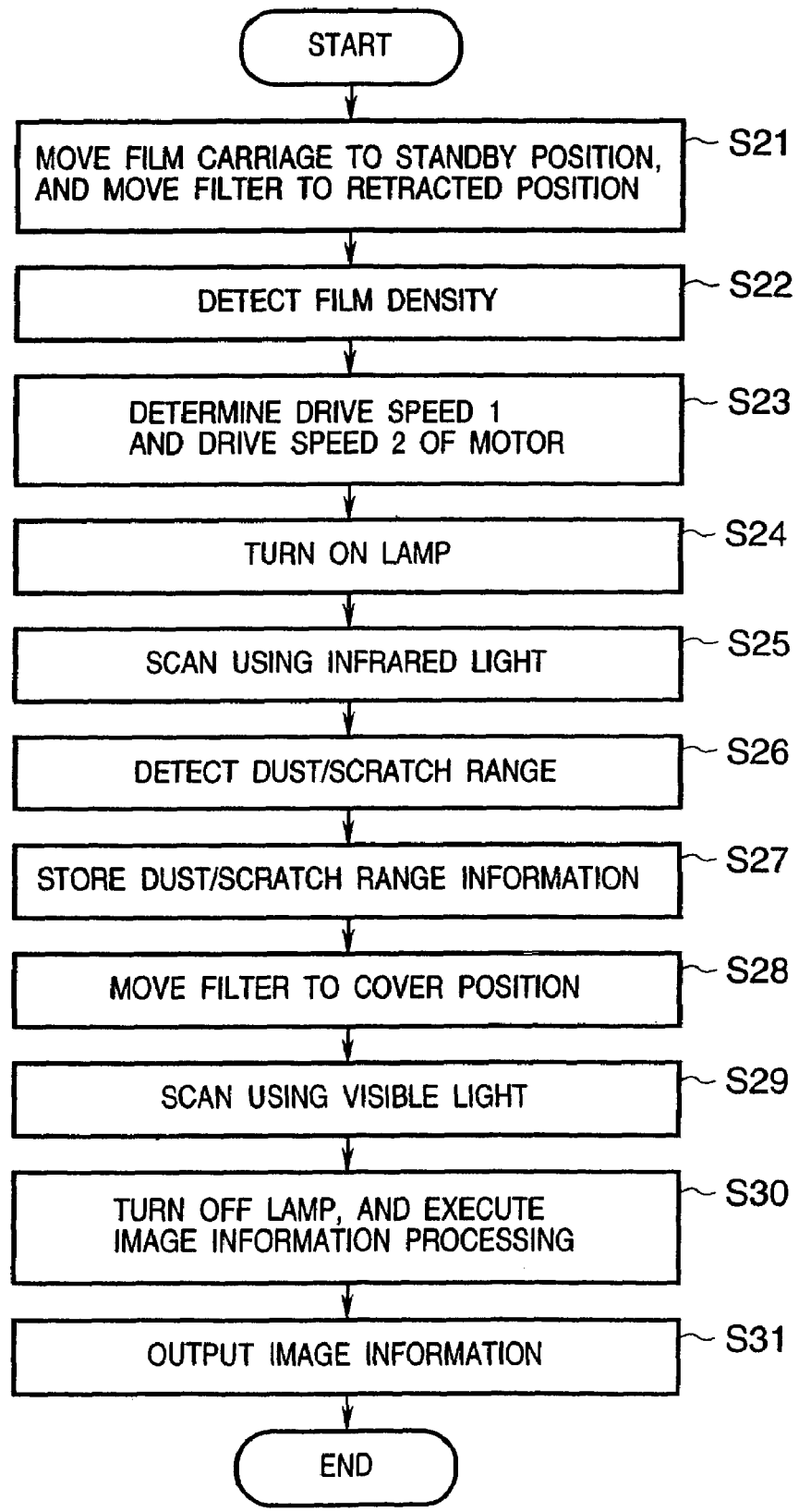
FIG. 7 is a flow chart showing the operation in the second embodiment of the film scanner shown in FIG. 1.

Since FIGS. 1 to 3 and FIGS. 5 and 6 are the same as those in the first embodiment, a detailed description thereof will be omitted. FIG. 7 is a flow chart showing the operation of the film scanner shown in FIG. 1.

Also, since reference numerals are common to those in the first embodiment, a detailed description thereof will be omitted.

This embodiment is a modification of the first embodiment, and is effective for a film scanner having the same arrangement as that of the first embodiment, in which upon reciprocally moving the film carriage 1 by the motor 7 with respect to the line sensor 6, hysteresis due to the reciprocal motion is very small, that is, two pieces of image information obtained by both movements (forward and backward movements) can be easily overlapped on each other upon capturing images by a movement of the film carriage 1 in a predetermined direction and by a movement in the reverse direction.

An image information scanning method of the film 2 will be explained below with reference to the flow chart shown in FIG. 7.

Upon receiving a film scan command from an external device via the input/output terminal 15, the sensor 8 and sensor control circuit detect the position of the film carriage 1, and that information is sent to the film scanner control circuit. The motor control circuit drives the motor 7 at a predetermined drive speed to set the film carriage 1 at a predetermined standby position, thus moving the film carriage 1 to the standby position. At the same time, the filter sensor 17 and filter sensor control circuit detect the position of the filter 10, and that information is sent to the film scanner control circuit. In order to retract the filter 10 from the position on the optical axis 9, the filter motor control circuit drives the filter motor 11 to move the filter 10 to its retracted position (S21). The density sensor 16 and film density detection circuit detect the density of the film 2 (S22), and the motor drive speed determination circuit determines drive speed 1 of the motor 7 for a scan using infrared light, and drive speed 2 of the motor 7 for a scan using visible light on the basis of the density information (S23). The lamp control circuit turns on the lamp 3 (S24), and the motor control circuit rotates the motor 7 in a predetermined direction at drive speed 1 determined previously, thus scanning the film to obtain image information of the film 2 by infrared light (S25). During the scan, the line sensor 6 sends an output signal (image information) to the image information processing circuit via the line sensor control circuit to detect the infrared light transmission state, i.e., a region on the film 2 where the transmittance of the infrared light is different from the remaining region by a predetermined value or more, thus detecting any dust/scratch range on the film 2 (S26). The dust/scratch range information is sent to and stored in the image information storage circuit (S27). Upon completion of the scan for obtaining the image information, i.e., the dust/scratch range information of the film 2 by infrared light, the filter motor control circuit drives the filter motor 11 to move the filter 10 to a position where it can cover a light beam having the optical axis 9 as the center while monitoring the position of the filter 10 by the filter sensor 17 and filter sensor control circuit (S28). The motor control circuit rotates the motor 7 in the reverse direction at drive speed 2 determined previously, thus scanning the film to obtain image information of the film 2 by visible light (S29). During this scan, the line sensor 6 sends an output signal (image information) to the image information processing circuit via the line sensor control circuit.

Upon completion of this scan, when the lamp control circuit turns off the lamp 3, the image information storage circuit sends the dust/scratch range information to the image information processing circuit, which executes image information processing for correcting the dust/scratch range from the image information of the film 2 obtained by visible light (S30). The image information is output from the input/output terminal 15 (S31), thus ending film image scanning of the film scanner.

As in the first embodiment, since the scan using the infrared light need only detect the region of the film 2 where the infrared light transmittance is different from other regions, i.e., the dust/scratch range, the output signal level of the line sensor 6 can be lower than that in the visible light scan as long as that range can be detected. On the other hand, since the visible light scan is to obtain higher-quality image information than the infrared light scan, the output signal from the line sensor 6 preferably has a largest possible maximum value, and the scan speed is set so that the line sensor 6 can obtain a sufficient exposure amount. Therefore, the exposure amount of the line sensor 6 per unit time in one resolution limit line is decreased to decrease the output signal level in the infrared light scan, and the scan speed is set high to detect the region whose infrared light transmittance is different from other regions. For this reason, drive speed 1 is set to be higher than drive speed 2, and the infrared scan can be completed within a shorter period of time than the visible light scan.

When the infrared light emission intensity of the lamp 3 is smaller than its visible light emission intensity, the line sensor 6 can use a line sensor which has the spectral sensitivity characteristics shown in, e.g., FIG. 5 (in FIG. 5, R, G, and B represent the spectral sensitivity characteristics for visible light, and IR represents those for infrared light), i.e., has higher sensitivity to infrared light than to visible light.

On the other hand, when the infrared light sensitivity of the line sensor 6 is lower than the visible light sensitivity, the lamp 3 can use a lamp having the emission spectrum distribution shown in, e.g., FIG. 6, i.e., having a higher emission intensity of infrared light than visible light.

Furthermore, the dust/scratch range information on the film 2 and the image information of the film 2 obtained by visible light may be separately output from the input/output terminal 15, and a device (not shown) connected to the input/output terminal 15 may execute image information processing for correcting the dust/scratch range from the image information of the film 2 obtained by visible light.

Moreover, an operation mode that skips the scan using infrared light, i.e., the scan for obtaining dust/scratch range information, and makes only a scan for obtaining image information of the film 2 by visible light may be provided as one of operation modes to be selected. With this mode, when a film which has less dust or scratches is to be scanned, or when no dust/scratch correction of an output image is required, the time required for the image information processing for obtaining image information of the film 2 by visible light can be shortened by skipping the image information processing for correcting the dust/scratch range of the image information of the film 2.

Third Embodiment

The third embodiment of the present invention will be described below with reference to FIGS. 8 to 13.

Figure 8:
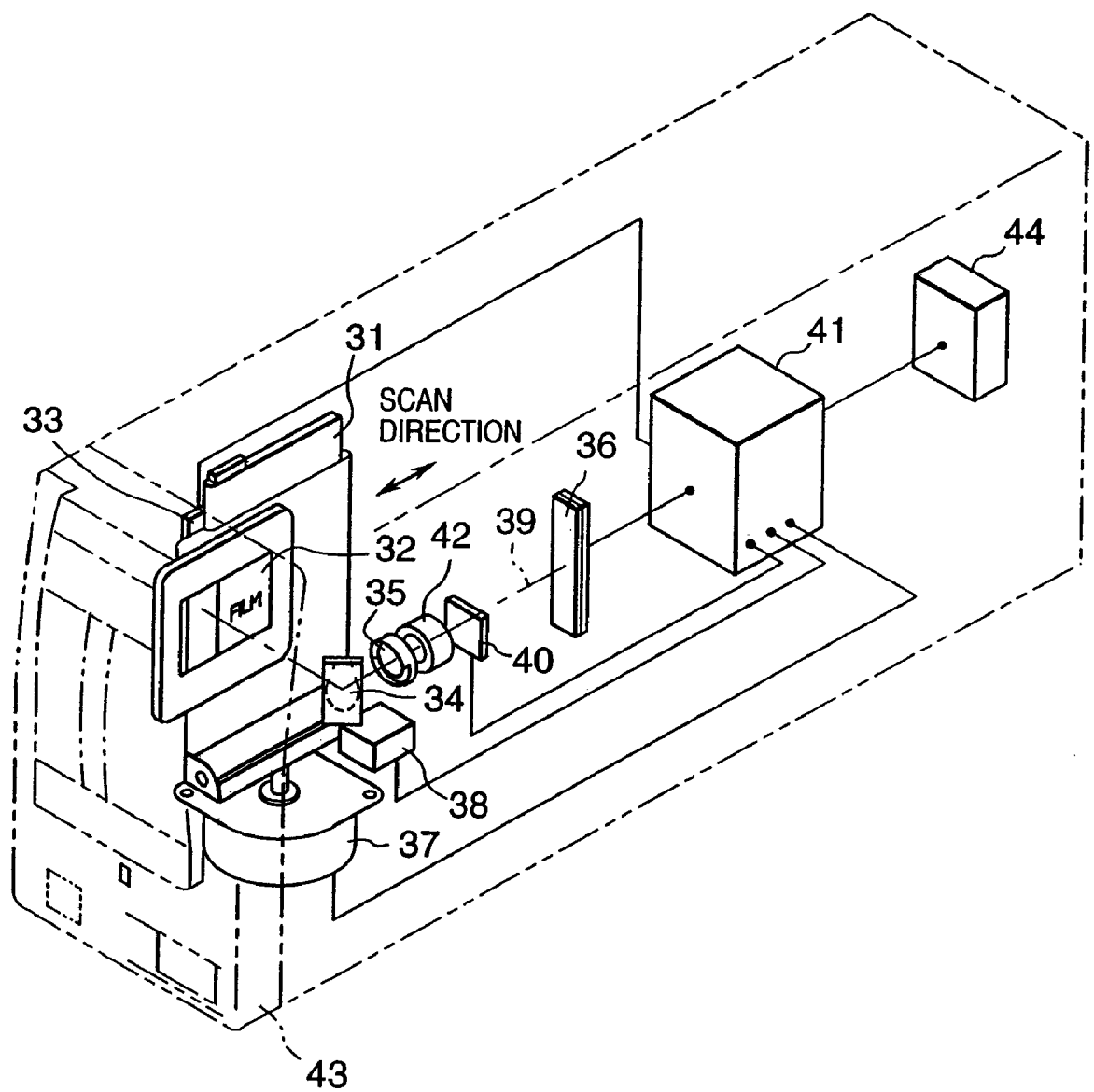
FIG. 8 is a perspective view showing principal part of a film scanner according to the third embodiment of the present invention.
Figure 9:
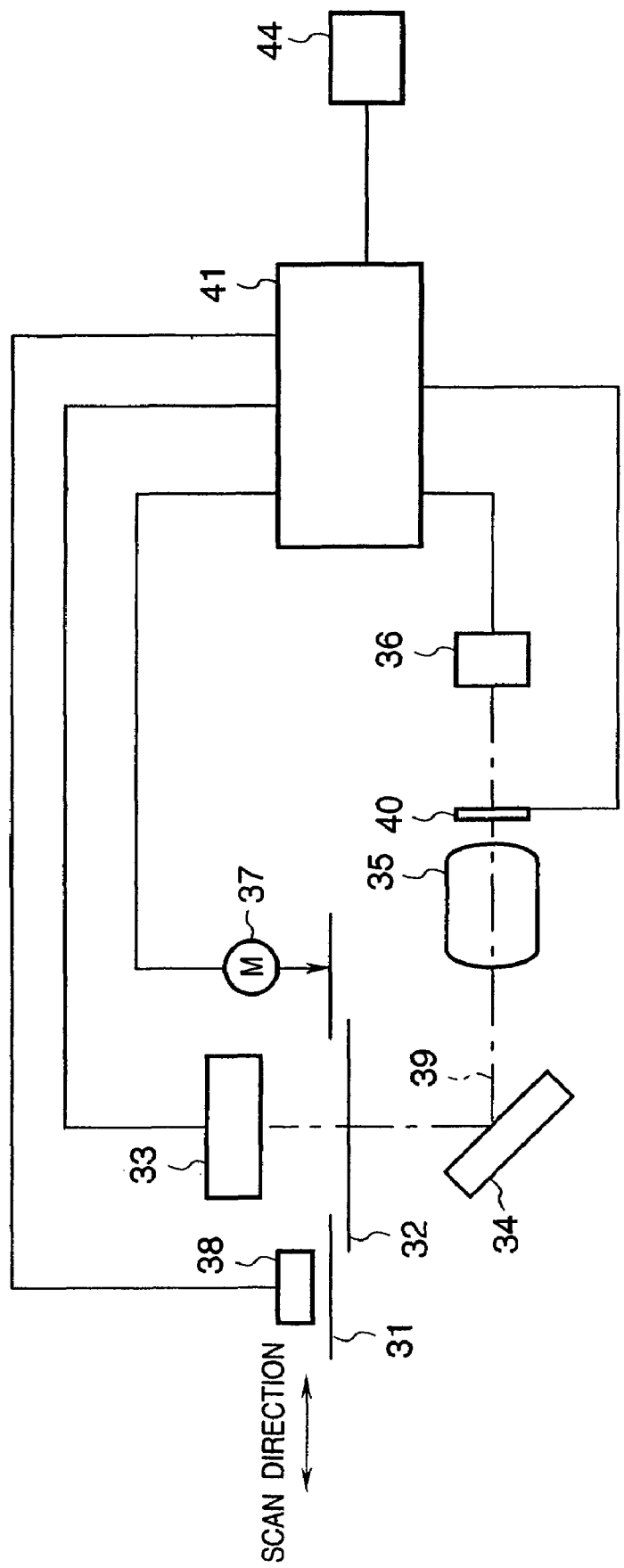
FIG. 9 is a schematic view showing the arrangement of the film scanner shown in FIG. 8.
Figure 10:
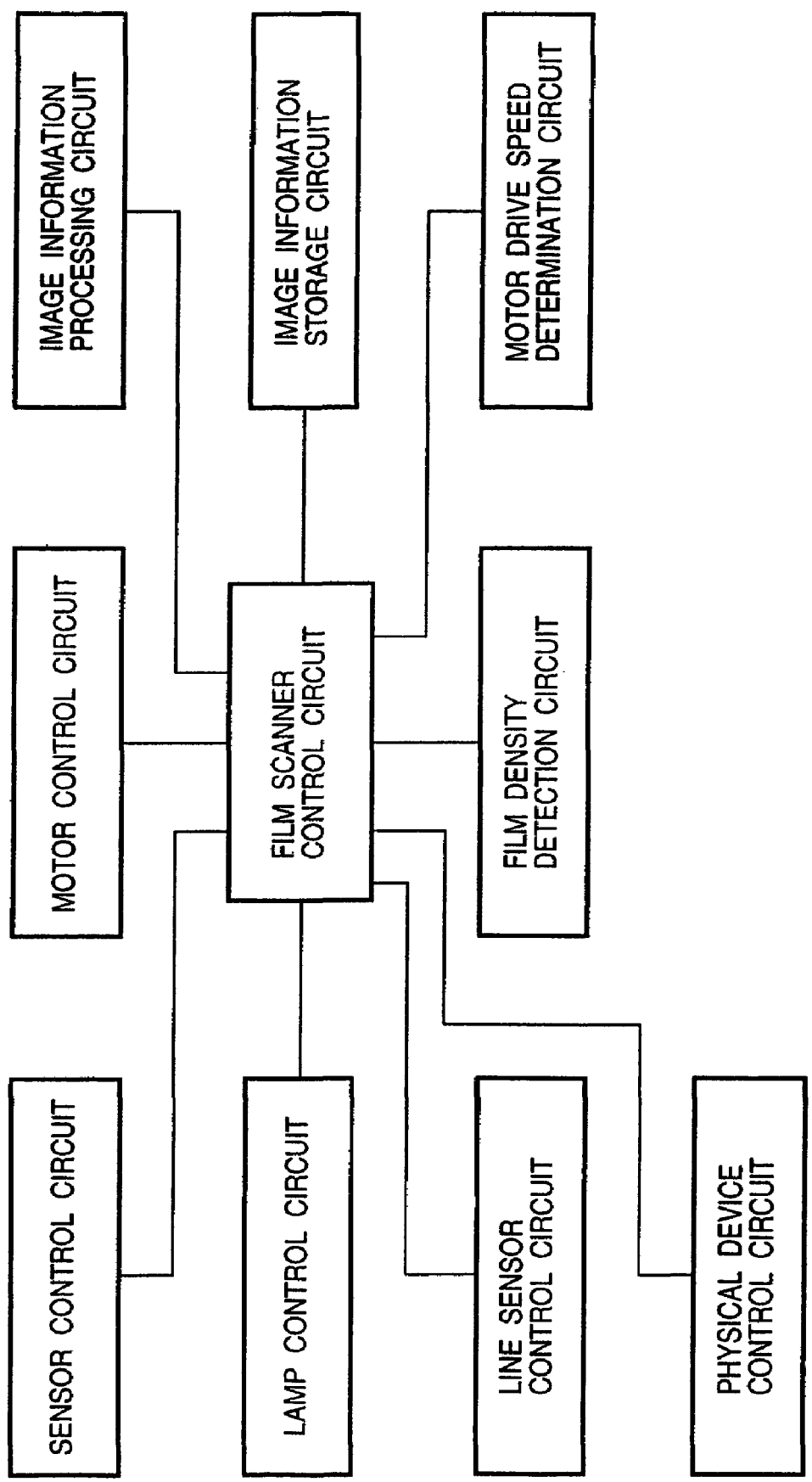
FIG. 10 is a block diagram showing the circuit arrangement of the film scanner shown in FIG. 8.
Figure 11:
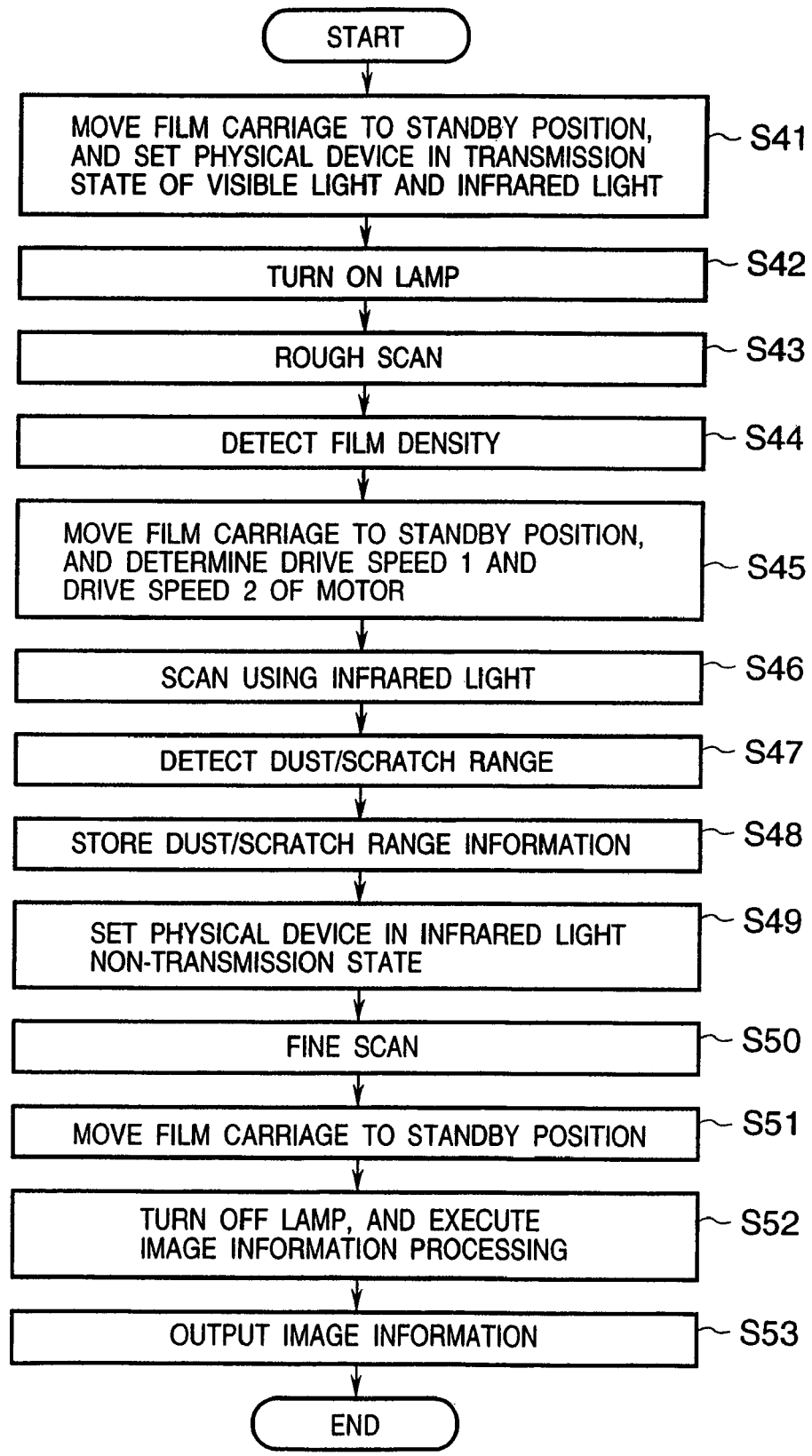
FIG. 11 is a flow chart showing the operation of the film scanner shown in FIG. 8.
Figure 12:
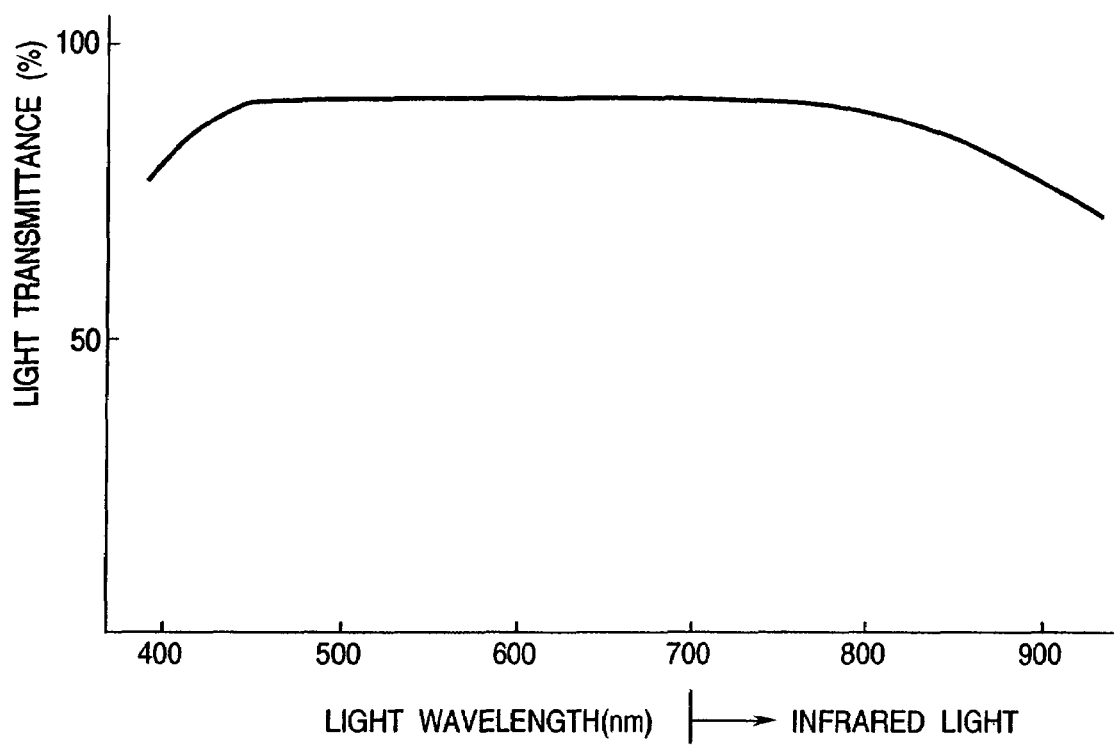
FIG. 12 is a graph showing the spectral transmission characteristics of a physical device used in the third embodiment in a transmission state of visible light and infrared light.
Figure 13:
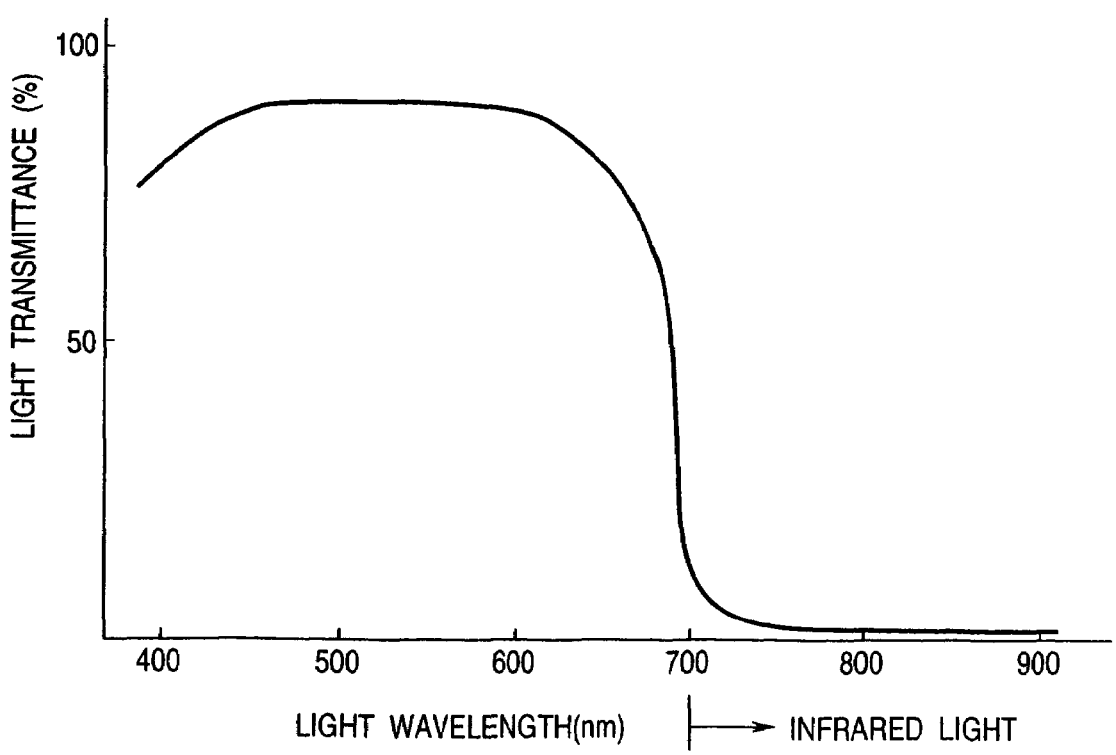
FIG. 13 is a graph showing the spectral transmission characteristics of a physical device used in the third embodiment in a non-transmission state of infrared light.

FIG. 8 is a perspective view showing principal part of a film scanner according to the third embodiment, FIG. 9 is a schematic view showing the arrangement of the film scanner shown in FIG. 8, FIG. 10 is a block diagram showing the circuit arrangement of the film scanner shown in FIG. 8, FIG. 11 is a flow chart showing the operation of the film scanner shown in FIG. 8, FIG. 12 is a graph showing the spectral transmission characteristics of a physical device used in this embodiment in the transmission state of visible light and infrared light, and FIG. 13 is a graph showing the spectral transmission characteristics of a physical device used in this embodiment in the non-transmission state of infrared light.

Referring to FIGS. 8 to 12, reference numeral 31 denotes a film carriage used as a platen; and 32, a developed film which is fixed on the film carriage 31. Reference numeral 33 denotes a lamp serving as a light source of visible light and infrared light. The lamp 33 has emission characteristics ranging from the visible light wavelength range to the infrared wavelength. Reference numeral 34 denotes a mirror; 35, a lens; and 36, a line sensor comprising, e.g., a CCD and the like. Light emitted by the lamp 33 is transmitted through the film 32, is reflected by the mirror 34, and forms an image on the line sensor 36. The line sensor 36 has three light-receiving areas, i.e., R, G, and B light-receiving areas, which are respectively sensitive to red, green, and blue light wavelengths, and at least one of which is also sensitive to infrared light (IR). Reference numeral 37 denotes a motor for moving the film carriage 31 in the scan direction (the direction of the arrow in FIGS. 8 and 9); 38, a sensor for detecting the position of the film carriage 31; 39, an optical axis extending from the lamp 33 to the line sensor 36; and 40, a physical device such as electrochromic device whose visible and infrared light transmittances can be controlled electrically. Reference numeral 41 denotes a control circuit; 42, a lens holder for holding the lens 35; 43, an outer case of the film scanner; and 44, an input/output terminal.

The lamp 33, line sensor 36, motor 37, sensor 38, physical device 40, and input/output terminal 44 are electrically connected to the control circuit 41. The control circuit 41 comprises a film scanner control circuit, sensor control circuit, physical device control circuit, motor control circuit, image information processing circuit, lamp control circuit, line sensor control circuit, film density detection circuit, motor drive speed determination circuit, and image information storage circuit, as shown in FIG. 10.

An image information scanning method of the film 32 will be described below with reference to the flow chart in FIG. 11.

Upon receiving a film scan command from an external device via the input/output terminal 44, the sensor 38 and sensor control circuit detect the position of the film carriage 31, and that information is sent to the film scanner control circuit. The motor control circuit drives the motor 37 at a predetermined drive speed to set the film carriage 31 at a predetermined standby position, thus moving the film carriage 31 to the standby position. At the same time, the physical device control circuit sets the spectral transmission characteristics of the physical device 40 in the transmission state of visible light and infrared light shown in FIG. 12 (S41). The lamp control circuit turns on the lamp 33 (S42), and the motor control circuit rotates the motor 37 in a predetermined direction at a predetermined speed to scan the image range on the film 32 at the predetermined speed in the film surface direction, thus making a rough scan to obtain image information of the film 32 by visible light and infrared light (S43). During the rough scan, the line sensor 36 sends an output signal (image information) to the image information processing circuit via the line sensor control circuit, and the film density detection circuit detects the visible light and infrared light transmittances of the film 32, i.e., the film density on the basis of this information (S44). When the film carriage 31 is returned to its standby position and the rough scan is completed, the motor drive speed determination circuit determines drive speed 1 of the motor 37 for a scan using infrared light and drive speed 2 of the motor 37 for a fine scan using visible light on the basis of the detected film density of the entire film, so as to obtain images with appropriate amounts of light (S45). The motor control circuit rotates the motor 37 in a predetermined direction at drive speed 1 determined previously so as to scan the image range of the film 32 in the film surface direction, thus making a scan for obtaining image information of the film 32 by infrared light (S46). During this scan, the line sensor 36 sends an output signal (image information) to the image information processing circuit via the line sensor control circuit to detect the infrared light transmission state, i.e., a region on the film 32 where the transmittance of the infrared light is different from the remaining region by a predetermined value or more, thus detecting any dust/scratch range on the film 32 (S47). The dust/scratch range information is sent to and stored in the image information storage circuit (S48). Upon completion of the scan for obtaining the image information, i.e., the dust/scratch range information of the film 32 by infrared light, the physical device control circuit sets the spectral transmission characteristics of the physical device 40 in the infrared light non-transmission state shown in FIG. 13 (S49). The motor control circuit rotates the motor 37 in the reverse direction at drive speed 2 determined previously, thus making a fine scan (S50). During this fine scan, the line sensor 36 sends an output signal (image information) to the image information processing circuit via the line sensor control circuit. Upon completion of image scanning for the fine scan, the motor control circuit rotates the motor 37 at a predetermined drive speed to return the film carriage 31 to its standby position (S51). In this manner, upon completion of the fine scan, the lamp control circuit turns off the lamp 33, and at the same time, the image information storage circuit sends the dust/scratch range information to the image information processing circuit, which executes image information processing for correcting the dust/scratch range of image information of the film 32 obtained by the fine scan (visible light) (S52). The image information is then output from the input/output terminal 44 (S53), thus ending film image scanning of the film scanner.

As in the first embodiment, since the scan using the infrared light need only detect the region of the film 32 where the infrared light transmittance is different from other regions, i.e., the dust/scratch range, the output signal level of the line sensor 36 can be lower than that in the visible light scan as long as that range can be detected. On the other hand, since the visible light scan is to obtain higher-quality image information than the infrared light scan, the output signal from the line sensor 36 preferably has a largest possible maximum value, and the scan speed is set so that the line sensor 36 can obtain a sufficient exposure amount. Therefore, the exposure amount of the line sensor 36 per unit time in one resolution limit line is decreased to decrease the output signal level in the infrared light scan, and the scan speed is set high to detect the region whose infrared light transmittance is different from other regions. For this reason, drive speed 1 is set to be higher than drive speed 2, and the infrared scan can be completed within a shorter period of time than the visible light scan.

When the infrared light emission intensity of the lamp 33 is smaller than its visible light emission intensity, the line sensor 36 can use a line sensor which has the spectral sensitivity characteristics shown in, e.g., FIG. 5 (in FIG. 5, R, G, and B represent the spectral sensitivity characteristics for visible light, and IR represents those for infrared light), i.e., has higher sensitivity to infrared light than to visible light.

On the other hand, when the infrared light sensitivity of the line sensor 36 is lower than the visible light sensitivity, the lamp 33 can use a lamp having the emission spectrum distribution shown in, e.g., FIG. 6, i.e., having a higher emission intensity of infrared light than visible light.

Furthermore, the dust/scratch range information on the film 32 and the image information of the film 32 obtained by visible light may be separately output from the input/output terminal 44, and a device (not shown) connected to the input/output terminal 44 may execute image information processing for correcting the dust/scratch range from the image information of the film 32 obtained by visible light.

In addition, the scan for obtaining image information of the film 32 by infrared light may be made in reciprocal motion of the film carriage 31 in the rough scan in place of that of the film carriage 31 in the fine scan. At this time, a scan for obtaining image information of the film 32 by infrared light is made after the rough scan.

Moreover, an operation mode that skips the infrared light scan and makes only a scan for obtaining image information of the film 32 by visible light may be provided as one of operation modes to be selected. With this mode, when a film which has less dust or scratches is to be scanned, or when no dust/scratch correction of an output image is required, the time required for the image information processing for obtaining image information of the film 32 by visible light can be shortened by skipping the image information processing for correcting the dust/scratch range of the image information of the film 32.

Modification of First to Third Embodiments

As a modification of the first to third embodiments, a modification for scanning image information on a photographic film will be explained below with reference to FIGS. 14 to 17.

Figure 14:
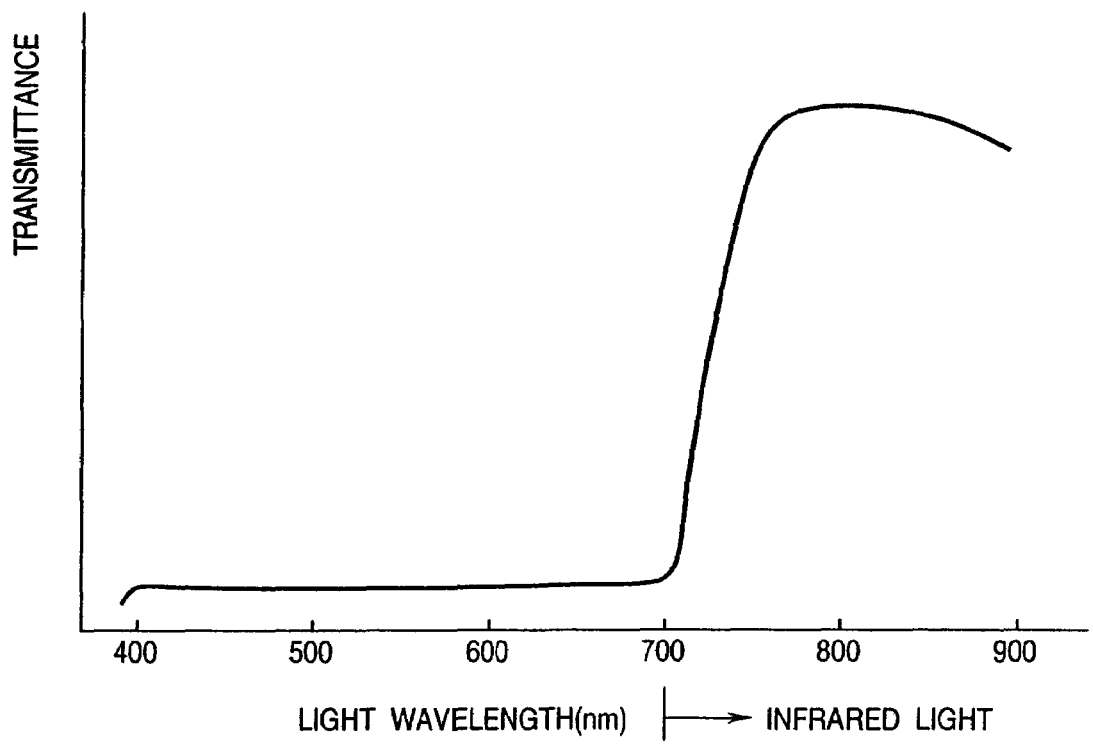
FIG. 14 is a graph showing the spectral transmission characteristics of an overexposed negative film.
Figure 15:
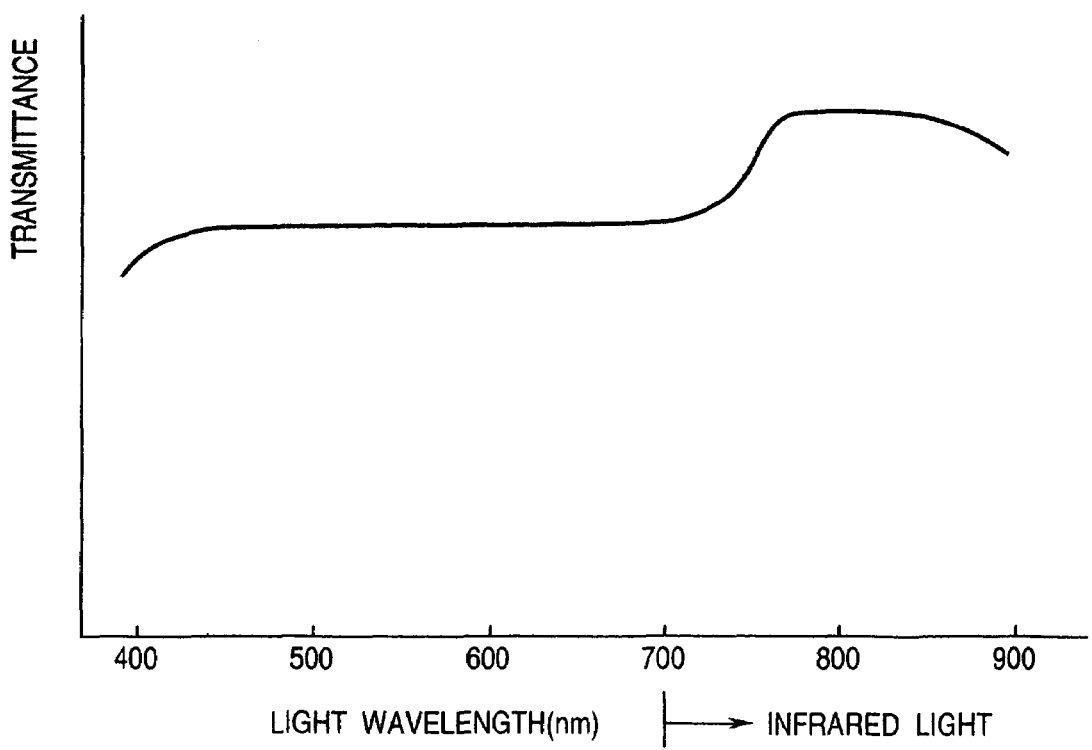
FIG. 15 is a graph showing the spectral transmission characteristics of an underexposed negative film.
Figure 16:
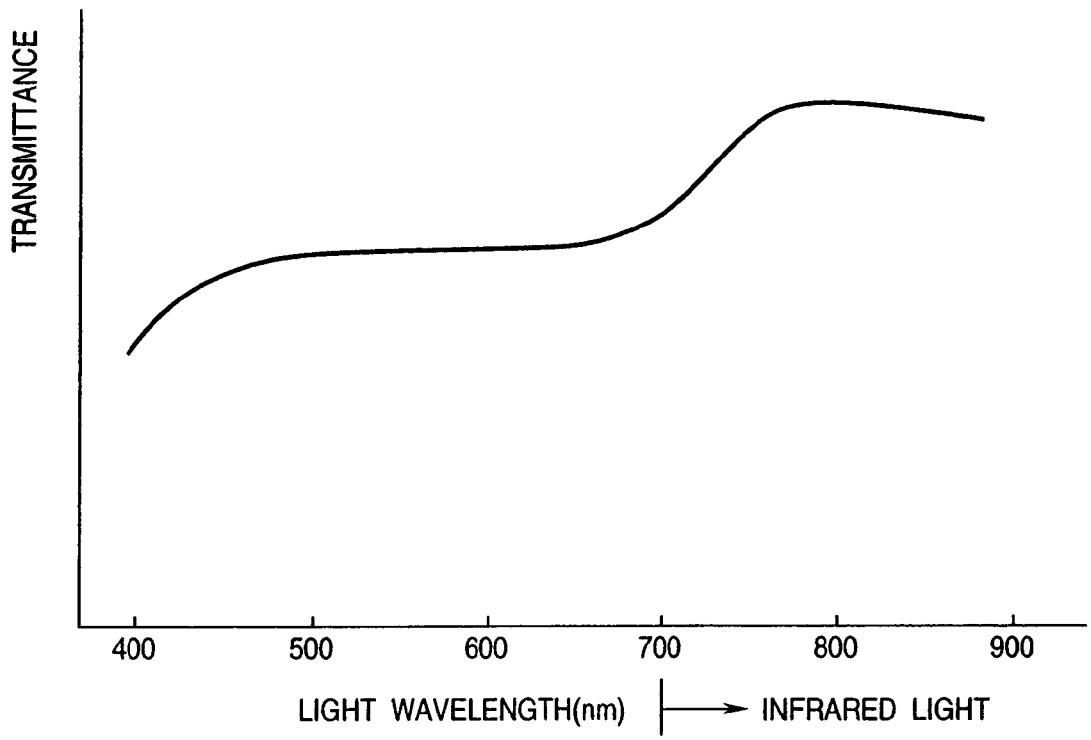
FIG. 16 is a graph showing the spectral transmission characteristics of an overexposed positive film.
Figure 17:
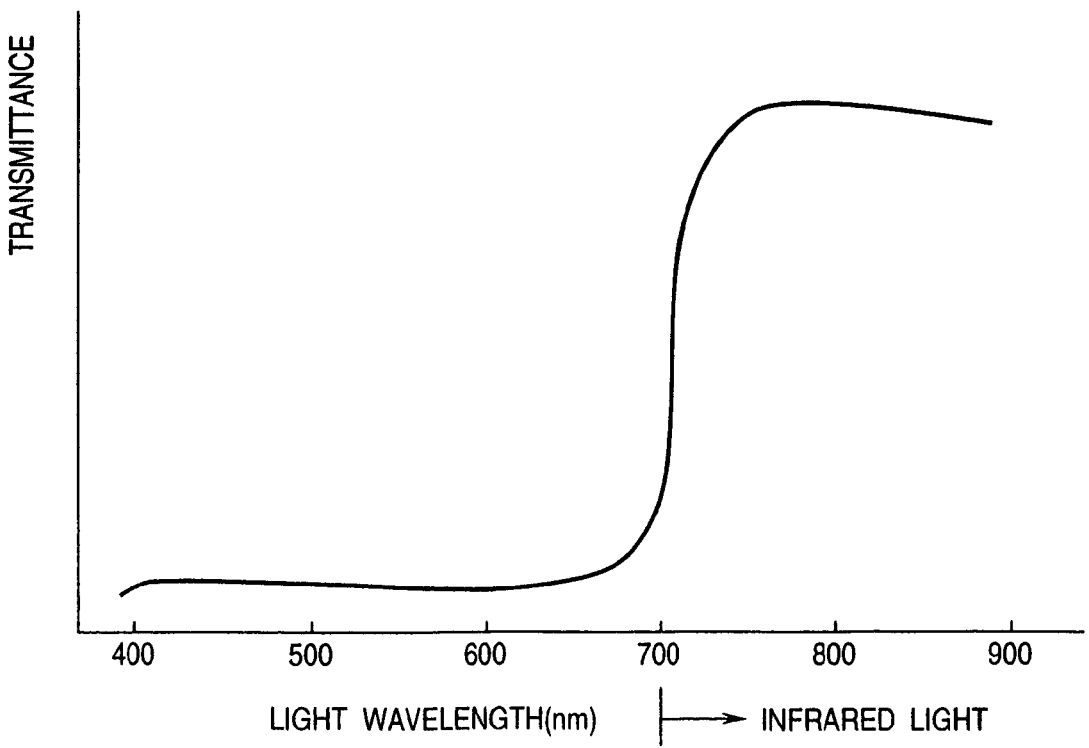
FIG. 17 is a graph showing the spectral transmission characteristics of an underexposed positive film.

FIG. 14 is a graph showing the spectral transmission characteristics of an overexposed negative film, FIG. 15 is a graph showing the spectral transmission characteristics of an underexposed negative film, FIG. 16 is a graph showing the spectral transmission characteristics of an overexposed positive film, and FIG. 17 is a graph showing the spectral transmission characteristics of an underexposed positive film.

Even when a developed photographic negative film appears opaque due to overexposure, i.e., has a low visible light transmittance, it has a high infrared light transmittance, as shown in FIG. 14. On the other hand, even when a developed photographic negative film appears transparent due to underexposure, i.e., has a high visible light transmittance, it has a higher infrared light transmittance than that of visible light, as shown in FIG. 15. In addition, the infrared light transmittance remains nearly the same independently of overexposure or underexposure. Likewise, even when a developed photographic positive film appears transparent due to overexposure, i.e., has a high visible light transmittance, it has a higher infrared light transmittance than that of visible light, as shown in FIG. 16. Also, even when a developed photographic positive film appears opaque due to underexposure, i.e., has a low visible light transmittance, it has a high infrared light transmittance, as shown in FIG. 17. In addition, the infrared light transmittance remains nearly the same independently of overexposure or underexposure. For this reason, upon scanning image information on a photographic film, a scan using infrared light may be made at a predetermined drive speed of the motor. Also, at this time, the predetermined drive speed of the motor for the scan using infrared light is set to be higher than that of the motor for a scan using visible light, which is determined by the film density detected by the density sensor of the first and second embodiments or the rough scan of the third embodiment.

As can be seen from the above description, upon scanning image information on a photographic film, the time required for scanning image information with infrared light can be easily set to be shorter than that required for scanning image information with visible light.

Fourth Embodiment

The fourth embodiment of the present invention will be explained below using FIGS. 18 to 23.

Figure 18:
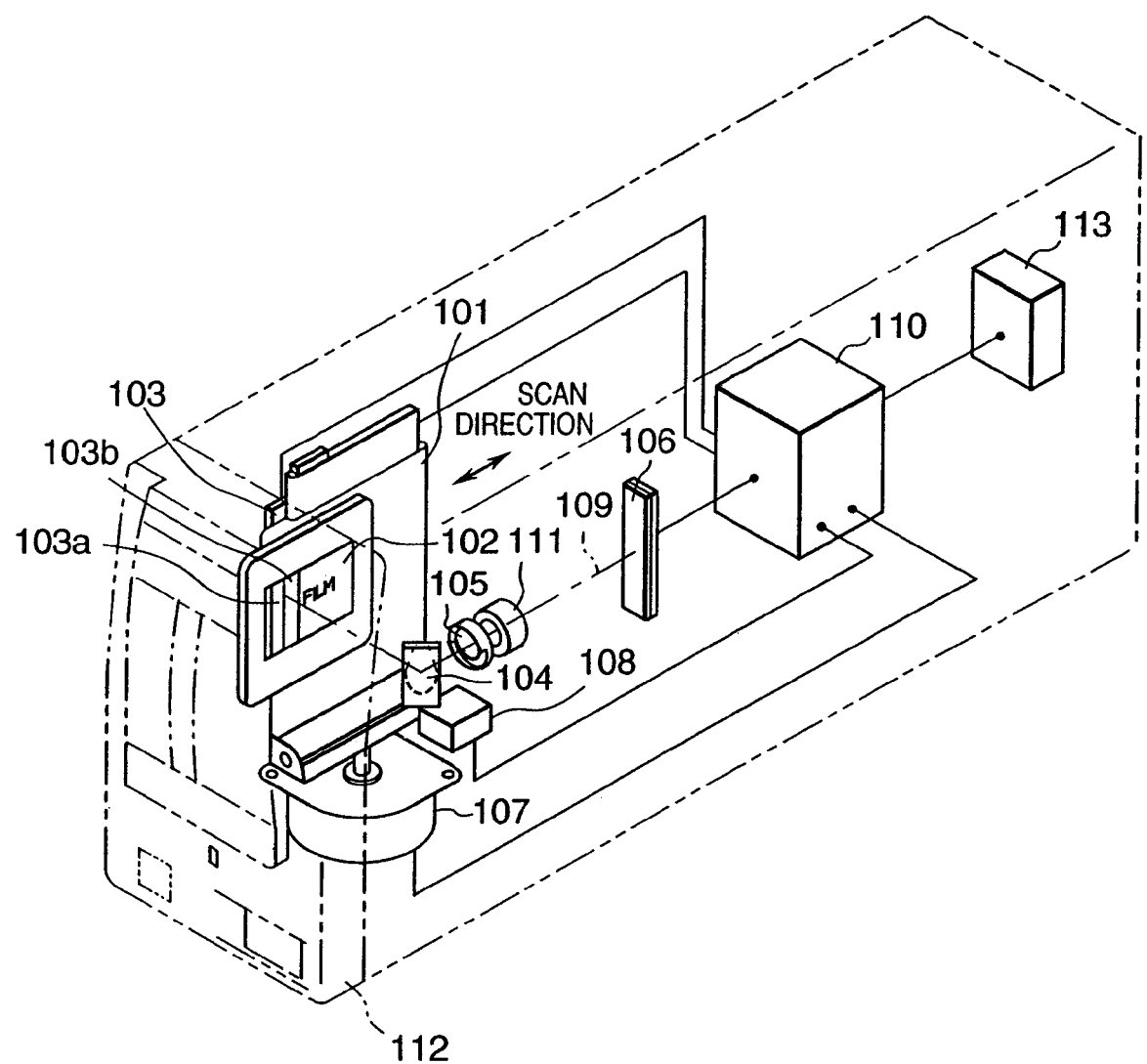
FIG. 18 is a perspective view showing principal part of a film scanner according to the fourth embodiment of the present invention.
Figure 19:
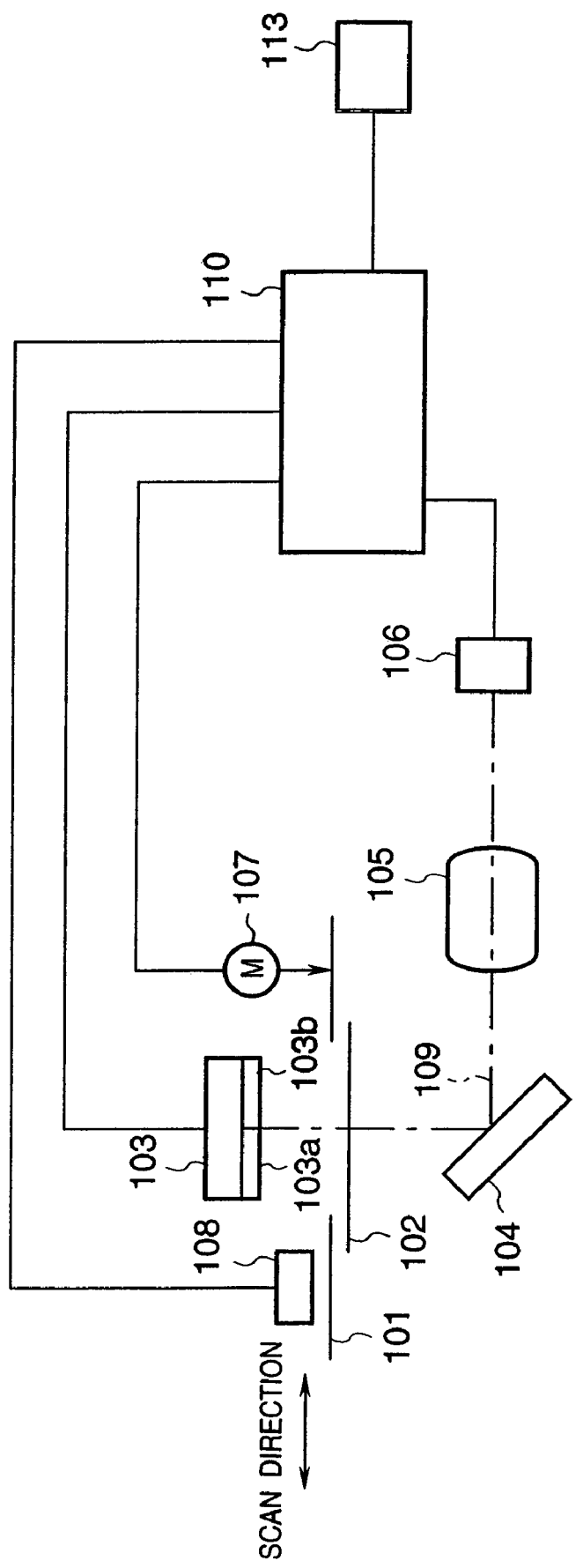
FIG. 19 is a schematic view showing the arrangement of the film scanner shown in FIG. 18.
Figure 20:
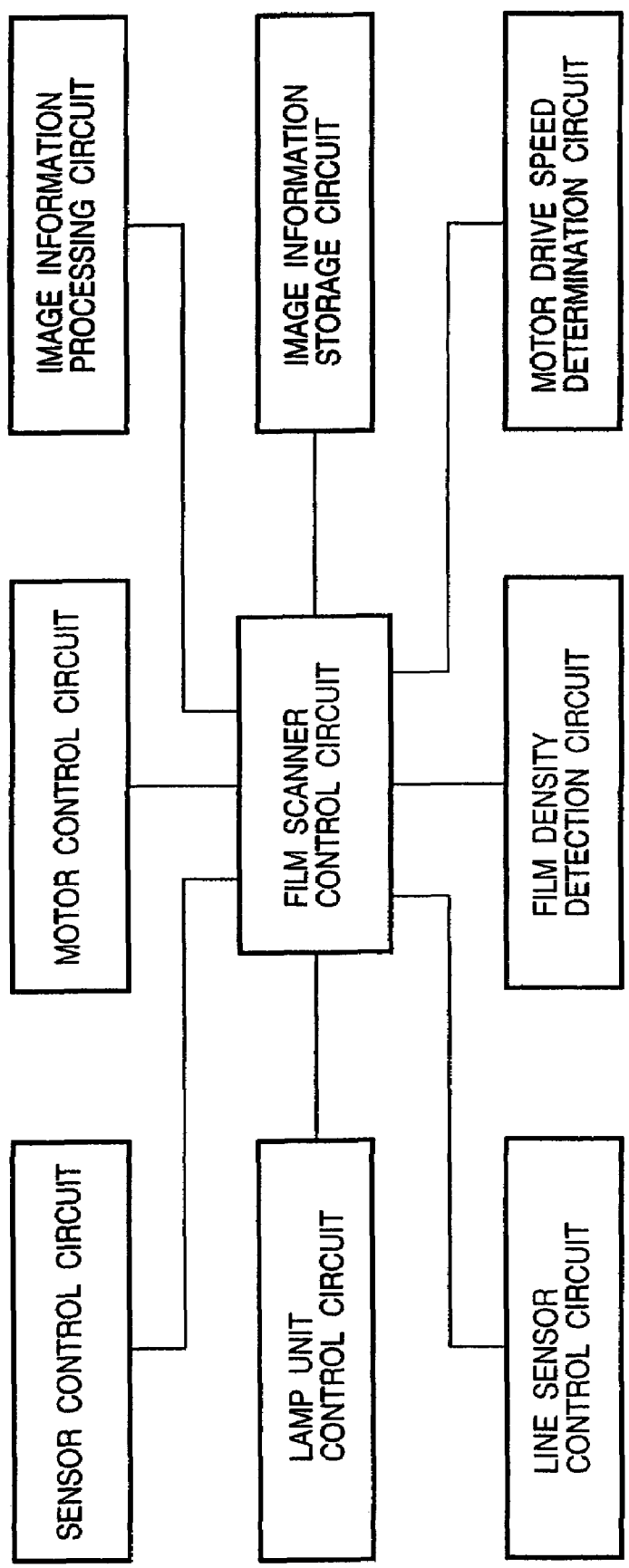
FIG. 20 is a block diagram showing the circuit arrangement of the film scanner shown in FIG. 18.
Figure 21:
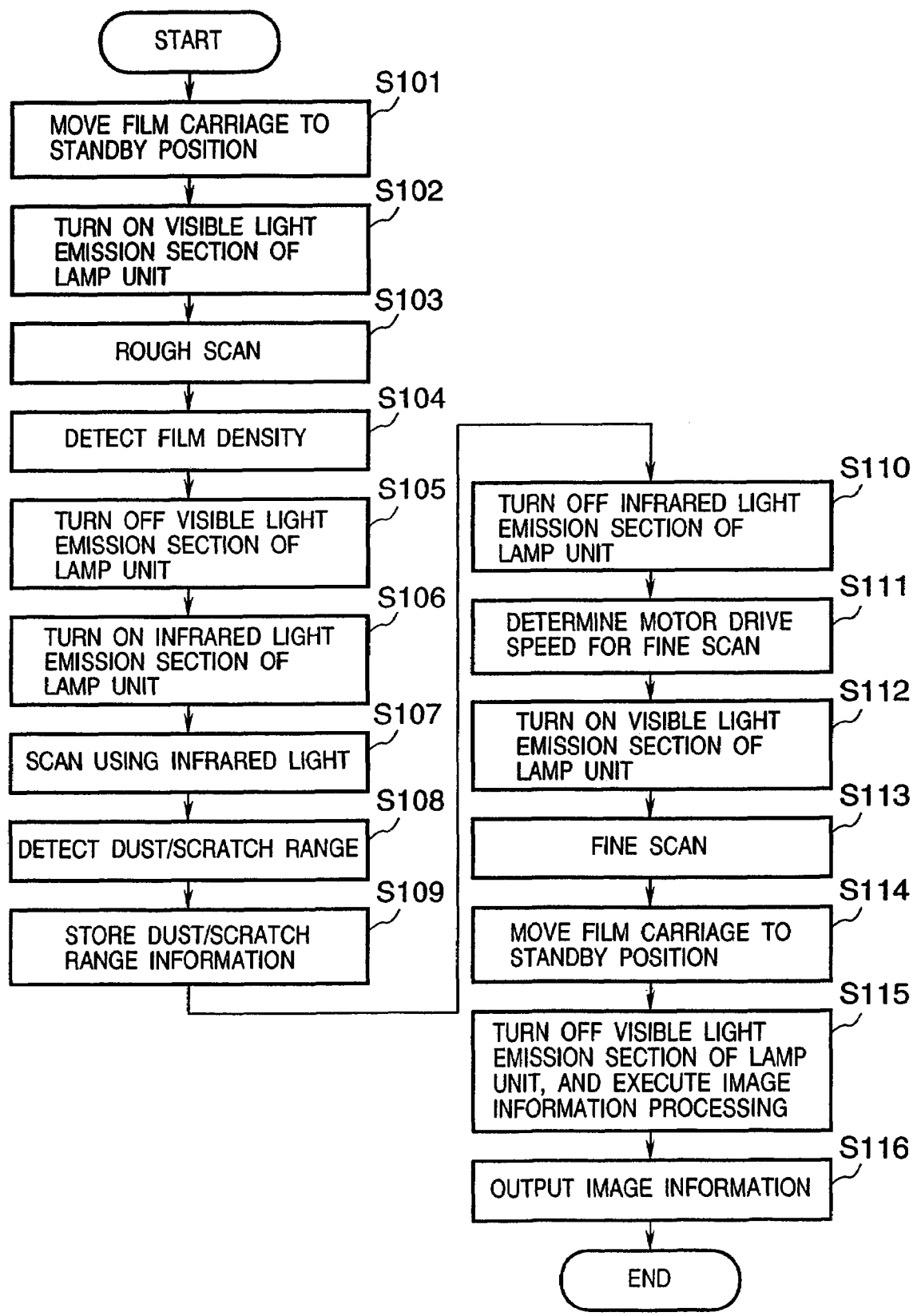
FIG. 21 is a flow chart showing the operation of the film scanner shown in FIG. 18.
Figure 22:
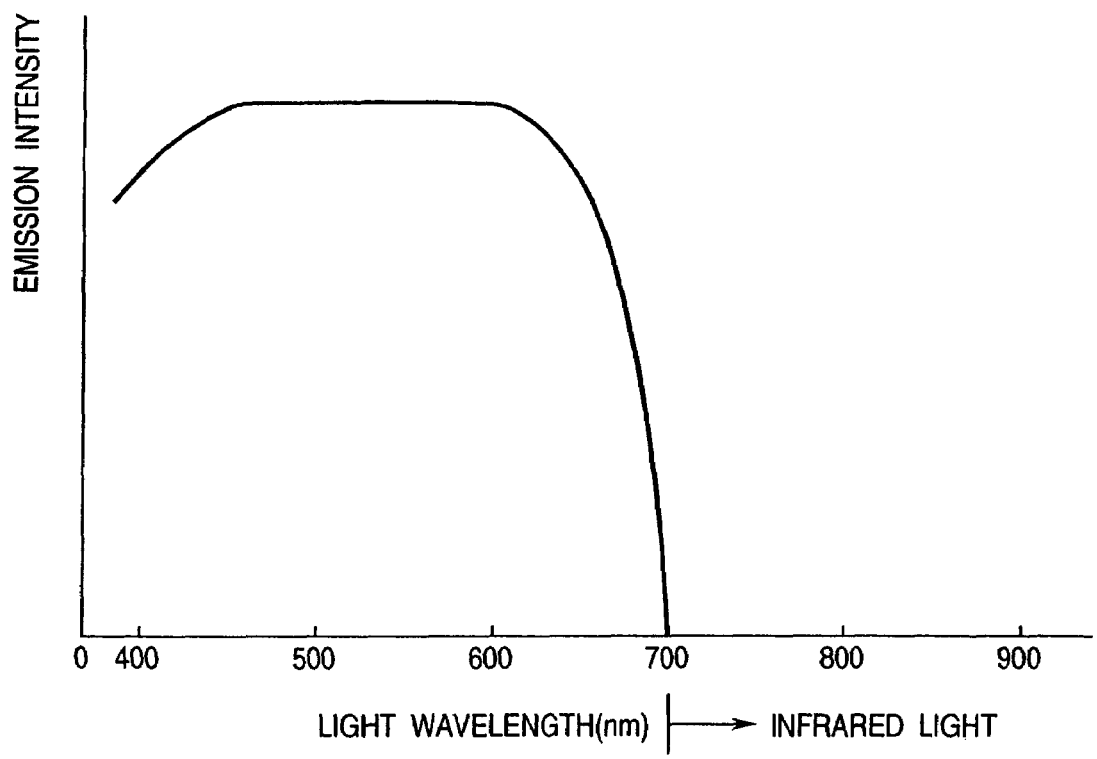
FIG. 22 is a graph showing the emission spectrum intensity of a visible light emission section of a lamp unit used in the fourth embodiment.
Figure 23:
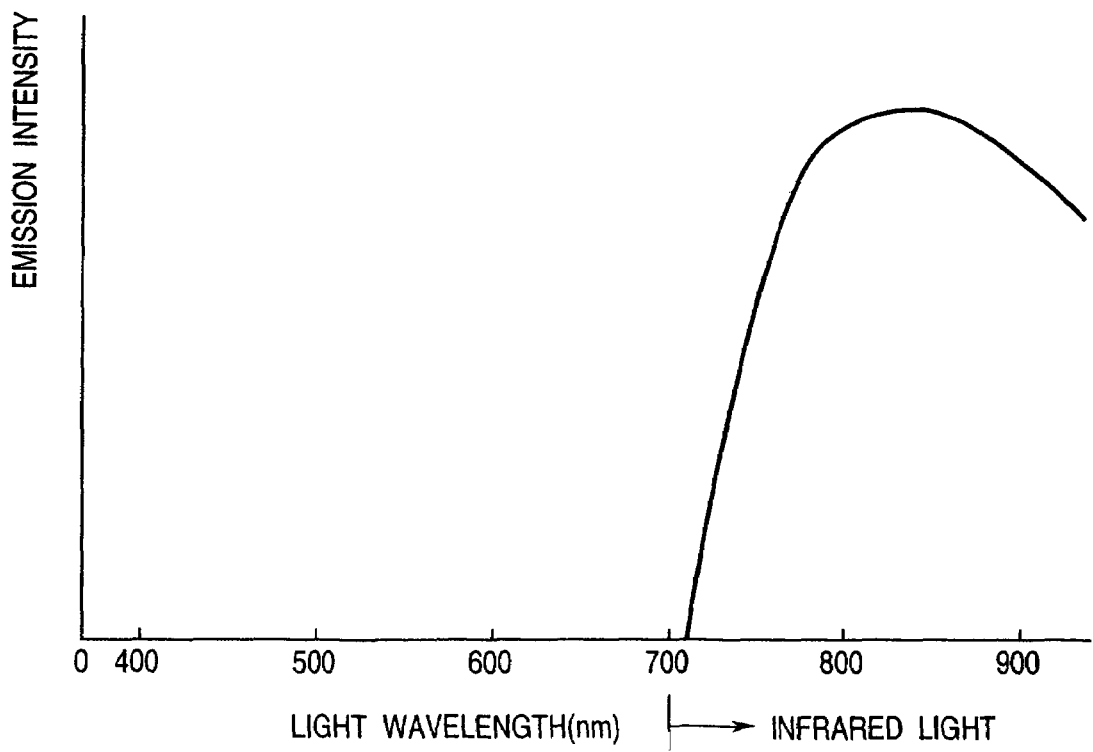
FIG. 23 is a graph showing the emission spectrum intensity of an infrared light emission section of the lamp unit used in the fourth embodiment.

FIG. 18 is a perspective view showing principal part of a film scanner of this embodiment, FIG. 19 is a schematic view showing the arrangement of the film scanner shown in FIG. 18, FIG. 20 is a block diagram showing the circuit arrangement of the film scanner shown in FIG. 18, FIG. 21 is a flow chart showing the operation of the film scanner shown in FIG. 18, FIG. 22 is a graph showing the emission spectrum intensity of a visible light emission section of a lamp unit used in this embodiment, and FIG. 23 is a graph showing the emission spectrum intensity of an infrared light emission section of the lamp unit used in this embodiment.

Referring to FIGS. 18 to 20, reference numeral 101 denotes a film carriage used as a platen; and 102, a developed film which is fixed on the film carriage 101. Reference numeral 103 denotes a lamp unit which is constructed by a visible light emission section 103a having the emission spectrum intensity distribution shown in FIG. 22 and an infrared light emission section 103b having the emission spectrum intensity distribution shown in FIG. 23. Reference numeral 104 denotes a mirror; 105, a lens; and 106, a line sensor comprising, e.g., a CCD and the like. Light emitted by the lamp unit 103 is transmitted through the film 102, is reflected by the mirror 104, and forms an image on the line sensor 106. The line sensor 106 has three light-receiving areas, i.e., R, G, and B light-receiving areas, which are respectively sensitive to red, green, and blue light wavelengths, and at least one of which is also sensitive to infrared light. Reference numeral 107 denotes a motor for moving the film carriage 101 in the scan direction (the direction of the arrow in FIGS. 18 and 19); 108, a sensor for detecting the position of the film carriage 101; 109, an optical axis extending from the lamp 103 to the line sensor 106; 110, a control circuit; 111, a lens holder for holding the lens 105; 112, an outer case of the film scanner; and 113, an input/output terminal.

The lamp unit 103, line sensor 106, motor 107, sensor 108, and input/output terminal 113 are electrically connected to the control circuit 110. The control circuit 110 comprises a film scanner control circuit, sensor control circuit, motor control circuit, image information processing circuit, lamp unit control circuit, line sensor control circuit, film density detection circuit, motor drive speed determination circuit, and image information storage circuit, as shown in FIG. 20.

An image information scanning method of the film 102 will be explained below with reference to the flow chart in FIG. 21.

Upon receiving a film scan command from an external device via the input/output terminal 113, the sensor 108 and sensor control circuit detect the position of the film carriage 101, and that information is sent to the film scanner control circuit. The motor control circuit drives the motor 107 to set the film carriage 101 at a predetermined standby position, thus moving the film carriage 101 to the standby position (see S101; the same applies to the following description). The lamp unit control circuit turns on the visible light emission section 103a of the lamp unit 103 (S102), and the motor control circuit rotates the motor 107 in a predetermined direction at a predetermined drive speed, thus making a rough scan for obtaining image information of the film 102 by visible light (S103). During the rough scan, the line sensor 106 sends image information to the image information processing circuit via the line sensor control circuit, and the film density detection circuit detects the light transmittance of the film 102, i.e., the film density on the basis of that information (S104). Upon completion of image scanning for the rough scan, the lamp control unit turns off the visible light emission section 103a of the lamp unit 103 (S105), and then turns on the infrared light emission section 103b of the lamp unit 103 (S106). The motor drive circuit rotates the motor 107 in the reverse direction at a predetermined speed to make a scan for obtaining image information of the film 102 by infrared light (S107). During this scan, the line sensor 106 sends image information to the image information processing circuit via the line sensor control circuit to detect the infrared light transmission state, i.e., a region on the film 102 where the transmittance of the infrared light is different from the remaining region by a predetermined value or more, thus detecting any dust/scratch range on the film 102 (S108). The dust/scratch range information is sent to and stored in the image information storage circuit (S109). Upon completion of the scan for obtaining the image information, i.e., the dust/scratch range information of the film 102 by infrared light, the lamp unit control circuit turns off the infrared light emission section 103b of the lamp unit 103 (S110), and the motor drive speed determination circuit determines the motor drive speed in a fine scan to obtain an image with an appropriate amount of light on the basis of the film density of the entire film detected in the rough scan made previously (S111). The lamp control unit turns on the visible light emission section 103a of the lamp unit 103 (S112). The motor control circuit rotates the motor 107 at the determined motor drive speed in a predetermined direction to make a fine scan (S113). During this fine scan, the line sensor 106 sends image information to the image information processing circuit via the line sensor control circuit. Upon completion of image scanning for the fine scan, the film carriage 101 is returned to its standby position (S114). In this manner, upon completion of the fine scan, the lamp unit control circuit turns off the visible light emission section 103a of the lamp unit 103, and at the same time, the image information storage circuit sends the dust/scratch range information to the image information processing circuit, which executes image information processing for correcting the dust/scratch range of image information of the film 102 obtained by the fine scan (visible light) (S115). The image information is then output from the input/output terminal 113 (S116), thus ending film image scanning of the film scanner.

When the scan using infrared light is made at the same resolution as that in the rough scan in which the resolution is lower than that in the fine scan, or it is made at a resolution lower than that in the fine scan, the storage capacity (memory size) of a storage means can be reduced compared to a case wherein that scan is made at the same resolution as that in the fine scan and, at the same time, the time required for the scan using infrared light can be shortened. More specifically, upon scanning image information in the fine scan, an image quality proportional to the scan resolution can be obtained. However, since the scan using infrared light is to obtain dust/scratch range information on the film and to correct image information obtained in the fine scan, it need only specify the dust/scratch range on the film and can achieve its objective (to obtain the dust/scratch range information on the film) even when its resolution is lower than that in the fine scan. For this reason, when the scan resolution in the scan using infrared light is set to be equal to that in the rough scan or to be lower than that in the fine scan, the storage capacity (memory size) of the storage means can be reduced compared to a case wherein that scan is made at the same resolution as that in the fine scan. At the same time, when a low scan resolution is set, the motor 107 can be driven at a higher drive speed (since sampling in the scan can be made coarser) and, hence, the time required for the scan using infrared light can be shortened.

The scan for obtaining image information of the film 102 using infrared light (infrared light scan) may be made before the rough scan in place of the above-mentioned timing.

Also, the dust/scratch range information on the film 102 and the image information of the film 102 obtained by visible light may be separately output from the input/output terminal 113, and a device (not shown) connected to the input/output terminal 113 may execute image information processing for correcting the dust/scratch range from the image information of the film 102 obtained by visible light.

Furthermore, an operation mode that skips the infrared light scan and makes only a scan for obtaining image information of the film 102 by visible light may be provided as one of operation modes to be selected. With this mode, when a film which has less dust or scratches is to be scanned, or when no dust/scratch correction of an output image is required, the time required for the image information processing for obtaining image information of the film 102 by visible light can be shortened by skipping the image information processing for correcting the dust/scratch range of the image information of the film 102.

Fifth Embodiment

Figure 24:
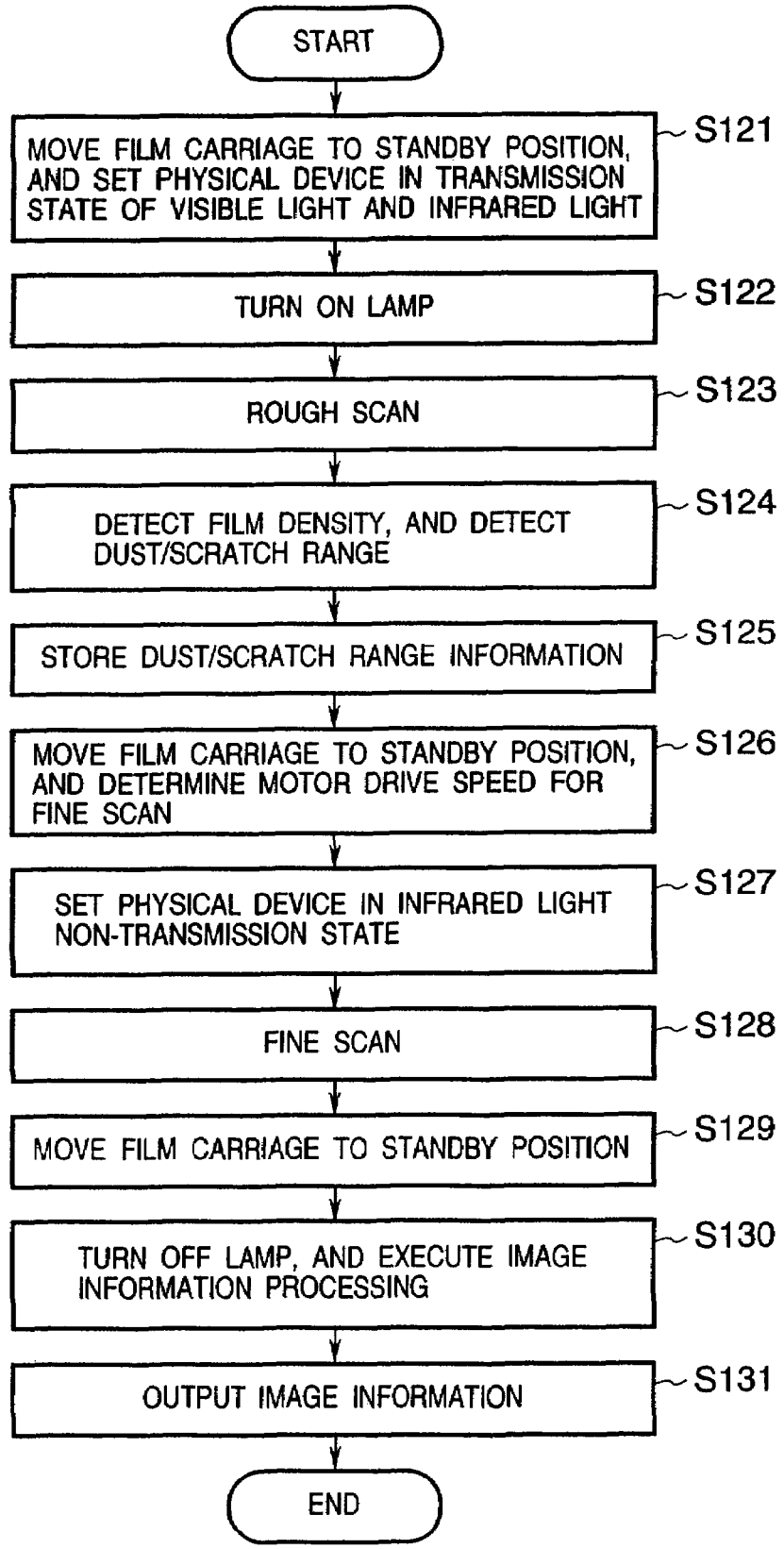
FIG. 24 is a flow chart in the fifth embodiment for controlling the operation of the film scanner shown in FIG. 8.

The fifth embodiment of the present invention will be explained below with reference to FIG. 24, and FIGS. 8 to 10 and FIGS. 12 and 13 used in the description of the third embodiment. FIG. 24 is a flow chart in this embodiment for controlling the operation of the film scanner shown in FIG. 8.

An image information scanning method of the film 32 will be explained below with reference to the flow chart in FIG. 24. Note that reference numerals used in the following description are common to those in the third embodiment, and a detailed description thereof will be omitted.

Upon receiving a film scan command from an external device via the input/output terminal 44, the sensor 38 and sensor control circuit detect the position of the film carriage 31, and that information is sent to the film scanner control circuit. The motor control circuit drives the motor 37 at a predetermined drive speed to set the film carriage 31 at a predetermined standby position, thus moving the film carriage 31 to the standby position. At the same time, the physical device control circuit sets the spectral transmission characteristics of the physical device 40 in the transmission state of visible light and infrared light shown in FIG. 12 (S121). The lamp control circuit turns on the lamp 33 (S122), and the motor control circuit rotates the motor 37 in a predetermined direction at a predetermined speed to scan an image range on the film 32 at the predetermined speed in the film surface direction, thus making a rough scan to obtain image information of the film 32 by visible light and infrared light (S123). During the rough scan, the line sensor 36 sends an output signal (image information) to the image information processing circuit via the line sensor control circuit, and the film density detection circuit detects the visible light transmittance of the film 32, i.e., the film density on the basis of this information. Likewise, the image information processing circuit detects the infrared light transmission state, i.e., a region on the film 32 where the transmittance of the infrared light is different from the remaining region by a predetermined value or more, thus detecting any dust/scratch range on the film 32 (S124). The dust/scratch range information is sent to and stored in the image information storage circuit (S125).

When the motor control circuit rotates the motor 37 in the reverse direction at a predetermined drive speed to return the film carriage 31 to its standby position, and the rough scan and the scan for obtaining the dust/scratch range information are completed, the motor drive speed determination circuit determines the drive speed of the motor 37 for a fine scan to obtain an image with an appropriate amount of light on the basis of the detected film density on the entire film (S126). The physical device control circuit then sets the spectral transmission characteristics of the physical device 40 in the infrared light non-transmission state shown in FIG. 13 (S127). The motor control circuit rotates the motor 37 in a predetermined direction at the determined drive speed, thus making a fine scan (S128). During this fine scan, the line sensor 36 sends an output signal (image information) to the image information processing circuit via the line sensor control circuit. Upon completion of image scanning for the fine scan, the motor control circuit rotates the motor 37 at a predetermined drive speed to return the film carriage 31 to its standby position (S129). In this manner, upon completion of the fine scan, the lamp control circuit turns off the lamp 33, and at the same time, the image information storage circuit sends the dust/scratch range information to the image information processing circuit, which executes image information processing for correcting the dust/scratch range of image information of the film 32 obtained by the fine scan (visible light) (S130). The image information is then output from the input/output terminal 44 (S131), thus ending film image scanning of the film scanner.

As in the fourth embodiment, the dust/scratch range information on the film 32 and the image information of the film 32 obtained by visible light may be separately output from the input/output terminal 44, and a device (not shown) connected to the input/output terminal 44 may execute image information processing for correcting the dust/scratch range from the image information of the film 32 obtained by visible light.

Also, an operation mode that skips the infrared light scan and makes only a scan for obtaining image information of the film 32 by visible light may be provided as one of operation modes to be selected. With this mode, when a film which has less dust or scratches is to be scanned, or when no dust/scratch correction of an output image is required, the time required for the image information processing for obtaining image information of the film 32 by visible light can be shortened by skipping the image information processing for correcting the dust/scratch range of the image information of the film 32.

Figure 25:
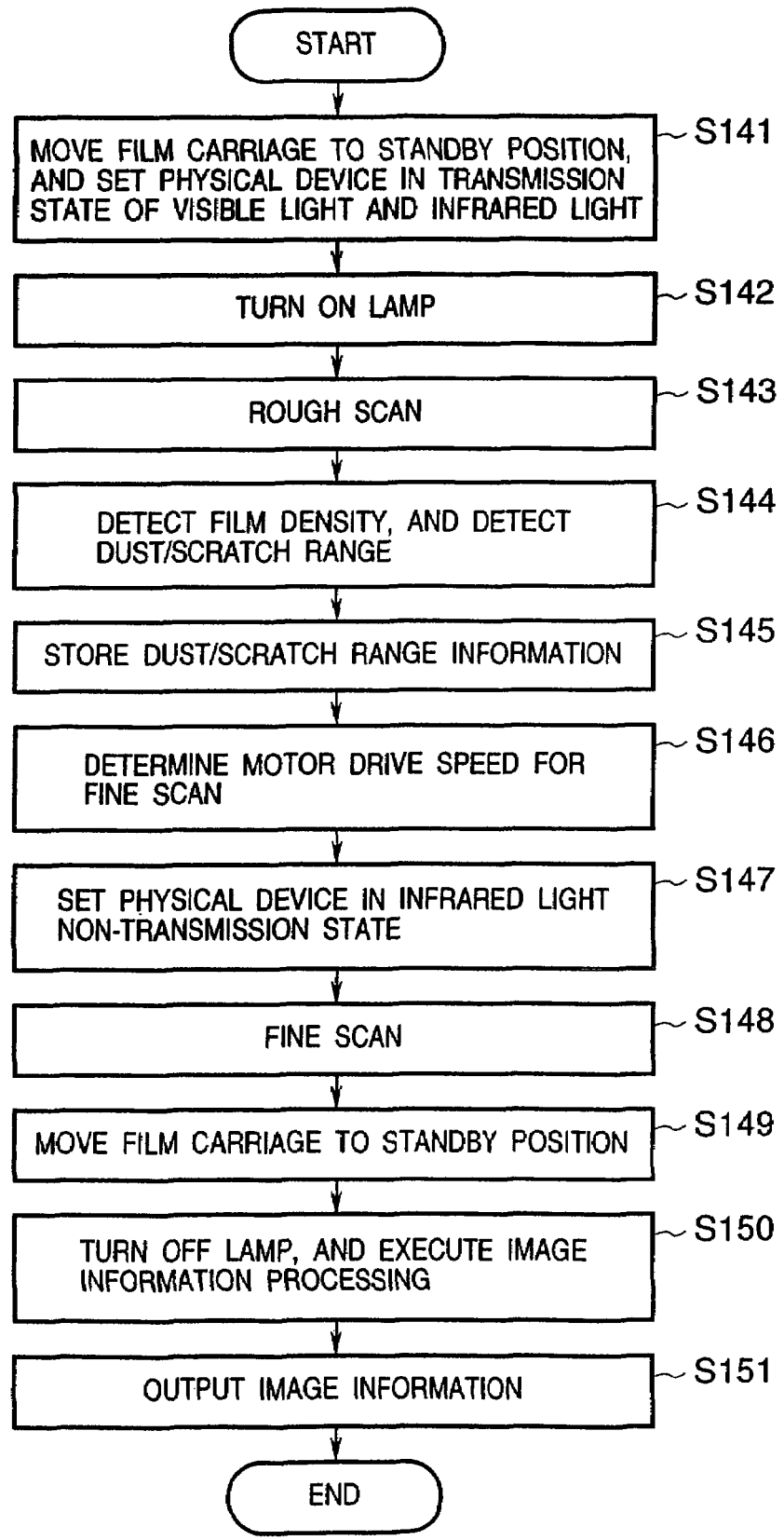
FIG. 25 is a flow chart in a modification of the fifth embodiment for controlling the operation of the film scanner shown in FIG. 8.

A modification of the fifth embodiment will be explained below with reference to FIG. 25. FIG. 25 is a flow chart in this modification for controlling the operation of the film scanner shown in FIG. 8. As in the fifth embodiment, since reference numerals used in the following description are common to those in the third embodiment, a detailed description thereof will be omitted.

This modification is effective for a film scanner having the same arrangement as that of the third embodiment, in which upon reciprocally moving the film carriage 31 by the motor 37 with respect to the line sensor 36, hysteresis due to the reciprocal motion is very small, that is, two pieces of image information obtained by movements in two directions (forward and backward movements) can be easily overlapped on each other upon capturing images by a movement of the film carriage 31 in a predetermined direction and by a movement in the reverse direction.

An image information scanning method of the film 32 will be described below using the flow chart in FIG. 25.

Upon receiving a film scan command from an external device via the input/output terminal 44, the sensor 38 and sensor control circuit detect the position of the film carriage 31, and that information is sent to the film scanner control circuit. The motor control circuit drives the motor 37 at a predetermined drive speed to set the film carriage 31 at a predetermined standby position, thus moving the film carriage 31 to the standby position. At the same time, the physical device control circuit sets the spectral transmission characteristics of the physical device 40 in the transmission state of visible light and infrared light shown in FIG. 12 (S141). The lamp control circuit turns on the lamp 33 (S142), and the motor control circuit rotates the motor 37 in a predetermined direction at a predetermined speed to scan the image range on the film 32 at the predetermined speed in the film surface direction, thus making a rough scan to obtain image information of the film 32 by visible light and infrared light (S143). During the rough scan, the line sensor 36 sends an output signal (image information) to the image information processing circuit via the line sensor control circuit, and the film density detection circuit detects light transmittance of the visible light of the film 32, i.e., the film density on the basis of this information. Likewise, the image information processing circuit detects the infrared light transmission state, i.e., a region on the film 32 where the transmittance of the infrared light is different from the remaining region by a predetermined value or more, thus detecting any dust/scratch range on the film 32 (S144). The dust/scratch range information is sent to and stored in the image information storage circuit (S145).

Upon completion of the rough scan and the scan for obtaining the dust/scratch range information on the film, the motor drive speed determination circuit determines the drive speed of the motor 37 for a fine scan to obtain an image with an appropriate amount of light on the basis of the detected film density on the entire film (S146). The physical device control circuit then sets the spectral transmission characteristics of the physical device 40 in the infrared light non-transmission state shown in FIG. 13 (S147). The motor control circuit rotates the motor 37 in the reverse direction at the determined drive speed, thus making a fine scan (S148). During this fine scan, the line sensor 36 sends an output signal (image information) to the image information processing circuit via the line sensor control circuit. Upon completion of image scanning for the fine scan, the motor control circuit rotates the motor 37 at a predetermined drive speed to return the film carriage 31 to its standby position (S149). In this manner, upon completion of the fine scan, the lamp control circuit turns off the lamp 33, and at the same time, the image information storage circuit sends the dust/scratch range information to the image information processing circuit, which executes image information processing for correcting the dust/scratch range of image information of the film 32 obtained by the fine scan (visible light) (S150). The image information is then output from the input/output terminal 44, thus ending film image scanning of the film scanner.

As in the above embodiments, the dust/scratch range information on the film 32 and the image information of the film 32 obtained by visible light may be separately output from the input/output terminal 44, and a device (not shown) connected to the input/output terminal 44 may execute image information processing for correcting the dust/scratch range from the image information of the film 32 obtained by visible light.

Also, an operation mode that skips the infrared light scan and makes only a scan for obtaining image information of the film 32 by visible light may be provided as one of operation modes to be selected. With this mode, when a film which has less dust or scratches is to be scanned, or when no dust/scratch correction of an output image is required, the time required for the image information processing for obtaining image information of the film 32 by visible light can be shortened by skipping the image information processing for correcting the dust/scratch range of the image information of the film 32.

Sixth Embodiment

Figure 26:
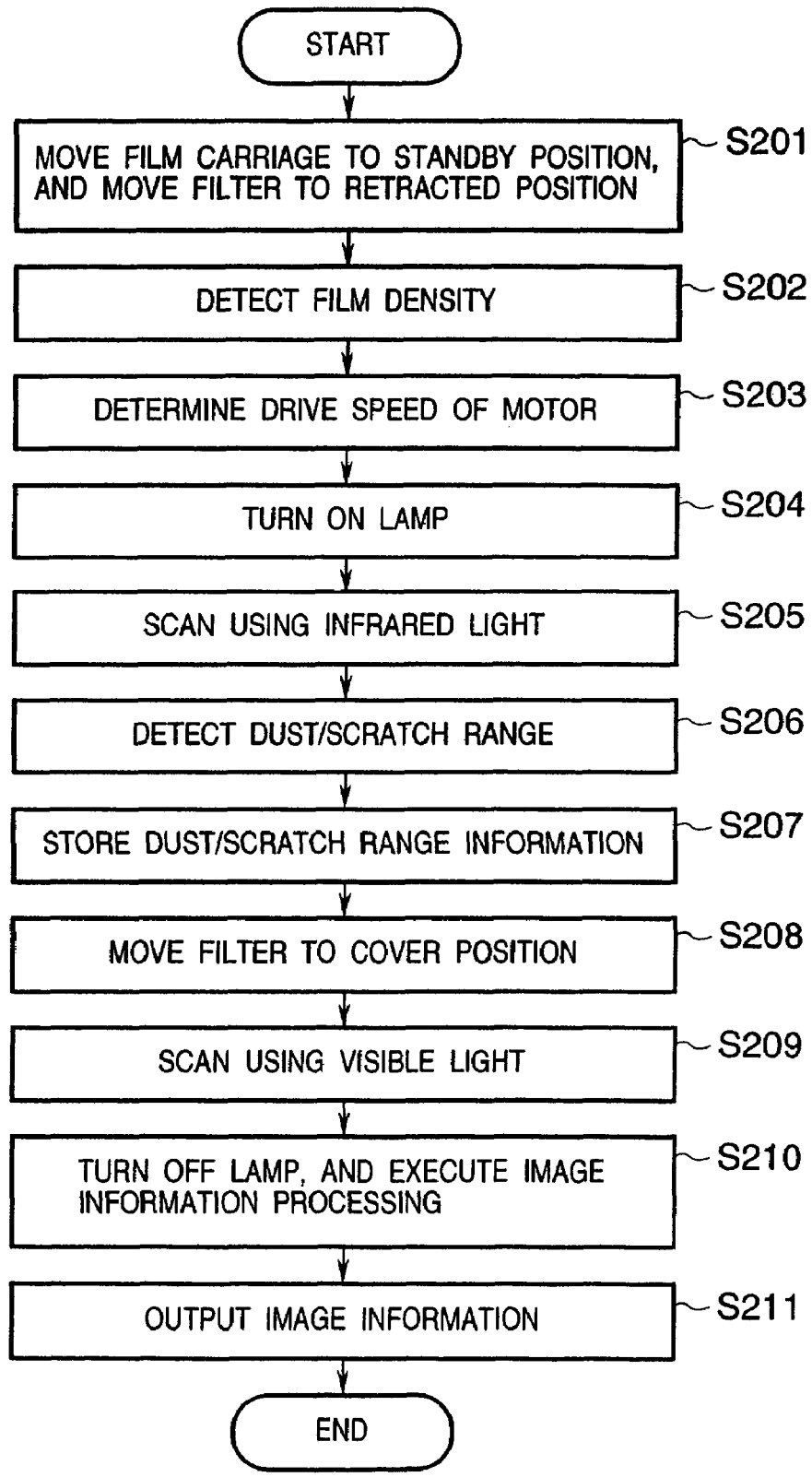
FIG. 26 is a flow chart in the sixth embodiment for controlling the operation of the film scanner shown in FIG. 8.

The sixth embodiment of the present invention will be explained below with reference to FIG. 26, and FIGS. 1 to 3 used in the description of the first embodiment. FIG. 26 is a flow chart in this embodiment for controlling the operation of the film scanner shown in FIG. 1.

An image information scanning method of the film 2 will be explained below with reference to the flow chart in FIG. 26. Note that reference numerals used in the following description are common to those in the first embodiment, and a detailed description thereof will be omitted.

Upon receiving a film scan command from an external device via the input/output terminal 15, the sensor 8 and sensor control circuit detect the position of the film carriage 1, and that information is sent to the film scanner control circuit. The motor control circuit drives the motor 7 to set the film carriage 1 at a predetermined standby position, thus moving the film carriage 1 to the standby position. At the same time, the filter sensor 17 and filter sensor control circuit detect the position of the filter 10, and that information is sent to the film scanner control circuit. In order to retract the filter 10 from the position on the optical axis 9, the filter motor control circuit drives the filter motor 11 to move the filter 10 to its retracted position (step S201).

The density sensor 16 and film density detection circuit detect the density of the film 2 (step S202), and the motor drive speed determination circuit determines the drive speed of the motor 7 for a scan on the basis of this information (step S203). The lamp control circuit turns on the lamp 3 (step S204), and the motor control circuit rotates the motor 7 in a predetermined direction at the determined drive speed, thus scanning the film to obtain image information of the film 2 by infrared light (step S205).

During the scan, the line sensor 6 sends image information to the image information processing circuit via the line sensor control circuit to detect the infrared light transmission state, i.e., a region on the film 2 where the transmittance of the infrared light is different from the remaining region by a predetermined value or more, thus detecting any dust/scratch range on the film 2 (step S206). The dust/scratch range information is then sent to and stored in the image information storage circuit (step S207).

Upon completion of the scan for obtaining the image information, i.e., the dust/scratch range information of the film 2 by infrared light, the filter motor control circuit drives the filter motor 11 to move the filter 10 to a position where it can cover a light beam having the optical axis 9 as the center while monitoring the position of the filter 10 by the filter sensor 17 and filter sensor control circuit (step S208). The motor control circuit rotates the motor 7 in the reverse direction at the previously determined drive speed, thus scanning the film to obtain image information of the film 2 by visible light (step S209). During this scan, the line sensor 6 sends image information to the image information processing circuit via the line sensor control circuit.

Upon completion of this scan, the lamp control circuit turns off the lamp 3 and, at the same time, the image information storage circuit sends the dust/scratch range information to the image information processing circuit, which executes image information processing for correcting the dust/scratch range on the image information of the film 2 obtained by visible light (step S210). The image information is output from the input/output terminal 15 (step S211), thus ending film image scanning of the film scanner.

In the sixth embodiment, the dust/scratch range information on the film 2 and the image information of the film 2 obtained by visible light may be separately output from the input/output terminal 15, and a device (not shown) connected to the input/output terminal 15 may execute image information processing for correcting the dust/scratch range from the image information of the film 2 obtained by visible light.

Also, in the sixth embodiment, the scan for obtaining image information of the film 2 by visible light may be made prior to the scan for obtaining image information of the film 2 by infrared light. In this case, however, the image information of the film 2 obtained by visible light must be stored in the image information storage circuit.

Furthermore, in the sixth embodiment, an operation mode that skips the scan using infrared light, i.e., the scan for obtaining dust/scratch range information, and makes only a scan for obtaining image information of the film 2 by visible light may be provided as one of operation modes to be selected. With this mode, when a film which has less dust or scratches is to be scanned, or when no dust/scratch correction of an output image is required, the time required for the image information processing for obtaining image information of the film 2 by visible light can be shortened by skipping the image information processing for correcting the dust/scratch range of the image information of the film 2.

As described above, according to the sixth embodiment, since image information is scanned by visible light in a motion in one direction of a relative reciprocal motion between the film 2 as a transparent original, and the line sensor 6, and image information is scanned by infrared light in a motion in the other direction of the reciprocal motion, the relative reciprocal motion between the film 3 and line sensor 6 for scanning image information by visible light, and that for scanning image information by infrared light need not be separately made. Therefore, a simple film image scanning apparatus which can make a scan using infrared light to obtain a film image free from any dust or scratches within a shorter period of time than a conventional apparatus can be provided.

Also, since the operation mode that skips the infrared light scan upon scanning image information of the film 2 is provided and can be selected, when a film which has less dust or scratches is to be scanned, or when no dust/scratch correction of an output image is required, the time required for the image information processing for obtaining image information of the film by visible light can be shortened by skipping the image information processing for correcting the dust/scratch range of the image information of the film.

Seventh Embodiment

Figure 27:
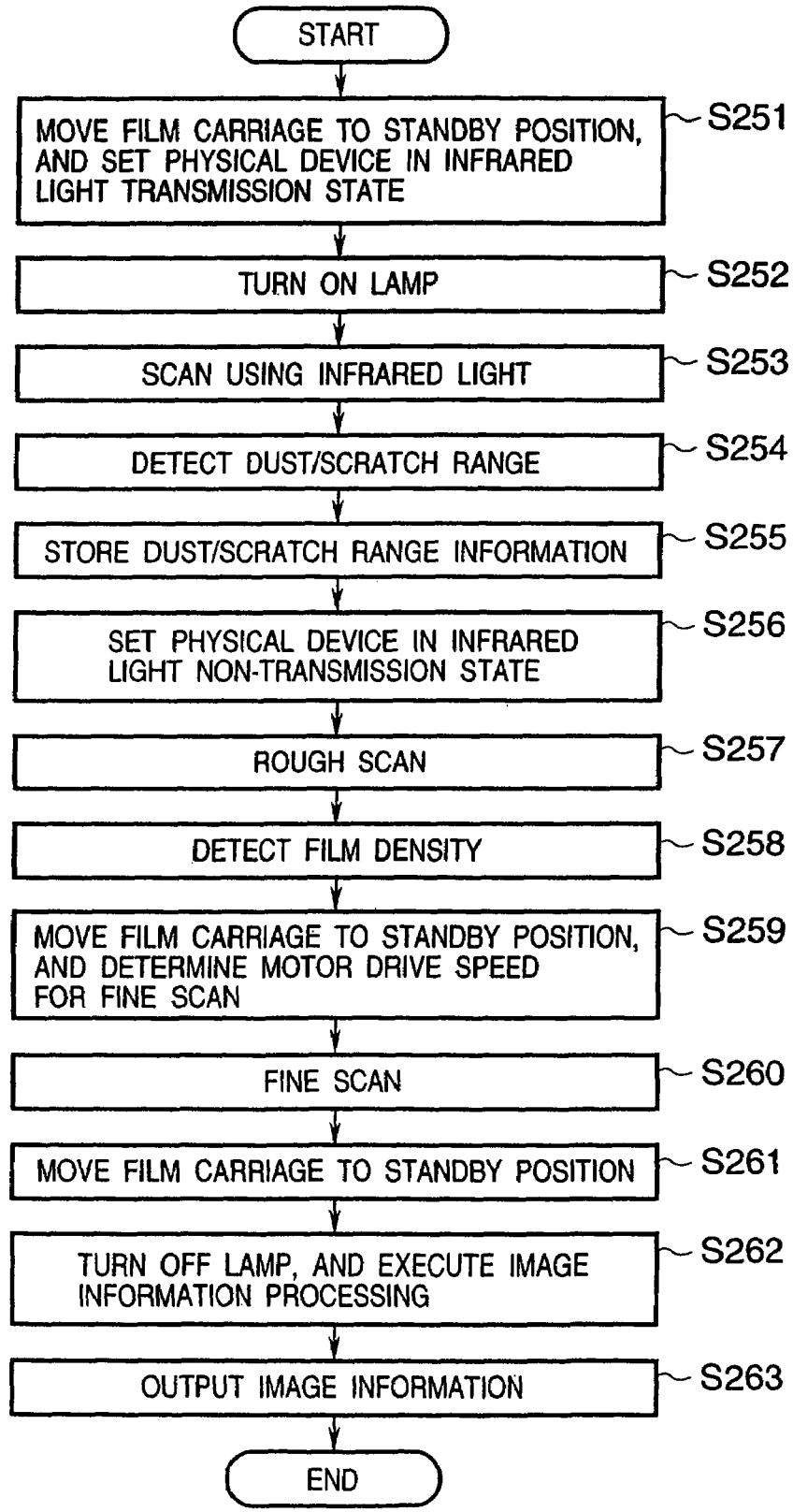
FIG. 27 is a flow chart in the seventh embodiment for controlling the operation of the film scanner shown in FIG. 8.
Figure 28:
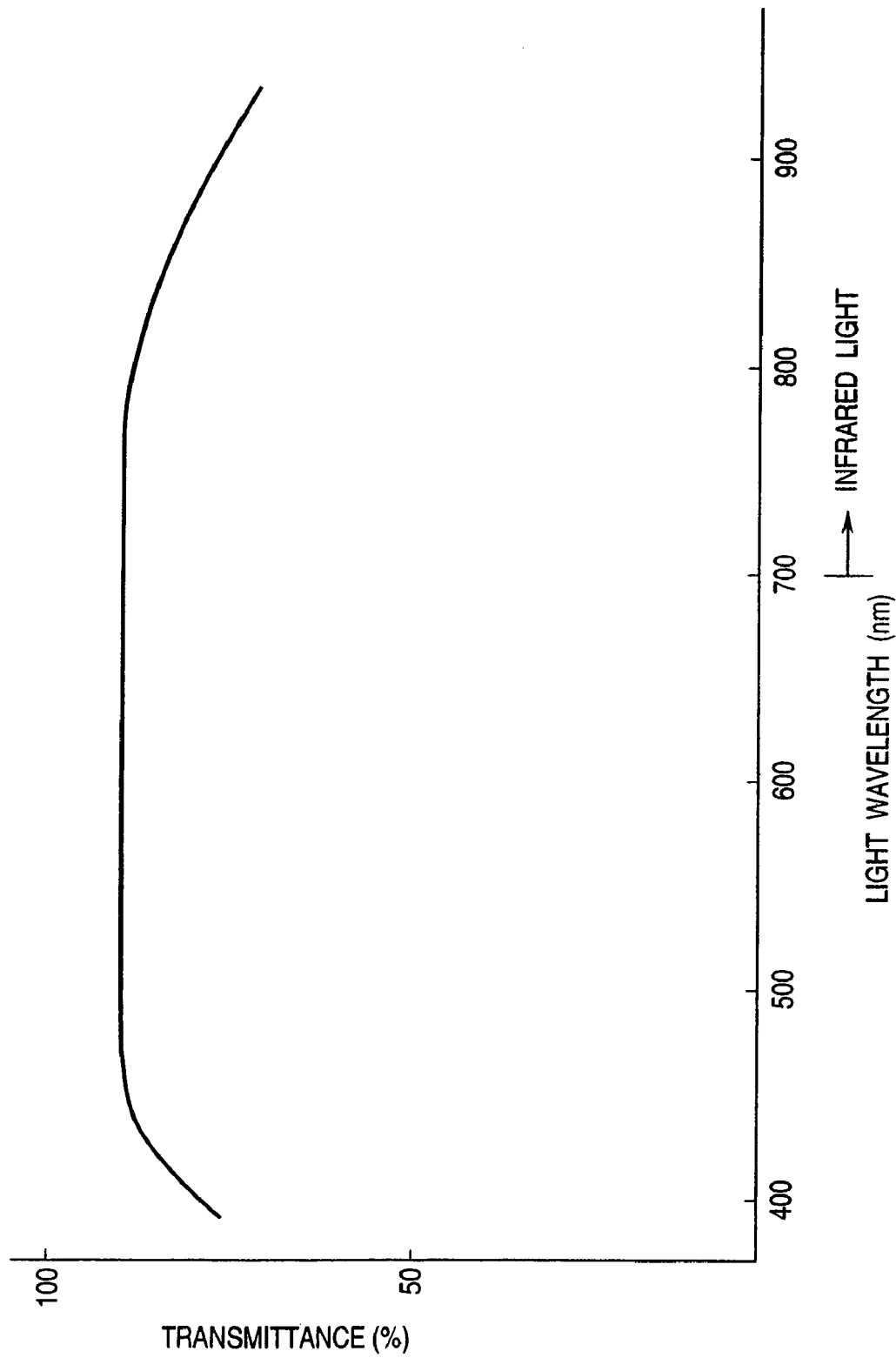
FIGS. 28 and 29 are graphs showing the spectral transmission characteristics of a physical device in the seventh embodiment in an infrared light transmission state.
Figure 29:
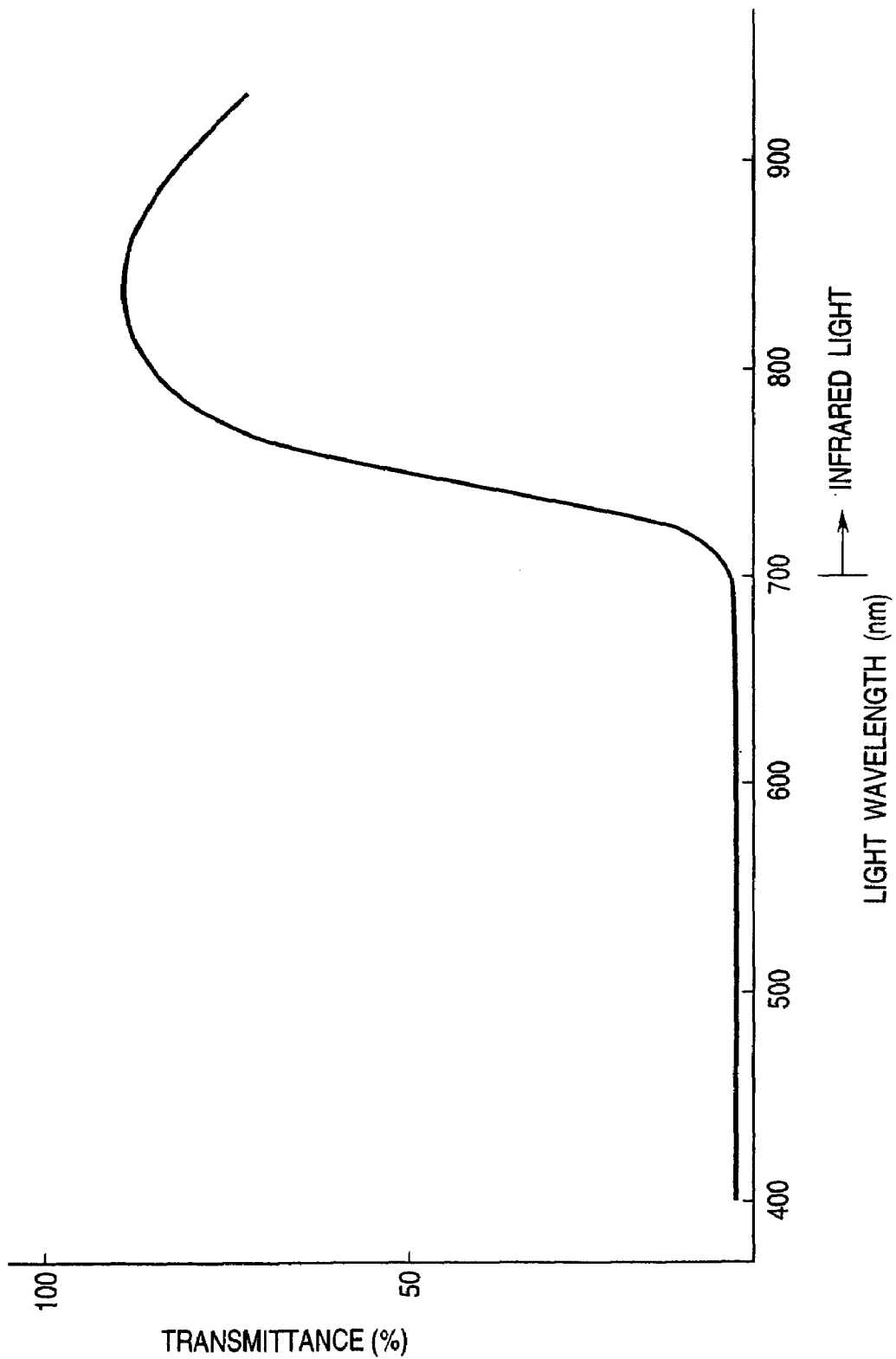
Figure 30:
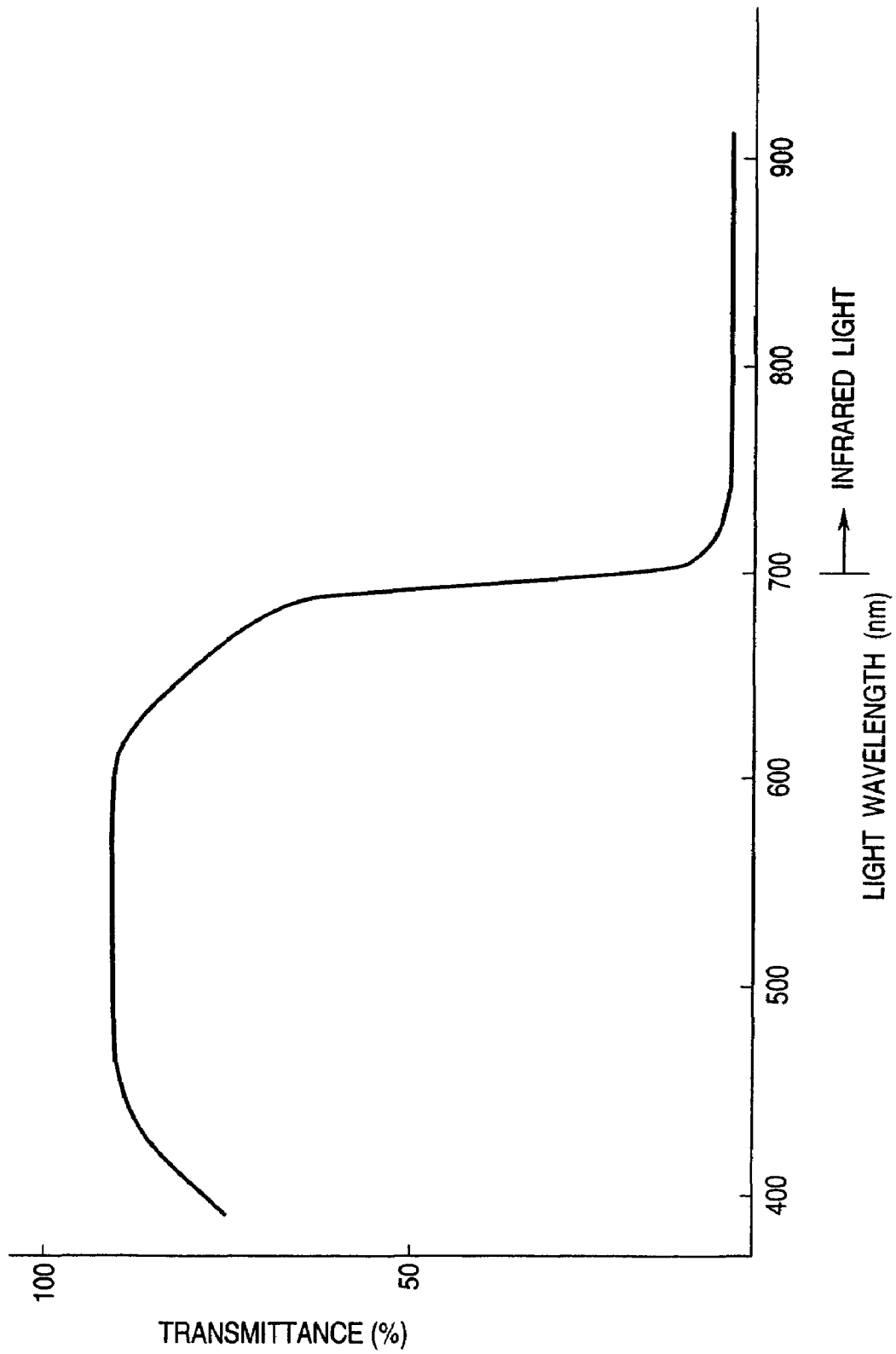
FIG. 30 is a graph showing the spectral transmission characteristics of a physical device in the seventh embodiment in an infrared light non-transmission state.

The seventh embodiment of the present invention will be described below with reference to FIGS. 27 to 30, and FIGS. 8 to 10 used in the description of the third embodiment. FIG. 27 is a flow chart in this embodiment for controlling the operation of the film scanner shown in FIG. 8. FIGS. 28 and 29 are graphs showing the spectral transmission characteristics of a physical device in the seventh embodiment in an infrared light transmission state, and FIG. 30 is a graph showing the spectral transmission characteristics of a physical device in the seventh embodiment in an infrared light non-transmission state.

An image information scanning method of the film 32 will be described below with reference to the flow chart in FIG. 27. Note that reference numerals used in the following description are common to those in the third embodiment, and a detailed description thereof will be omitted.

Upon receiving a film scan command from an external device via the input/output terminal 44, the sensor 38 and sensor control circuit detect the position of the film carriage 31, and that information is sent to the film scanner control circuit. The motor control circuit drives the motor 37 to set the film carriage 31 at a predetermined standby position, thus moving the film carriage 31 to the standby position. At the same time, the physical device control circuit sets the spectral transmission characteristics of the physical device 40 in the infrared light transmission state shown in FIG. 28 or 29 (step S251).

The lamp control circuit turns on the lamp 33 (step S252), and the motor control circuit rotates the motor 37 in a predetermined direction at a predetermined speed to scan the image range on the film 32 at the predetermined speed in the film surface direction, thus making a scan to obtain image information of the film 32 by infrared light (step S253).

During the scan, the line sensor 36 sends image information to the image information processing circuit via the line sensor control circuit, and the image information processing circuit detects the infrared light transmission state, i.e., a region on the film 32 where the transmittance of the infrared light is different from the remaining region by a predetermined value or more, thus detecting any dust/scratch range on the film 32 (step S255).

Upon completion of the scan for obtaining the image information, i.e., the dust/scratch range information of the film 32 by infrared light, the physical device control circuit sets the spectral transmission characteristics of the physical device 40 in the infrared light non-transmission state shown in FIG. 30 (step S256). The motor control circuit rotates the motor 37 in the reverse direction at a predetermined drive speed, thus making a rough scan for obtaining image information of the film 32 by visible light (step S257). During this rough scan, the line sensor 36 sends image information to the image information processing circuit via the line sensor control circuit, and the film density detection circuit detects the light transmittance of the film 32, i.e., the film density on the basis of this information (step S258).

When the film carriage 31 returns to its standby position and the rough scan is complete, the motor drive speed determination circuit determines the motor drive speed for a fine scan on the basis of the detected film density of the entire film, so as to obtain an image with an appropriate amount of light (step S259). The motor control circuit rotates the motor 37 in a predetermined direction at the determined motor drive speed, thus making a fine scan (step S260). During this fine scan, the line sensor 36 sends image information to the image information processing circuit via the line sensor control circuit.

Upon completion of image scanning for the fine scan, the motor control circuit rotates the motor 37 at a predetermined drive speed to return the film carriage 31 to its standby position (step S261). In this manner, upon completion of the fine scan, the lamp control circuit turns off the lamp 33, and at the same time, the image information storage circuit sends the dust/scratch range information to the image information processing circuit, which executes image information processing for correcting the dust/scratch range of image information of the film 32 obtained by the fine scan (visible light) (step S262). The image information is then output from the input/output terminal 44 (step S263), thus ending film image scanning of the film scanner.

In the seventh embodiment, the dust/scratch range information on the film 32 and the image information of the film 32 obtained by visible light may be separately output from the input/output terminal 44, and a device (not shown) connected to the input/output terminal 44 may execute image information processing for correcting the dust/scratch range from the image information of the film 32 obtained by visible light.

Also, in the seventh embodiment, the scan for obtaining image information of the film 32 by infrared light is made by moving the film carriage 31 in one direction, and after that, the rough scan is made by returning the film carriage 31 (movement of the film carriage 31 in the reverse direction). Alternatively, after the rough scan is made by moving the film carriage 31 in one direction, the scan for obtaining image information of the film 32 by infrared light may be made by returning the film carriage 31 (movement of the film carriage 31 in the reverse direction). However, in this case, image information of the film 32 obtained by visible light must be stored in the image information storage circuit.

Furthermore, in the seventh embodiment, the scan for obtaining image information of the film 32 by infrared light may be made during the reciprocal motion of the film carriage 31 in the fine scan in place of that of the film carriage 31 in the rough scan. In this case, either of the scan for obtaining image information of the film 32 by infrared light or the fine scan may be made first. When the fine scan is made first, image information of the film 32 obtained by visible light must be stored in the image information storage circuit.

Moreover, in the seventh embodiment, an operation mode that skips the infrared light scan and makes only a scan for obtaining image information of the film 32 by visible light may be provided as one of operation modes to be selected. With this mode, when a film which has less dust or scratches is to be scanned, or when no dust/scratch correction of an output image is required, the time required for the image information processing for obtaining image information of the film 32 by visible light can be shortened by skipping the image information processing for correcting the dust/scratch range of the image information of the film 32.

As described above, according to the seventh embodiment, since image information of the film 32 as a transparent original is scanned in three scan modes, i.e., a rough scan for obtaining rough image information of the film 32 by visible light, a fine scan for obtaining image information of the film 32 by visible light with designated quality, and an infrared light scan for scanning image information of the film 32 with infrared light, a simple film image scanning apparatus which can make a scan using infrared light to obtain a film image free from any dust or scratches within a shorter period of time than a conventional apparatus can be provided.

Also, since the operation mode that skips the infrared light scan upon scanning image information of the film 32 is provided and can be selected, when a film which has less dust or scratches is to be scanned, or when no dust/scratch correction of an output image is required, the time required for the image information processing for obtaining image information of the film by visible light can be shortened by skipping the image information processing for correcting the dust/scratch range of the image information of the film.

Eighth Embodiment

Figure 31:
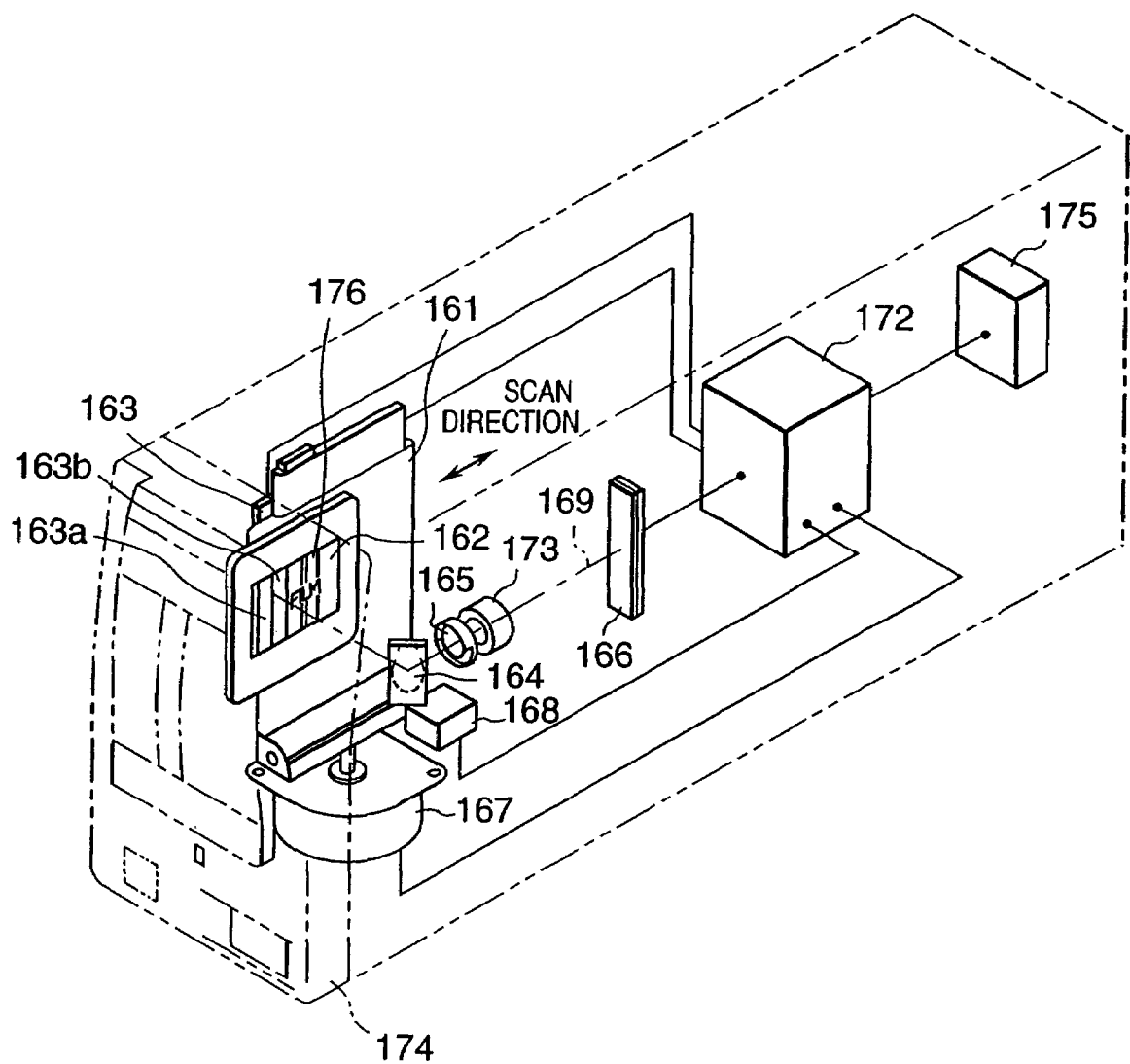
FIG. 31 is a perspective view showing principal part of a film scanner according to the eighth embodiment of the present invention.
Figure 33:
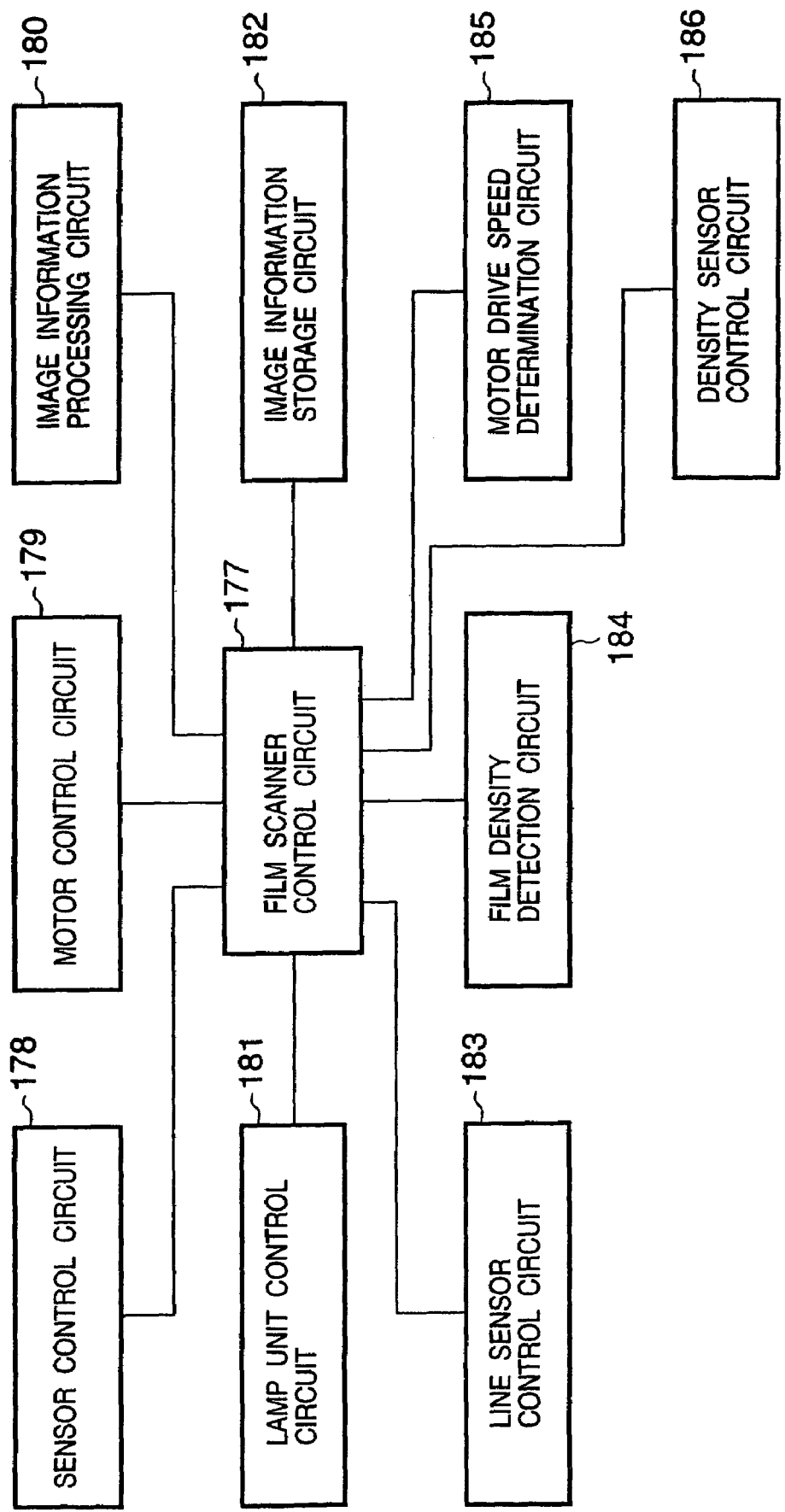
FIG. 33 is a block diagram showing the circuit arrangement of the film scanner shown in FIG. 31.
Figure 34:
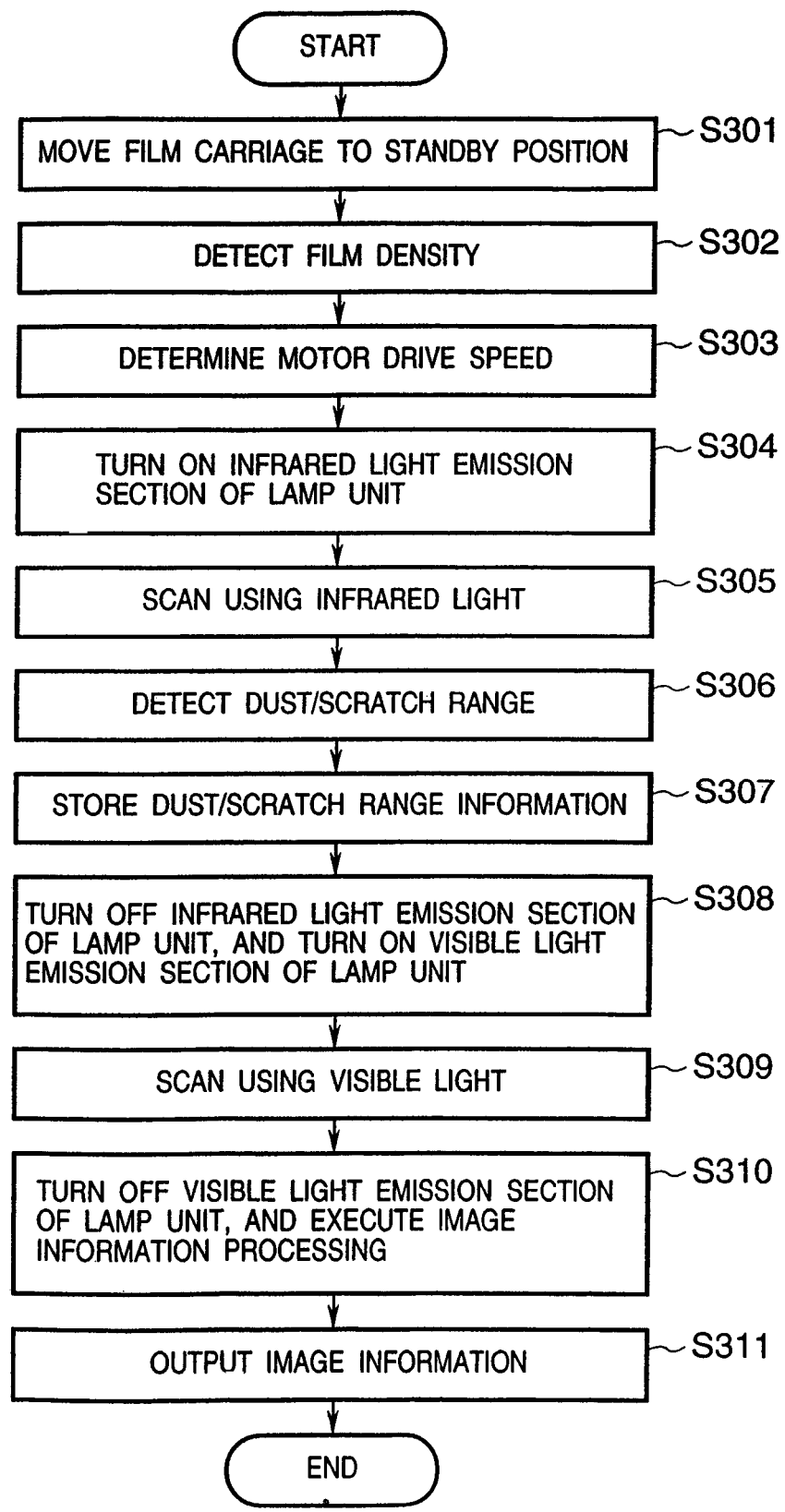
FIG. 34 is a flow chart showing the operation of the film scanner shown in FIG. 31.
Figure 35:
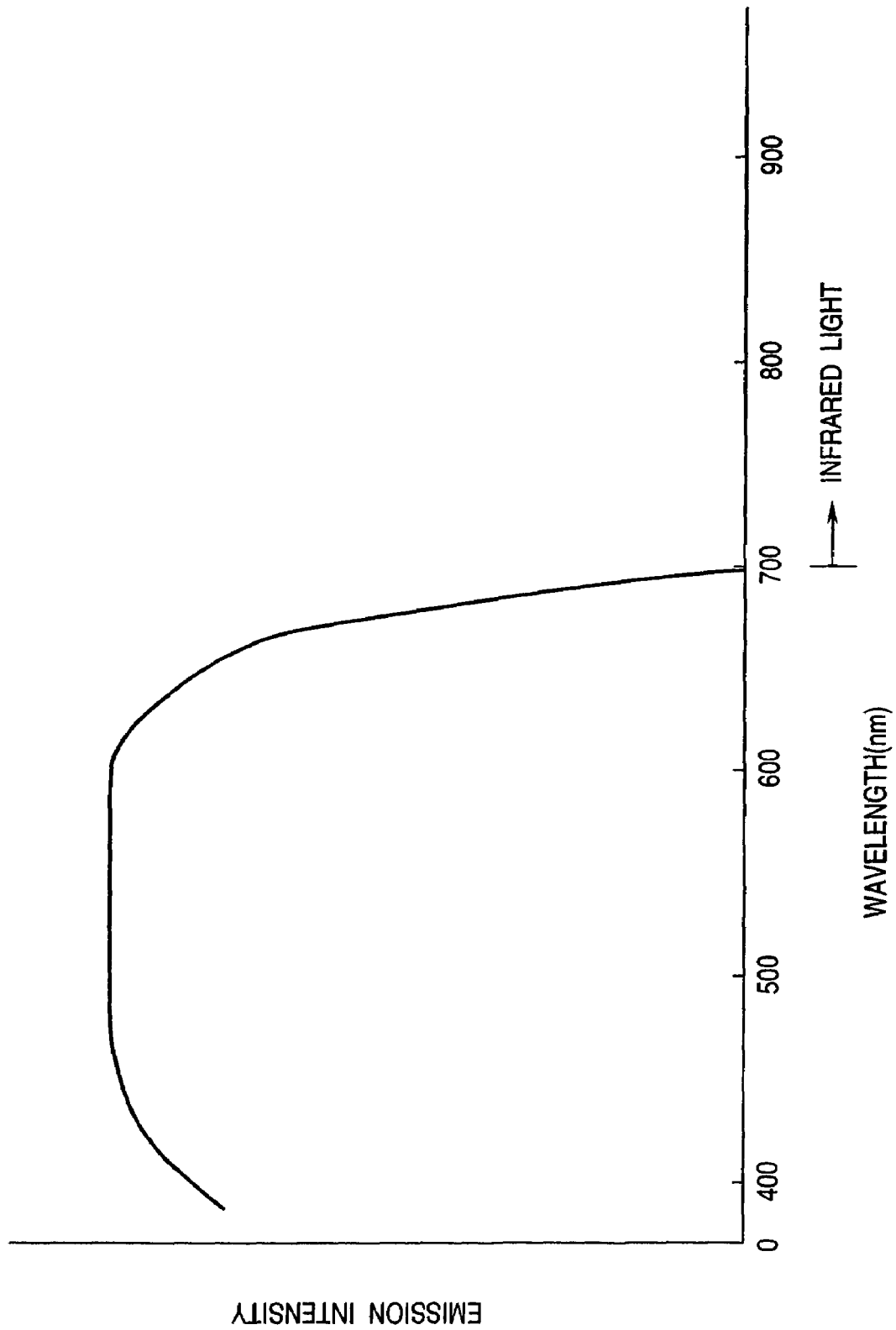
FIG. 35 is a graph showing the emission spectrum intensity distribution of a visible light emission section in a lamp unit in the eighth embodiment.
Figure 36:
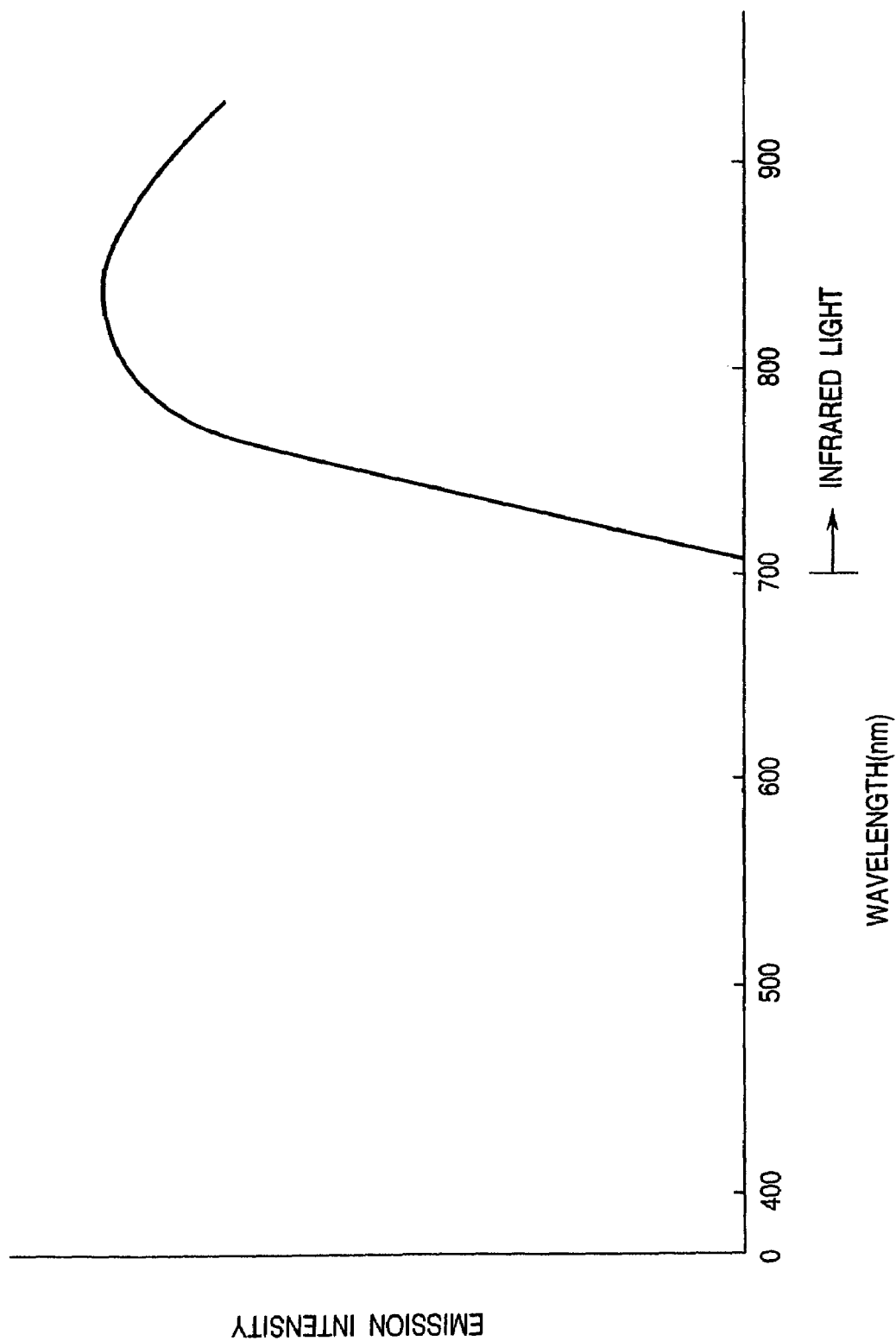
FIG. 36 is a graph showing the emission spectrum intensity distribution of an infrared light emission section in the lamp unit in the eighth embodiment.

The eighth embodiment of the present invention will be described below with reference to FIGS. 31 to 36. FIG. 31 is a perspective view showing principal part of a film scanner according to the eighth embodiment, FIG. 32 is a schematic view showing the arrangement of the film scanner shown in FIG. 31, FIG. 33 is a block diagram showing the circuit arrangement of the film scanner shown in FIG. 31, FIG. 34 is a flow chart showing the operation of the film scanner shown in FIG. 31, FIG. 35 is a graph showing the emission spectrum intensity distribution of a visible light emission section in a lamp unit in the eighth embodiment, and FIG. 36 is a graph showing the emission spectrum intensity distribution of an infrared light emission section in the lamp unit in the eighth embodiment.

The film scanner according to the eighth embodiment comprises a film carriage 161, lamp unit 163, mirror 164, lens 165, line sensor 166, motor 167, sensor 168, control circuit 172, lens holder 173, outer case 174, input/output terminal 175, and density sensor 176.

The arrangements of these components will be explained in detail below. The film carriage 161 is used as a platen, and a developed film 162 is fixed on the film carriage 161. The lamp unit 163 is constructed by a visible light emission section 163a having the emission spectrum intensity distribution shown in FIG. 35, and an infrared light emission section 163b having the emission spectrum intensity distribution shown in FIG. 36. The line sensor 166 comprises a CCD (charge coupled device) and the like. Light emitted by the lamp unit 163 is transmitted through the film 162, is reflected by the mirror 164, and forms an image on the line sensor 166. The line sensor 166 has three light-receiving areas, i.e., R, G, and B light-receiving areas, which are respectively sensitive to red, green, and blue light wavelengths, and at least one of which is also sensitive to infrared light.

Figure 32:
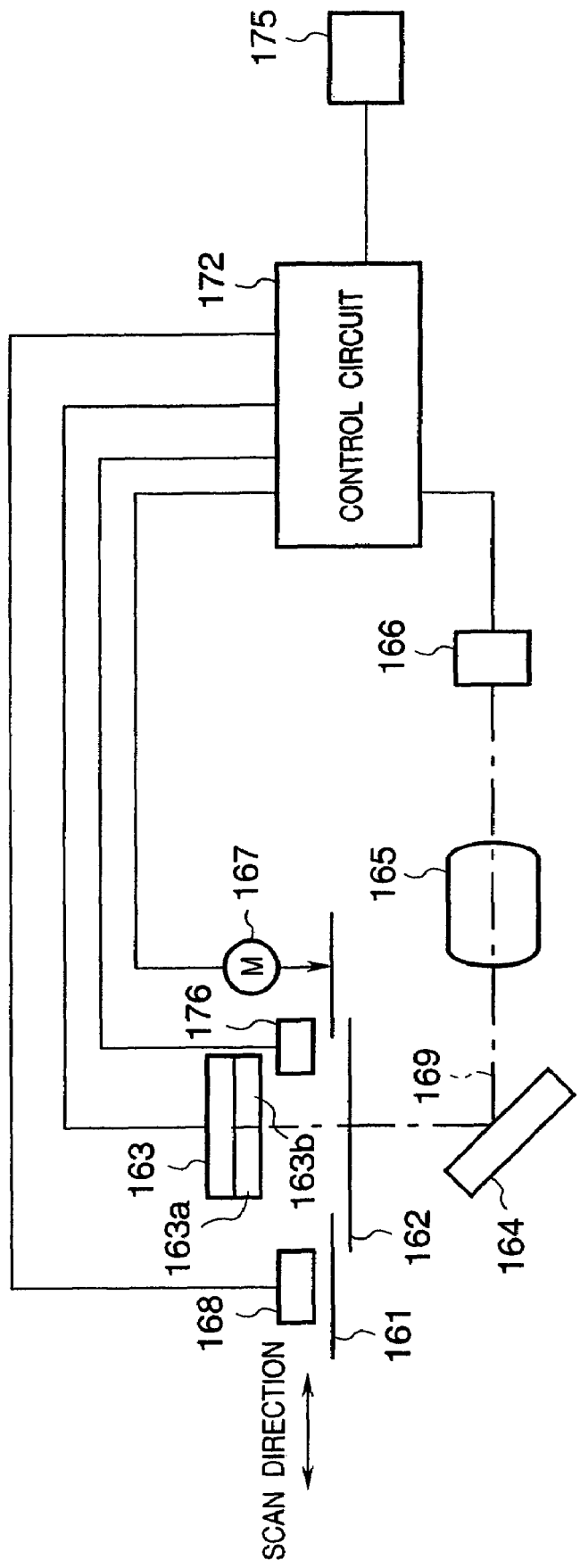
FIG. 32 is a schematic view showing the arrangement of the film scanner shown in FIG. 31.

The motor 167 moves the film carriage 161 in the scan direction (the direction of the arrow in FIGS. 31 and 32). The sensor 161 detects the position of the film carriage 161. Reference numeral 169 in FIG. 31 denotes an optical axis extending from the lamp 163 to the line sensor 166. The control circuit 172 has an arrangement shown in FIG. 33, and executes the processes shown in the flow chart in FIG. 34. The lens holder 173 holds the lens 165. The outer case 174 houses the respective units of the film scanner. An external device is connected to the input/output terminal 175. The density sensor 176 detects the film density. The lamp unit 163, line sensor 166, motor 167, sensor 168, and input/output terminal 175 are electrically connected to the control circuit 172.

FIG. 33 is a block diagram showing the circuit arrangement of the film scanner according to the eighth embodiment of the present invention. The control circuit 172 comprises a film scanner control circuit 177, sensor control circuit 178, motor control circuit 179, image information processing circuit 180, lamp unit control circuit 181, image information storage circuit 182, line sensor control circuit 183, film density detection circuit 184, motor drive speed determination circuit 185, and density sensor control circuit 186.

The functions of these circuits will be explained below. The film scanner control circuit 177 integrally controls the circuits 178 to 186. The sensor control circuit 178 detects the position of the film carriage 161 on the basis of a detection signal from the sensor 168. The motor control circuit 179 controls to drive the motor 167, thereby moving the film carriage 161 in the scan direction. The image information processing circuit 180 executes image information processing for correcting the dust/scratch range from image information of the film 162.

The lamp unit control circuit 181 controls to turn on/off the lamp unit 163. The image information storage circuit 182 stores dust/scratch range information on the film 162. The line sensor control circuit 183 controls the line sensor 166 to capture image information from the line sensor 166. The film density detection circuit 184 detects film density. The motor drive speed determination circuit 185 determines the drive speed of the motor 167. The density sensor control circuit 186 controls the density sensor 176.

An image scanning method of the film 162 in the film scanner with the above arrangement according to the eighth embodiment of the present invention will be described below with reference to the flow chart in FIG. 34.

Upon receiving a film scan command from an external device via the input/output terminal 175, the sensor 168 and sensor control circuit 178 detect the position of the film carriage 161, and that information is sent to the film scanner control circuit 177. The motor control circuit 179 drives the motor 167 to set the film carriage 161 at a predetermined standby position, thus moving the film carriage 161 to the standby position (step S301).

The density sensor 176 and film density detection circuit 184 detect the density of the film 162 (step S302), and the motor drive speed determination circuit 185 determines the drive speed of the motor 167 for a scan (step S303). The lamp unit control circuit 181 turns on the infrared light emission section 163b of the lamp unit 163 (step S304), and the motor control circuit 179 rotates the motor 167 in a predetermined direction at the determined drive speed, thus making a scan for obtaining image information of the film 102 by infrared light (step S305).

During this scan, the line sensor 166 sends image information to the image information processing circuit 180 via the line sensor control circuit 183 to detect the infrared light transmission state, i.e., a region on the film 162 where the transmittance of the infrared light is different from the remaining region by a predetermined value or more, thus detecting any dust/scratch range on the film 162 (step S306). The dust/scratch range information is sent to and stored in the image information storage circuit 182 (step S307).

Upon completion of the scan for obtaining the image information, i.e., the dust/scratch range information of the film 162 by infrared light, the lamp unit control circuit 181 turns off the infrared light emission section 163b of the lamp unit 163, and then turns on the visible light emission section 163a of the lamp unit 163 (step S308). The motor control circuit 179 rotates the motor 167 at the determined drive speed in the reverse direction to make a scan for obtaining image information of the film 162 by visible light (step S309). During this scan, the line sensor 166 sends image information to the image information processing circuit 180 via the line sensor control circuit 183.

Upon completion of this scan, the lamp unit control circuit 181 turns off the visible light emission section 163a of the lamp unit 163, and at the same time, the image information storage circuit 182 sends the dust/scratch range information to the image information processing circuit 180, which executes image information processing for correcting the dust/scratch range from image information of the film 162 obtained by visible light (step S310). The image information is then output from the input/output terminal 175 (step S311), thus ending film image scanning of the film scanner.

In the eighth embodiment, the dust/scratch range information on the film 162 and the image information of the film 162 obtained by visible light may be separately output from the input/output terminal 175, and the device (not shown) connected to the input/output terminal 175 may execute image information processing for correcting the dust/scratch range from the image information of the film 162 obtained by visible light.

Also, in the eighth embodiment, the scan for obtaining image information of the film 162 by visible light may be made prior to the scan for obtaining image information of the film 162 by infrared light. In this case, however, the image information of the film 162 obtained by visible light must be stored in the image information storage circuit 182.

Furthermore, in the eighth embodiment, an operation mode that skips the infrared light scan and makes only a scan for obtaining image information of the film 162 by visible light may be provided as one of operation modes to be selected. With this mode, when a film which has less dust or scratches is to be scanned, or when no dust/scratch correction of an output image is required, the time required for the image information processing for obtaining image information of the film 162 by visible light can be shortened by skipping the image information processing for correcting the dust/scratch range of the image information of the film 162.

As described above, in the eighth embodiment, after the scan for obtaining image information of the film 162 by infrared light is made by turning on the infrared light emission section 163b of the lamp unit 163, the scan for obtaining image information of the film 162 by visible light is made by turning on the visible light emission section 163a of the lamp unit 163. Therefore, a simple film image scanning apparatus which can make a scan using infrared light to obtain a film image free from any dust or scratches within a shorter period of time than a conventional apparatus can be provided.

Also, since the operation mode that skips the infrared light scan upon scanning image information of the film 162 is provided and can be selected, when a film which has less dust or scratches is to be scanned, or when no dust/scratch correction of an output image is required, the time required for the image information processing for obtaining image information of the film by visible light can be shortened by skipping the image information processing for correcting the dust/scratch range of the image information of the film.

Ninth Embodiment

Figure 37:
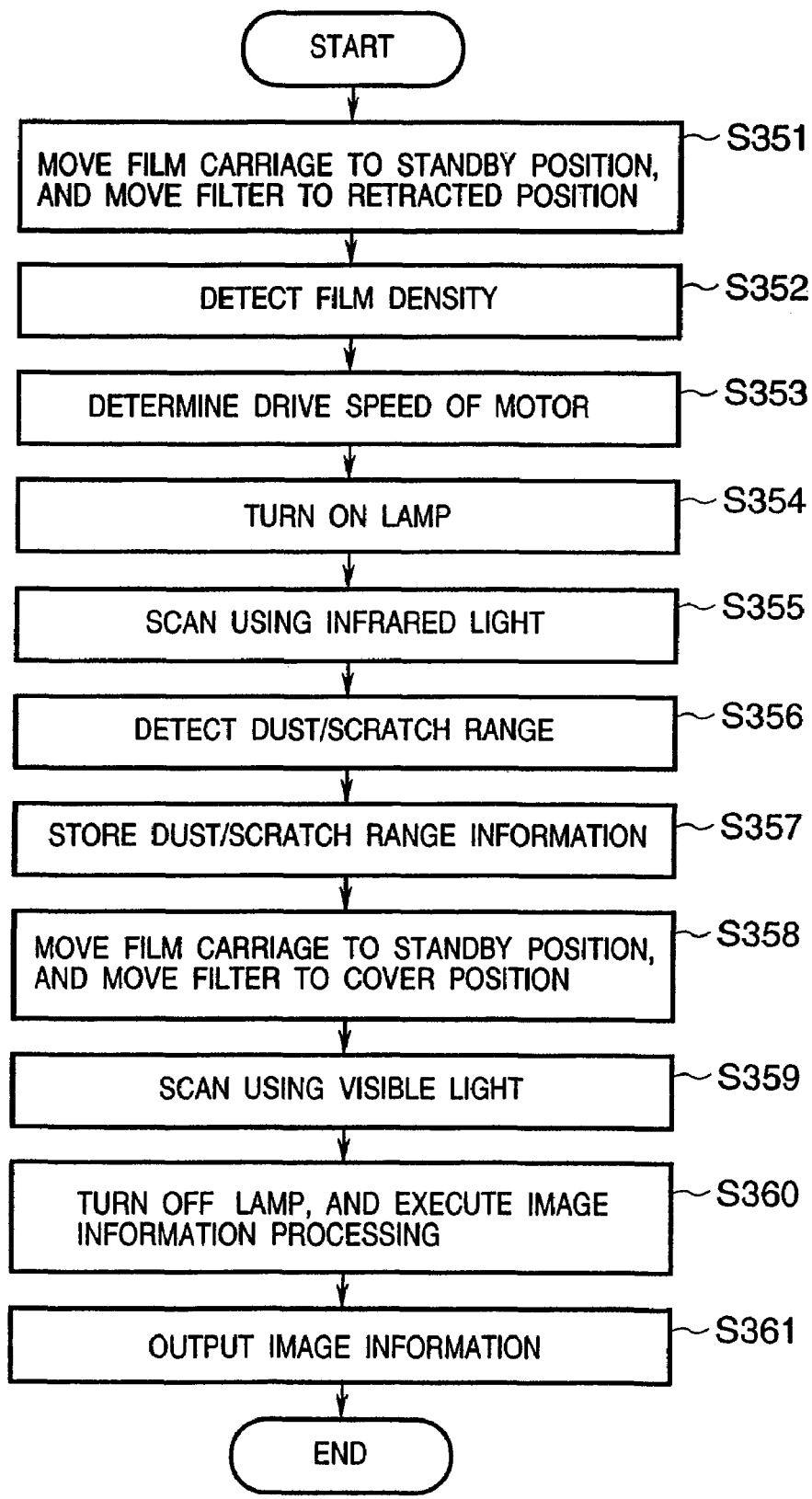
FIG. 37 is a flow chart in the ninth embodiment for controlling the operation of the film scanner shown in FIG. 1.

The ninth embodiment of the present invention will be described below with reference to FIG. 37 and FIGS. 1 to 3 used in the description of the first embodiment. FIG. 37 is a flow chart in this embodiment for controlling the operation of the film scanner shown in FIG. 1.

An image information scanning method of the film 2 will be explained below with reference to the flow chart in FIG. 37. Note that reference numerals used in the following description are common to those in the first embodiment, and a detailed description thereof will be omitted.

(Step S351) Upon receiving a film scan command from an external device via the input/output terminal 15, the sensor 8 and sensor control circuit detect the position of the film carriage 1, and that information is sent to the film scanner control circuit. The motor control circuit drives the motor 7 to set the film carriage 1 at a predetermined standby position, thus moving the film carriage 1 to the standby position. At the same time, the filter sensor 17 and filter sensor control circuit detect the position of the filter 10, and that information is sent to the film scanner control circuit. In order to retract the filter 10 from the position on the optical axis 9, the filter motor control circuit drives the filter motor 11 to move the filter 10 to its retracted position.

(Step S352) The density sensor 16 and film density detection circuit detect the density of the film 2.

(Step S353) The motor drive speed determination circuit determines the drive speed of the motor 7 for a scan on the basis of the detected density information.

(Step S354) The lamp control circuit turns on the lamp 3.

(Step S355) The motor control circuit rotates the motor 7 in a predetermined direction at the determined drive speed, thus scanning the film to obtain image information of the film 2 by infrared light.

(Step S356) During the scan, the line sensor 6 sends image information to the image information processing circuit (detection means) via the line sensor control circuit to detect the infrared light transmission state, i.e., a region on the film 2 where the transmittance of the infrared light is different from the remaining region by a predetermined value or more, thus detecting any range suffering abnormality such as dust or scratches on the film 2.

(Step S357) The dust/scratch range information is then sent to and stored in the image information storage circuit.

(Step S358) Upon completion of the scan for obtaining the image information, i.e., the dust/scratch range information of the film 2 by infrared light, the motor 7 is reversed to move the film carriage 1 to the aforementioned standby position. At the same time, the filter motor control circuit drives the filter motor 11 to move the filter 10 to a position where it can cover a light beam having the optical axis 9 as the center while monitoring the position of the filter 10 by the filter sensor 17 and filter sensor control circuit.

(Step S359) The motor control circuit rotates the motor 7 in the same direction as that in the scan using infrared light at the previously determined drive speed, thus scanning the film to obtain image information of the film 2 by visible light. During this scan, the line sensor 6 sends image information to the image information processing circuit (signal processing means) via the line sensor control circuit.

(Step S360) Upon completion of this scan, the lamp control circuit turns off the lamp 3 and, at the same time, the image information storage circuit sends the dust/scratch range information to the image information processing circuit, which executes image information processing for correcting the dust/scratch range on the image information of the film 2 obtained by visible light.

(Step S361) The image information is output from the input/output terminal 15, thus ending film image scanning of the film scanner.

Note that the dust/scratch range information on the film 2 and the image information of the film 2 obtained by visible light may be separately output from the input/output terminal 15, and a device (not shown) connected to the input/output terminal 15 may execute image information processing for correcting the dust/scratch range from the image information of the film 2 obtained by visible light.

Furthermore, an operation mode that skips the scan using infrared light, i.e., the scan for obtaining dust/scratch range information, and makes only a scan for obtaining image information of the film 2 by visible light may be provided as one of operation modes to be selected. With this mode, when a film which has less dust or scratches is to be scanned, or when no dust/scratch correction of an output image is required, the time required for the image information processing for obtaining image information of the film 2 by visible light can be shortened by skipping the image information processing for correcting the dust/scratch range of the image information of the film 2.

As described above, according to the ninth embodiment, image information of the film is scanned in two scan modes, i.e., a scan for obtaining image information by visible light and a scan for obtaining image information by infrared light, and the scan for obtaining image information by visible light is made after the scan for obtaining image information by infrared light. Therefore, the capacity of the storage circuit required for the film image scanning apparatus which can obtain an image free from any dust or scratches can be minimized.

More specifically, the volume of dust/scratch range information on the film obtained by the infrared light scan is much smaller than that of image information obtained by the visible light scan. Hence, the infrared light scan is made prior to the visible light scan for obtaining the image information of the film, and the dust/scratch range information on the film obtained by this infrared light scan is stored in the storage circuit. After the image information of the film is obtained by the visible light scan, the dust/scratch range information stored in the storage circuit is read out, and image processing for correcting influences of dust and scratches on the image information of the film obtained by the visible light scan is done. For this reason, the storage capacity of the storage circuit can be greatly reduced compared to a case wherein the visible light scan is made prior to the infrared light scan, the image information of the film is stored in the storage circuit, the image information of the film stored in the storage circuit is read out after the infrared light scan, and the image processing for correcting influences of dust and scratches on the image information of the film obtained by the visible light scan is done.

Figure 38:
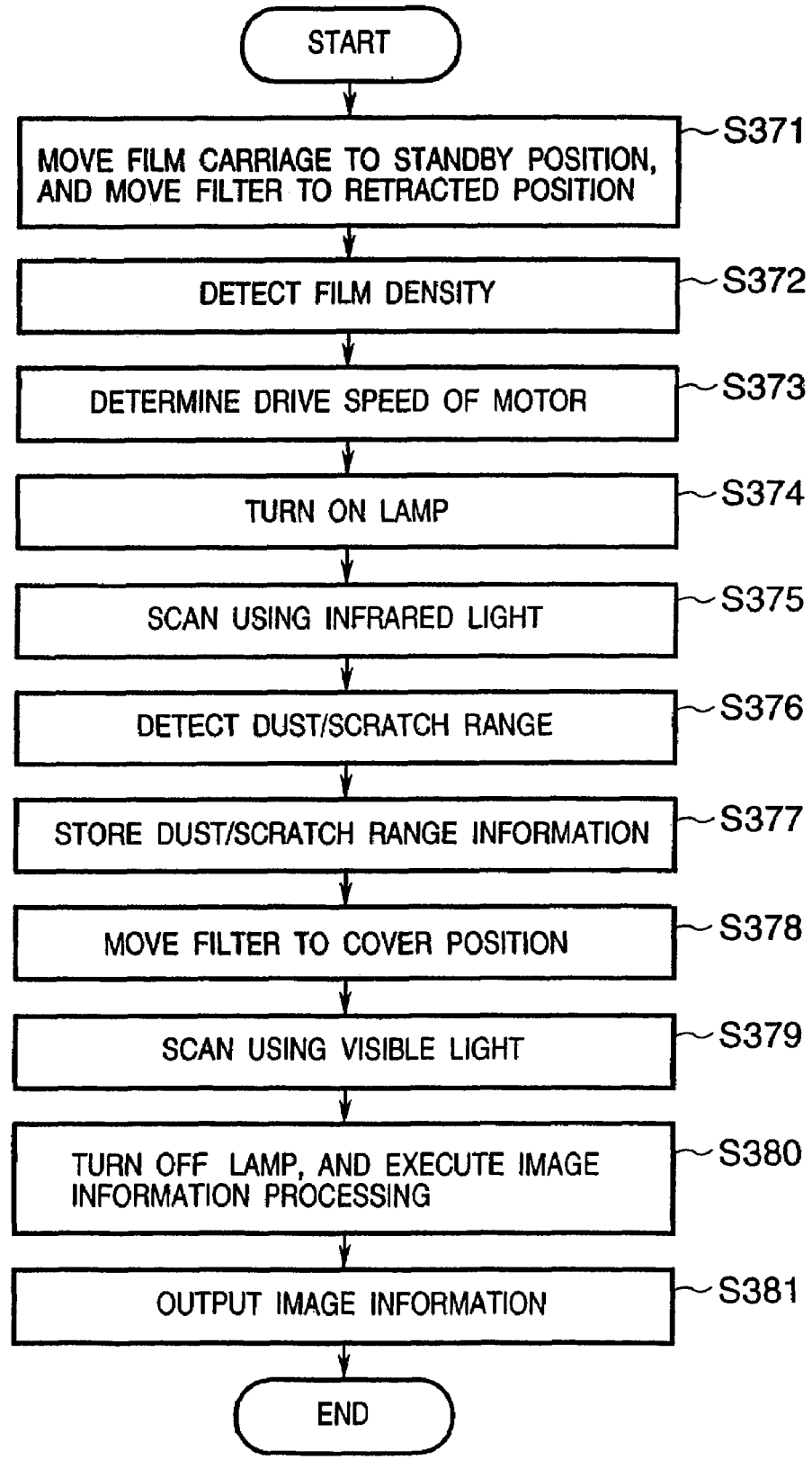
FIG. 38 is a flow chart in a modification of the ninth embodiment for controlling the operation of the film scanner shown in FIG. 1.

A modification of the ninth embodiment described above will be explained using FIG. 38. FIG. 38 is a flow chart in this modification for controlling the operation of the film scanner shown in FIG. 1. In the following description, since reference numerals are common to those in the first embodiment as in the ninth embodiment, a detailed description thereof will be omitted.

This modification is effective for a film scanner having the same arrangement as that of the first embodiment, in which upon reciprocally moving the film carriage 1 by the motor 7 with respect to the line sensor 6, hysteresis due to the reciprocal motion is very small, that is, two pieces of image information obtained by both movements (forward and backward movements) can be easily overlapped on each other upon capturing images by a movement of the film carriage 1 in a predetermined direction and by a movement in the reverse direction.

(Step S371) Upon receiving a film scan command from an external device via the input/output terminal 15, the sensor 8 and sensor control circuit detect the position of the film carriage 1, and that information is sent to the film scanner control circuit. The motor control circuit drives the motor 7 to set the film carriage 1 at a predetermined standby position, thus moving the film carriage 1 to the standby position. At the same time, the filter sensor 17 and filter sensor control circuit detect the position of the filter 10, and that information is sent to the film scanner control circuit. In order to retract the filter 10 from the position on the optical axis 9, the filter motor control circuit drives the filter motor 11 to move the filter 10 to its retracted position.

(Step S372) The density sensor 16 and film density detection circuit detect the density of the film 2.

(Step S373) The motor drive speed determination circuit determines the drive speed of the motor 7 for a scan on the basis of the detected density information.

(Step S374) The lamp control circuit turns on the lamp 3.

(Step S375) The motor control circuit rotates the motor 7 in a predetermined direction at the determined drive speed, thus scanning the film to obtain image information of the film 2 by infrared light.

(Step S376) During the scan, the line sensor 6 sends image information to the image information processing circuit via the line sensor control circuit to detect the infrared light transmission state, i.e., a region on the film 2 where the transmittance of the infrared light is different from the remaining region by a predetermined value or more, thus detecting any dust/scratch range on the film 2.

(Step S377) The dust/scratch range information is sent to and stored in the image information storage circuit.

(Step S378) Upon completion of the scan for obtaining the image information, i.e., the dust/scratch range information of the film 2 by infrared light, the filter motor control circuit drives the filter motor 11 to move the filter 10 to a position where it can cover a light beam having the optical axis 9 as the center while monitoring the position of the filter 10 by the filter sensor 17 and filter sensor control circuit.

(Step S379) The motor control circuit rotates the motor 7 in the reverse direction at the previously determined drive speed, thus scanning the film to obtain image information of the film 2 by visible light. During this scan, the line sensor 6 sends image information to the image information processing circuit via the line sensor control circuit.

(Step S380) Upon completion of this scan, the lamp control circuit turns off the lamp 3 and, at the same time, the image information storage circuit sends the dust/scratch range information to the image information processing circuit, which executes image information processing for correcting the dust/scratch range from the image information of the film 2 obtained by visible light.

(Step S381) The image information is output from the input/output terminal 15, thus ending film image scanning of the film scanner.

Note that the dust/scratch range information on the film 2 and the image information of the film 2 obtained by visible light may be separately output from the input/output terminal 15, and a device (not shown) connected to the input/output terminal 15 may execute image information processing for correcting the dust/scratch range from the image information of the film 2 obtained by visible light.

Furthermore, an operation mode that skips the scan using infrared light, i.e., the scan for obtaining dust/scratch range information, and makes only a scan for obtaining image information of the film 2 by visible light may be provided as one of operation modes to be selected. With this mode, when a film which has less dust or scratches is to be scanned, or when no dust/scratch correction of an output image is required, the time required for the image information processing for obtaining image information of the film 2 by visible light can be shortened by skipping the image information processing for correcting the dust/scratch range of the image information of the film 2.

10th Embodiment

Figure 39:
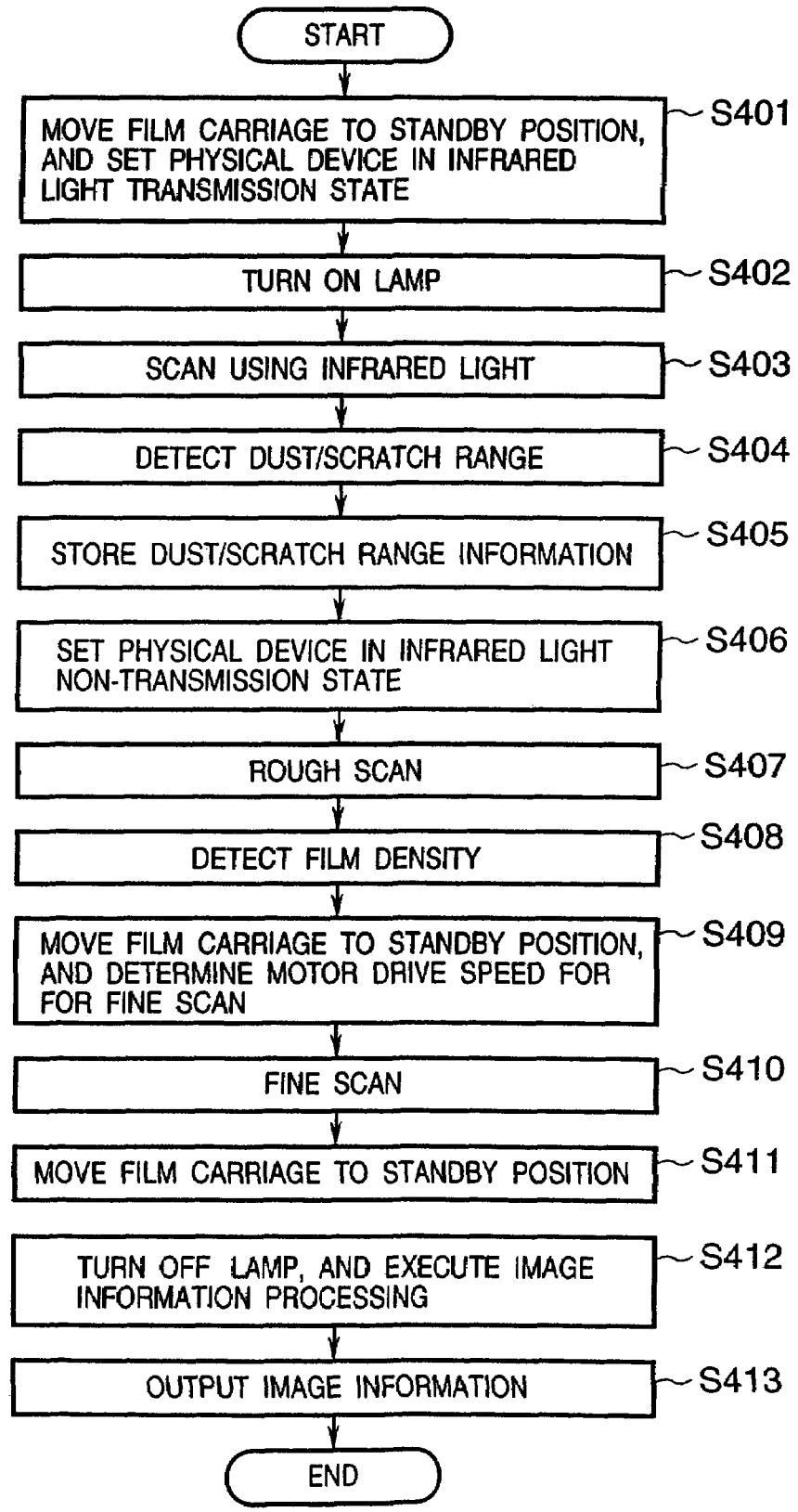
FIG. 39 is a flow chart in the 10th embodiment for controlling the operation of the film scanner shown in FIG. 8.
Figure 40:
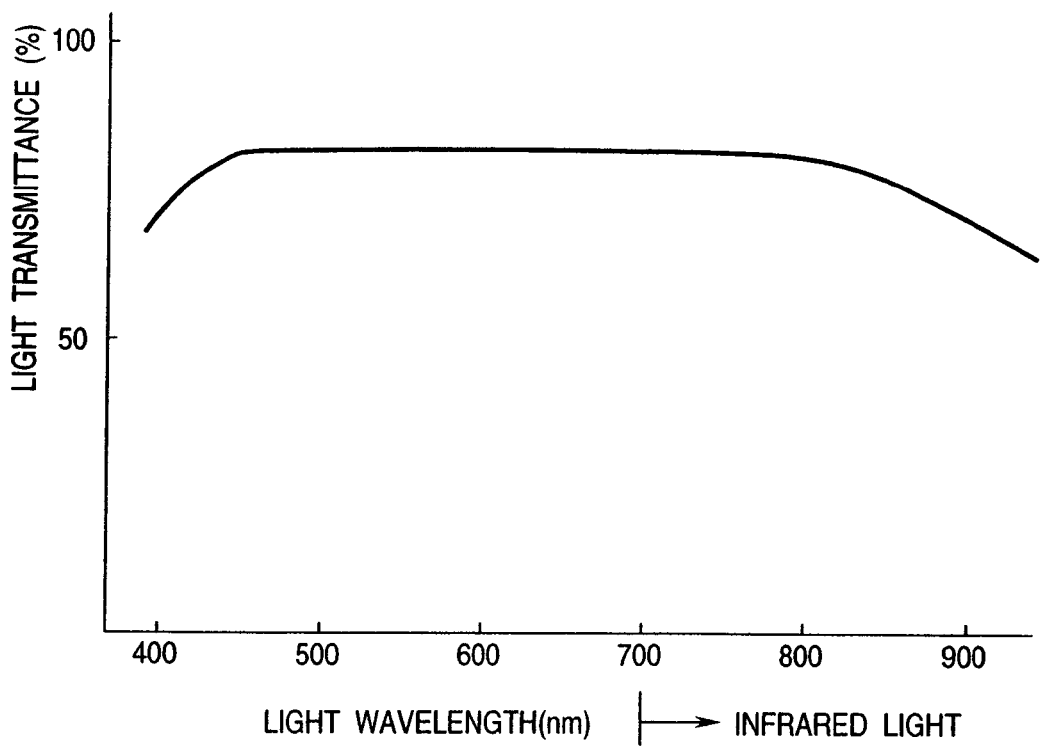
FIGS. 40 and 41 are graphs showing the spectral transmission characteristics of a physical device in the 10th embodiment in an infrared light transmission state.
Figure 41:
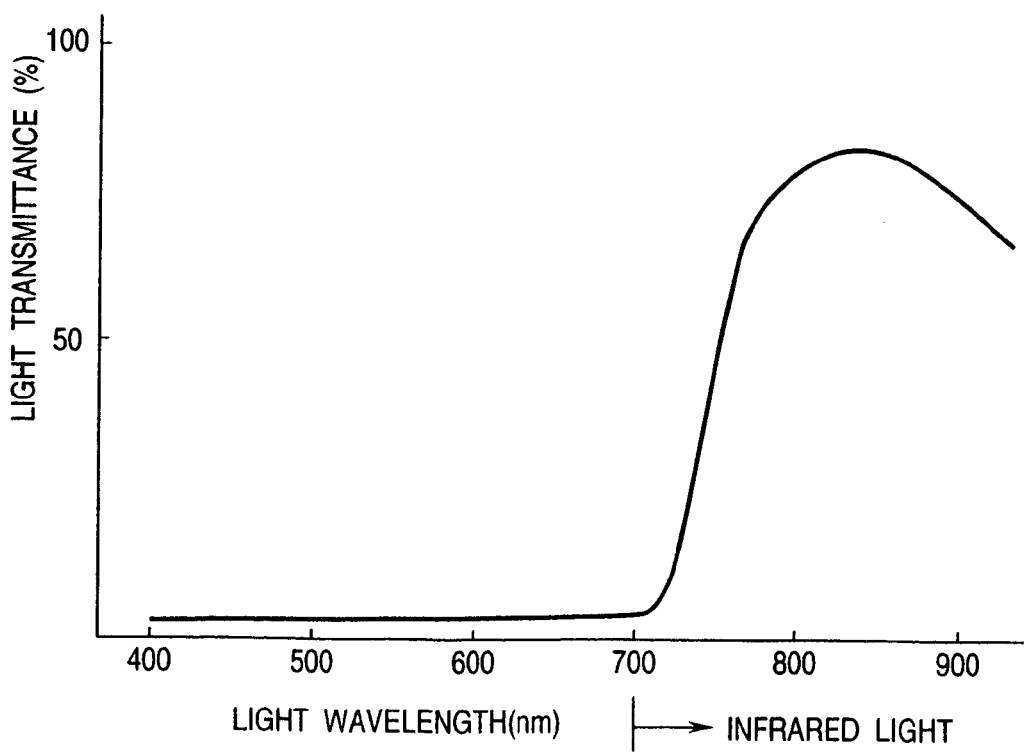
Figure 42:
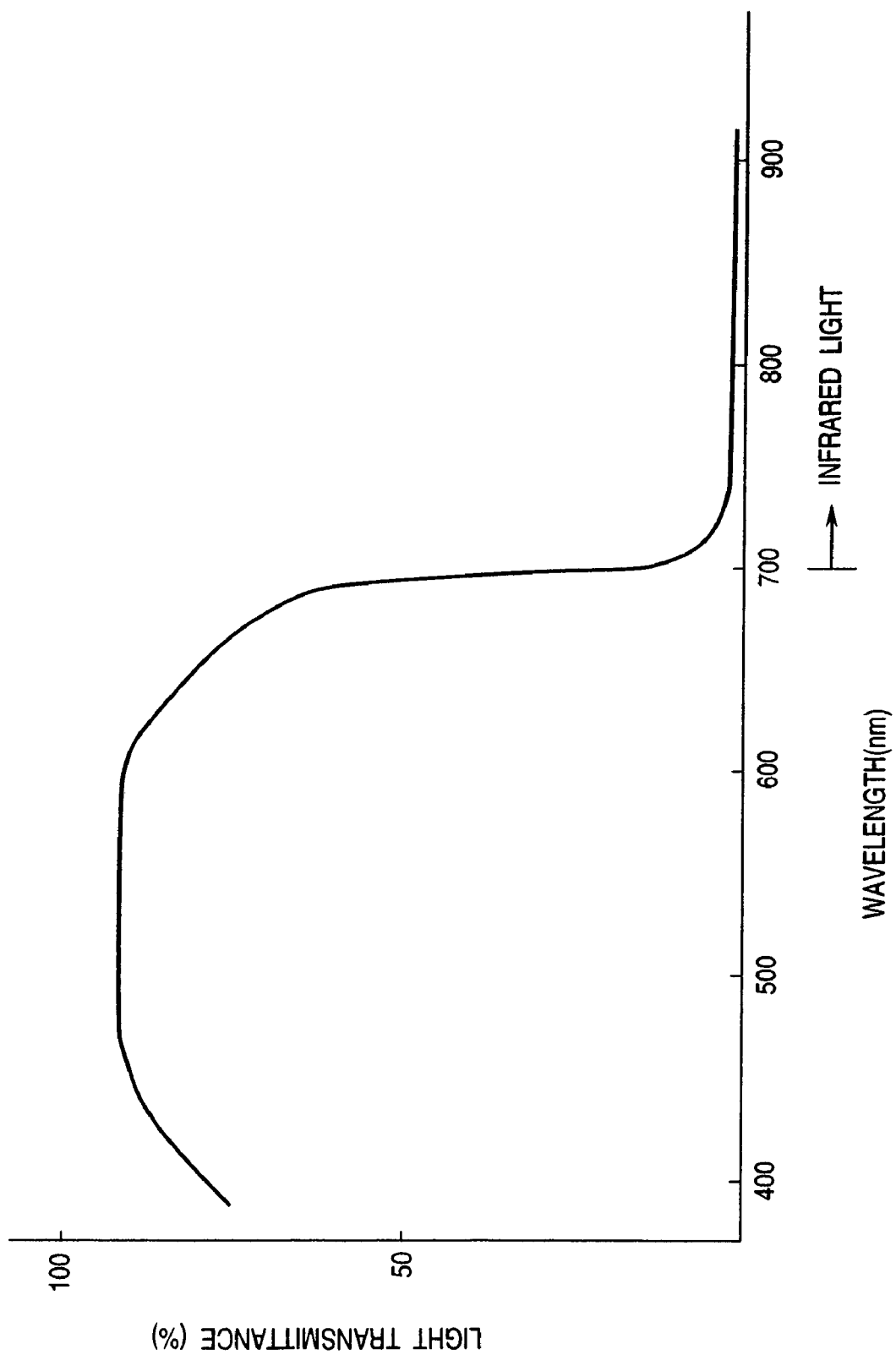
FIG. 42 is a graph showing the spectral transmission characteristics of a physical device in the 10th embodiment in an infrared light non-transmission state.

The 10th embodiment of the present invention will be described below with reference to FIGS. 39 to 42, and FIGS. 8 to 10 used in the description of the third embodiment. FIG. 39 is a flow chart in this embodiment for controlling the operation of the film scanner shown in FIG. 8. FIGS. 40 and 41 are graphs showing the spectral transmission characteristics of a physical device used in this embodiment in an infrared light transmission state, and FIG. 42 is a graph showing the spectral transmission characteristics of a physical device used in this embodiment in an infrared light non-transmission state.

An image information scanning method of the film 32 will be described below with reference to the flow chart in FIG. 39. Note that reference numerals used in the following description are common to those in the third embodiment, and a detailed description thereof will be omitted.

(Step S401) Upon receiving a film scan command from an external device via the input/output terminal 44, the sensor 38 and sensor control circuit detect the position of the film carriage 31, and that information is sent to the film scanner control circuit. The motor control circuit drives the motor 37 to set the film carriage 31 at a predetermined standby position, thus moving the film carriage 31 to the standby position. At the same time, the physical device control circuit sets the spectral transmission characteristics of the physical device 40 in the infrared light transmission state shown in FIG. 40 or 41.

(Step S402) The lamp control circuit turns on the lamp 33.

(Step S403) The motor control circuit rotates the motor 37 in a predetermined direction at a predetermined speed to scan the image range on the film 32 at the predetermined speed in the film surface direction, thus making a scan to obtain image information of the film 32 formed by infrared light.

(Step S404) During the scan, the line sensor 36 sends image information to the image information processing circuit via the line sensor control circuit, and the image information processing circuit detects the infrared light transmission state, i.e., a region on the film 32 where the transmittance of the infrared light is different from the remaining region by a predetermined value or more, thus detecting any dust/scratch range on the film 32.

(Step S405) The detected dust/scratch range information is sent to and stored in the image information storage circuit.

(Step S406) Upon completion of the scan for obtaining the image information, i.e., the dust/scratch range information of the film 32 by infrared light, the physical device control circuit sets the spectral transmission characteristics of the physical device 40 in the infrared light non-transmission state shown in FIG. 42.

(Step S407) The motor control circuit rotates the motor 37 in the reverse direction at a predetermined drive speed, thus making a rough scan for obtaining image information of the film 32 by visible light.

(Step S408) During this rough scan, the line sensor 36 sends image information to the image information processing circuit via the line sensor control circuit, and the film density detection circuit detects the light transmittance of the film 32, i.e., the film density on the basis of this information.

(Step S409) When the film carriage 31 returns to its standby position and the rough scan is complete, the motor drive speed determination circuit determines the motor drive speed for a fine scan on the basis of the detected film density of the entire film, so as to obtain an image with an appropriate amount of light.

(Step S410) The motor control circuit rotates the motor 37 in a predetermined direction at the determined motor drive speed, thus making a fine scan.

(Step S411) During this fine scan, the line sensor 36 sends image information to the image information processing circuit via the line sensor control circuit. Upon completion of image scanning for the fine scan, the motor control circuit rotates the motor 37 in the reverse direction at a predetermined drive speed to return the film carriage 31 to its standby position.

(Step S412) Upon completion of the fine scan, the lamp control circuit turns off the lamp 33, and at the same time, the image information storage circuit sends the dust/scratch range information to the image information processing circuit, which executes image information processing for correcting the dust/scratch range of image information of the film 32 obtained by the fine scan (visible light).

(Step S413) The image information is then output from the input/output terminal 44, thus ending film image scanning of the film scanner.

Note that the dust/scratch range information on the film 32 and the image information of the film 32 obtained by visible light may be separately output from the input/output terminal 44, and a device (not shown) connected to the input/output terminal 44 may execute image information processing for correcting the dust/scratch range from the image information of the film 32 obtained by visible light.

Also, the scan for obtaining image information of the film 32 by infrared light may be made during the reciprocal motion of the film carriage 31 in the fine scan in place of that of the film carriage 31 in the rough scan. In this case, the fine scan is made after the scan for obtaining image information of the film 32 by infrared light.

Furthermore, an operation mode that skips the infrared light scan and makes only a scan for obtaining image information of the film 32 by visible light may be provided as one of operation modes to be selected. With this mode, when a film which has less dust or scratches is to be scanned, or when no dust/scratch correction of an output image is required, the time required for the image information processing for obtaining image information of the film 32 by visible light can be shortened by skipping the image information processing for correcting the dust/scratch range of the image information of the film 32.

11th Embodiment

Figure 43:
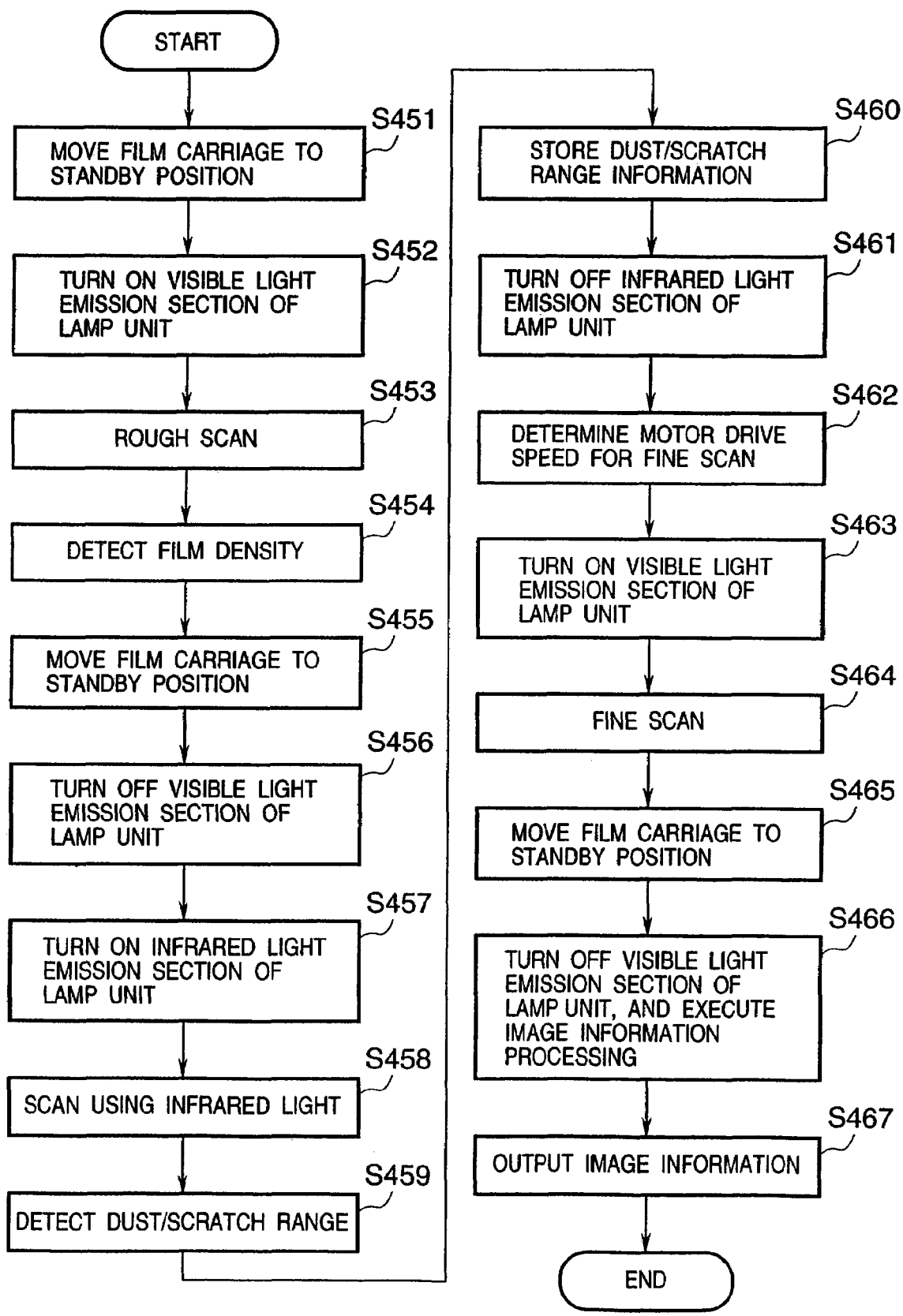
FIG. 43 is a flow chart in the 11th embodiment for controlling the operation of the film scanner shown in FIG. 31.
Figure 45:
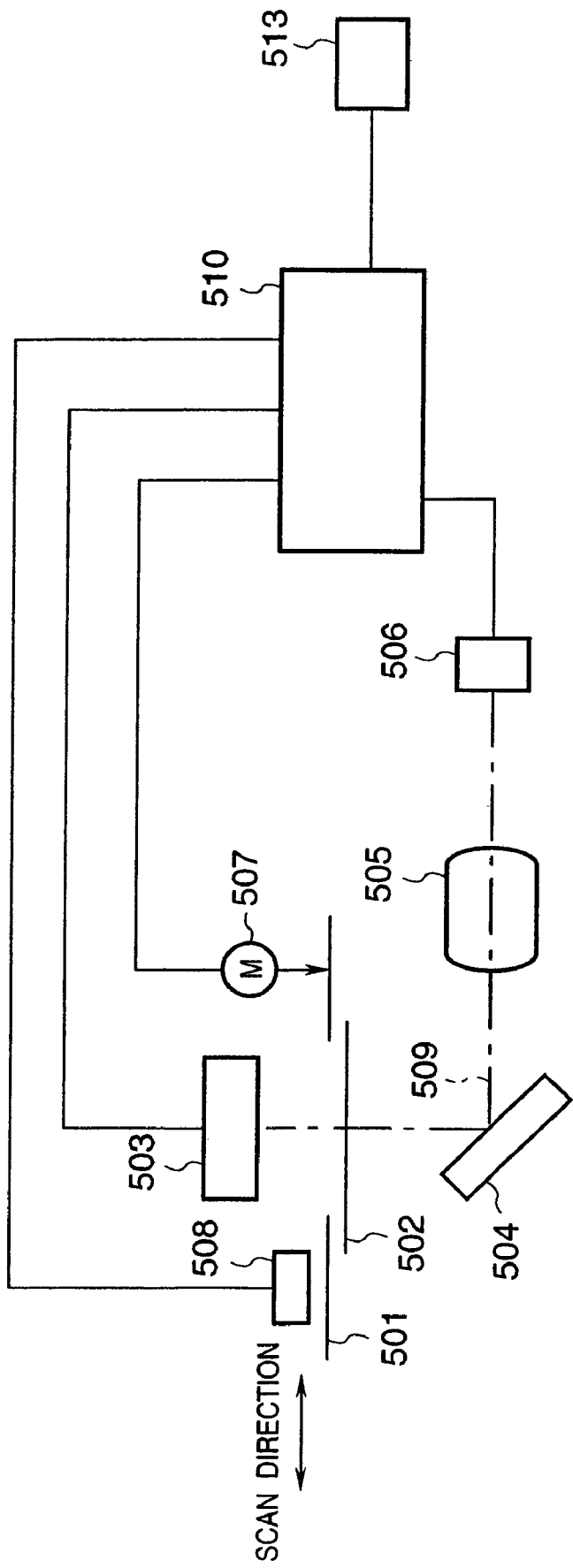
FIG. 45 is a schematic view showing the arrangement of the film scanner shown in FIG. 44.
Figure 46:
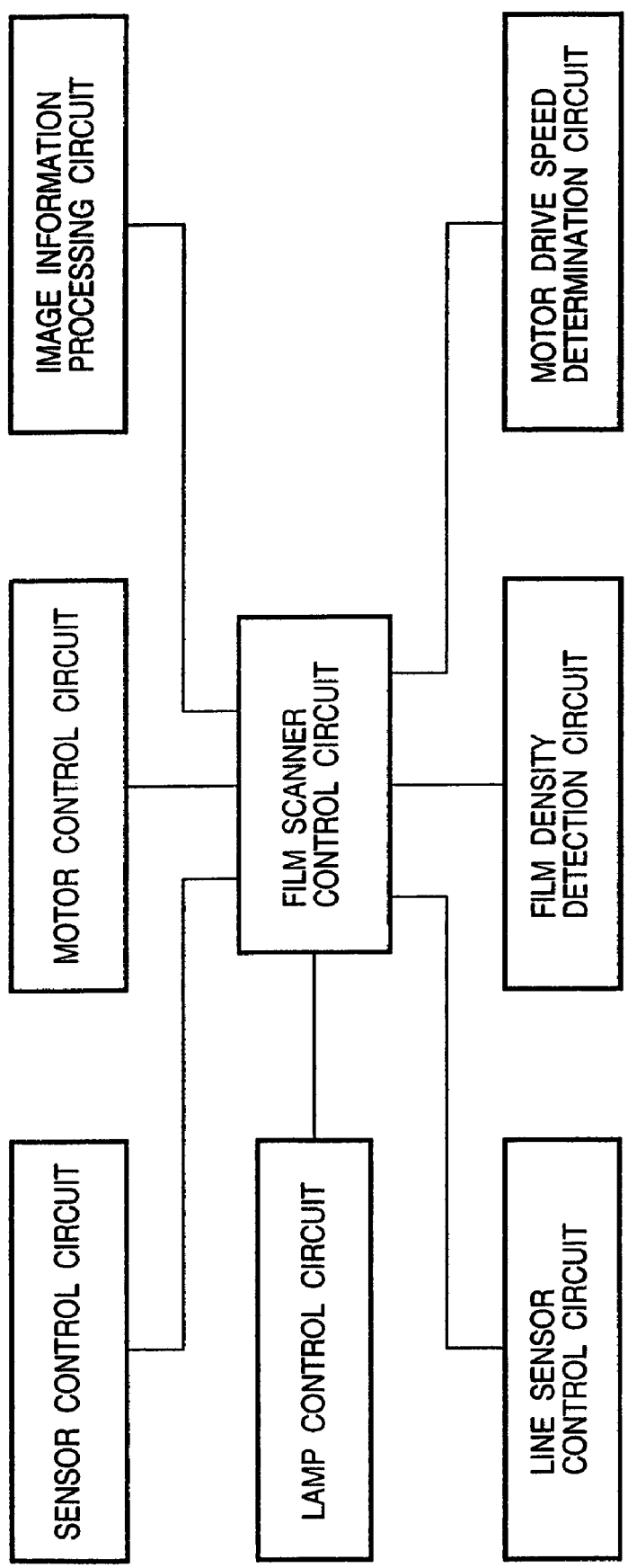
FIG. 46 is a block diagram showing the circuit arrangement of the film scanner shown in FIG. 44.

The 11th embodiment of the present invention will be described below with reference to FIG. 43, and FIGS. 31 to 33 used in the description of the eighth embodiment. FIG. 43 is a flow chart in this embodiment for controlling the operation of the film scanner shown in FIG. 31.

An image information scanning method of the film 162 will be described below with reference to the flow chart in FIG. 43. Note that reference numerals used in the following description are the common to those in the eighth embodiment, and a detailed description thereof will be omitted.

(Step S451) Upon receiving a film scan command from an external device via the input/output terminal 175, the sensor 168 and sensor control circuit 178 detect the position of the film carriage 161, and that information is sent to the film scanner control circuit 177. The motor control circuit 179 drives the motor 167 to set the film carriage 161 at a predetermined standby position, thus moving the film carriage 161 to the standby position.

(Step S452) The lamp unit control circuit 181 turns on the visible light emission section 163a of the lamp unit 163.

(Step S453) The motor control circuit 179 rotates the motor 167 in a predetermined direction at a predetermined drive speed, thus making a rough scan for obtaining image information of the film 102 by visible light.

(Step S454) During this rough scan, the line sensor 166 sends image information to the image information processing circuit 180 via the line sensor control circuit 183, and the film density detection circuit 184 detects the light transmittance of the film 162, i.e., the film density, on the basis of that information.

(Step S455) Upon completion of image scanning for the rough scan, the motor control circuit 179 rotates the motor 167 in the reverse direction at a predetermined drive speed, thus returning the film carriage 161 to its standby position and completing the rough scan.

(Step S456) The lamp unit control circuit 181 turns off the visible light emission section 163a of the lamp unit 163.

(Step S457) The lamp unit control circuit 181 then turns on the infrared light emission section 163b of the lamp unit 163.

(Step S458) The motor control circuit 179 rotates the motor 167 in a predetermined direction at a predetermined drive speed, thus making a scan for obtaining image information of the film 162 by infrared light.

(Step S459) During this scan, the line sensor 166 sends image information to the image information processing circuit 180 via the line sensor control circuit 183 to detect the infrared light transmission state, i.e., a region on the film 162 where the transmittance of the infrared light is different from the remaining region by a predetermined value or more, thus detecting any dust/scratch range on the film 162.

(Step S460) The dust/scratch range information is sent to and stored in the image information storage circuit 182.

(Step S461) Upon completion of the scan for obtaining the image information, i.e., the dust/scratch range information of the film 162 by infrared light, the lamp unit control circuit 181 turns off the infrared light emission section 163b of the lamp unit 163.

(Step S462) The motor drive speed determination circuit 185 determines the motor drive speed in a fine scan to obtain an image with an appropriate amount of light, on the basis of the film density of the entire film detected by the previous rough scan.

(Step S463) The lamp unit control circuit 181 turns on the visible light emission section 163a of the lamp unit 163.

(Step S464) The motor control circuit 179 rotates the motor 167 in a predetermined direction at the determined drive speed to make a fine scan. During this fine scan, the line sensor 166 sends image information to the image information processing circuit 180 via the line sensor control circuit 183.

(Step S465) Upon completion of image scanning for the fine scan, the film carriage 161 returns to its standby position, thus completing the fine scan.

(Step S466) The lamp unit control circuit 181 turns off the visible light emission section 163a of the lamp unit 163, and at the same time, the image information storage circuit 182 sends the dust/scratch range information to the image information processing circuit 180, which executes image information processing for correcting the dust/scratch range from image information of the film 162 obtained by the fine scan (visible light).

(Step S467) The image information is then output from the input/output terminal 175, thus ending film image scanning of the film scanner.

Note that the scan for obtaining image information of the film 162 by infrared light (infrared light scan) may be made during the process for returning the film carriage 161 to its standby position after the rough scan, in place of the aforementioned timing.

As in the above embodiments, the dust/scratch range information on the film 162 and the image information of the film 162 obtained by visible light may be separately output from the input/output terminal 175, and the device (not shown) connected to the input/output terminal 175 may execute image information processing for correcting the dust/scratch range from the image information of the film 162 obtained by visible light.

Also, an operation mode that skips the infrared light scan and makes only a scan for obtaining image information of the film 162 by visible light may be provided as one of operation modes to be selected. With this mode, when a film which has less dust or scratches is to be scanned, or when no dust/scratch correction of an output image is required, the time required for the image information processing for obtaining image information of the film 162 by visible light can be shortened by skipping the image information processing for correcting the dust/scratch range of the image information of the film 162.

The preferred embodiments of the present invention have been explained, but the objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magnetooptical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. An image scanning apparatus comprising:
    a light source adapted to emit visible light and invisible light;
    a scanning unit adapted to scan light emitted by said light source and transmitted through a transparent film original; and
    a controller adapted to control said light source and the scanning unit,
    wherein said light source and said scanning unit are arranged at opposite sides across the transparent film original, and an operation mode that skips a scan of the invisible light transmitted through the transparent film original to obtain information related to an abnormality on the transparent film original before or after executing a scan of the visible light transmitted through the transparent film original is selectable,
    when said scanning unit scans the visible light transmitted through the transparent film original, said scanning unit executes a rough scan for roughly scanning the visible light transmitted through the transparent film original, and a fine scan for scanning the original image under a required condition on the basis of information scanned in the rough scan, and said scanning unit makes the invisible light scan at a higher speed than the fine scan.

2. The apparatus according to claim 1, wherein said controller controls said scanning unit to scan the invisible light transmitted through the transparent film original, and then to scan the visible light transmitted through the transparent film original.

3. The apparatus according to claim 1, wherein said controller controls said scanning unit to execute the rough scan after said scanning unit executes the invisible light scan, and then to execute the fine scan.

4. The apparatus according to claim 1, wherein said scanning unit makes the invisible light scan at a lower resolution than the fine scan.

5. The apparatus according to claim 1, wherein said scanning unit makes the invisible light scan within a shorter period of time than the fine scan.

6. The apparatus according to claim 1, further comprising a detection unit adapted to detect an abnormality on a transparent film original by scanning the invisible light transmitted through the transparent film original.

7. The apparatus according to claim 6, wherein the abnormality on the transparent film original is caused by dust or scratches on the original.

8. The apparatus according to claim 6, further comprising a signal processing unit adapted to execute signal processing for correcting an influence of the abnormality from an image signal output from said scanning unit when said detection unit detects the abnormality.

9. The apparatus according to claim 1, wherein the invisible light is infrared light.

10. The apparatus according to claim 1, wherein said light source comprises a first emission section for emitting the visible light, and a second emission section for emitting the invisible light, and said controller controls to turn on/off said first and second emission sections of said light source.

11. An image scanning method comprising:
    an emission step of emitting light by a light source adapted to emit visible light and invisible light; and
    a scanning step of scanning light emitted by said light source and transmitted through a transparent film original,
    wherein in the scanning step, an operation mode that skips a scan of the invisible light transmitted through the transparent film original to obtain information related to an abnormality on the transparent film original before or after executing a scan of the visible light transmitted through the transparent film original is selectable,
    in the scan of the visible light transmitted through the transparent film original, the scanning step executes a rough scan for roughly scanning the visible light transmitted through the transparent film original and a fine scan for scanning the original image under a required condition on the basis of information scanned in the rough scan, and the scanning step executes the invisible light scan at a higher speed than the fine scan.

12. The method according to claim 11, wherein the scanning step executes an invisible light scan to scan the invisible light transmitted through the transparent film original and then executes a visible light scan to scan the visible light transmitted through the transparent film original.

13. The method according to claim 11, wherein the scanning step executes the rough scan after the scan of the invisible light transmitted through the transparent film original, and then executes the fine scan.

14. The method according to claim 11, wherein the scanning step executes the invisible light scan at a lower resolution than the fine scan.

15. The method according to claim 11, wherein the scanning step executes the invisible light scan within a shorter period of time than the fine scan.

16. The method according to claim 11, further comprising a detection step of detecting an abnormality on a transparent film original by scanning the invisible light transmitted through the transparent film original.

17. The method according to claim 16, wherein the abnormality on the transparent film original is caused by dust or scratches on the original.

18. The method according to claim 16, further comprising a signal processing step of executing signal processing for correcting an influence of the abnormality from an image signal obtained by the scanning step when the abnormality is detected in the detection step.

19. The method according to claim 11, wherein the invisible light is infrared light.

20. A computer readable storage medium, which stores a program for implementing an image scanning method, said image scanning method comprising:
    an emission step of emitting light by a light source adapted to emit visible light and invisible light; and a scanning step of scanning light emitted by said light source and transmitted through a transparent film original, wherein in the scanning step, an operation mode that skips a scan of the invisible light transmitted through the transparent film original to obtain information related to an abnormality on the transparent film original before or after executing a scan of the visible light transmitted through the transparent film original is selectable, in the scan of the visible light transmitted through the transparent film original, the scanning step executes a rough scan for roughly scanning the visible light transmitted through the transparent film original and a fine scan for scanning the original image under a required condition on the basis of information scanned in the rough scan, and the scanning step executes the invisible light scan at a higher speed than the fine scan.

21. The computer readable storage medium according to claim 20, wherein the scanning step executes an invisible light scan to scan the invisible light transmitted through the transparent film original and then executes a visible light scan to scan the visible light transmitted through the transparent film original.

22. The computer readable storage medium according to claim 20, wherein the scanning step executes the rough scan after the scan on the invisible light transmitted through the transparent film original, and then executes the fine scan.

23. The computer readable storage medium according to claim 20, wherein the scanning step executes the invisible light scan at a lower resolution than the fine scan.

24. The computer readable storage medium according to claim 20, wherein the scanning step executes the invisible light scan within a shorter period of time than the fine scan.

25. The computer readable storage medium according to claim 20, wherein said image scanning method further comprises a detection step of detecting an abnormality on a transparent film original by scanning the invisible light transmitted through the transparent film original.

26. The computer readable storage medium according to claim 25, wherein the abnormality on the transparent film original is caused by dust or scratches on the original.

27. The computer readable storage medium according to claim 25, wherein said image scanning method further comprises a signal processing step of executing signal processing for correcting an influence of the abnormality from an image signal obtained by the scanning step when the abnormality is detected in the detection step.

28. The computer readable storage medium according to claim 20, wherein the invisible light is infrared light.

* * * * *